(12) United States Patent
Hayton et al.

(10) Patent No.: US 10,050,966 B2
(45) Date of Patent: *Aug. 14, 2018

(54) SYSTEMS AND METHODS FOR PROVIDING A SINGLE CLICK ACCESS TO ENTERPRISE, SAAS AND CLOUD HOSTED APPLICATION

(71) Applicant: Citrix Systems, Inc., Fort Lauderdale, FL (US)

(72) Inventors: Richard Hayton, Cambridge (GB); Ajay Soni, San Jose, CA (US); Abhishek Chauhan, Saratoga, CA (US); Rajiv Sinha, San Jose, CA (US); Minoo Gupta, Los Gatos, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/255,640

(22) Filed: Sep. 2, 2016

(65) Prior Publication Data

US 2016/0373445 A1    Dec. 22, 2016

Related U.S. Application Data

(63) Continuation of application No. 13/102,937, filed on May 6, 2011, now Pat. No. 9,461,996.
(Continued)

(51) Int. Cl.
*H04L 29/06* (2006.01)
*G06F 21/00* (2013.01)
(Continued)

(52) U.S. Cl.
CPC .......... *H04L 63/0884* (2013.01); *G06F 21/00* (2013.01); *G06F 21/31* (2013.01);
(Continued)

(58) Field of Classification Search
CPC . H04L 63/0815; H04L 63/0884; G06F 21/00; G06F 21/31; G06F 21/41; G06F 21/554
See application file for complete search history.

(56) References Cited

U.S. PATENT DOCUMENTS 7,503,065 B1    3/2009 Packingham et al.
7,505,978 B2 *  3/2009 Bodin ............... G06F 17/30867
(Continued)

OTHER PUBLICATIONS

Koufi, Vassiliki, Flora Malamateniou, and George Vassilacopoulos. "A medical diagnostic and treatment advice system for the provision of home care." Proceedings of the 1st international conference on PErvasive Technologies Related to Assistive Environments. ACM, 2008. p. 46.*

(Continued)

*Primary Examiner* — Kari L Schmidt
(74) *Attorney, Agent, or Firm* — Foley & Lardner LLP; Christopher J. McKenna; Paul M. H. Pua

(57) ABSTRACT

The present disclosure is directed to methods and systems of providing a user-selectable list of disparately hosted applications. A device intermediary to a client and one or more servers may receive a user request to access a list of applications published to the user. The device may communicate to the client the list of published applications available to the user, the list comprising graphical icons corresponding to disparately hosted applications, at least one graphical icon corresponding to a third-party hosted application of the disparately hosted applications, the third party hosted application served by a remote third-party server. The device may receive a selection from the user of the at least one graphical icon. The device may communicate, from the remote third party server to the client of the user, execution of the third party hosted application responsive to the selection by the user.

16 Claims, 51 Drawing Sheets

Related U.S. Application Data

(60) Provisional application No. 61/332,433, filed on May 7, 2010.

(51) Int. Cl.
  *G06F 21/31* (2013.01)
  *G06F 21/41* (2013.01)
  *G06F 21/55* (2013.01)

(52) U.S. Cl.
  CPC ............ *G06F 21/41* (2013.01); *G06F 21/554* (2013.01); *H04L 63/0815* (2013.01)

(56) References Cited

U.S. PATENT DOCUMENTS

| | | | |
|---|---|---|---|
| 7,631,346 B2 * | 12/2009 | Hinton | H04L 63/0815 380/279 |
| 7,886,050 B2 | 2/2011 | Raja et al. | |
| 8,281,378 B2 | 10/2012 | Anderson | |
| 8,839,234 B1 * | 9/2014 | Voronkov | G06F 8/61 717/172 |
| 8,924,559 B2 | 12/2014 | Brown et al. | |
| 8,984,505 B2 | 3/2015 | Ferris | |
| 2003/0200465 A1 * | 10/2003 | Bhat | H04L 63/0815 726/8 |
| 2005/0015490 A1 * | 1/2005 | Saare | H04L 63/0815 709/225 |
| 2008/0082538 A1 | 4/2008 | Meijer et al. | |
| 2009/0187654 A1 | 7/2009 | Raja et al. | |
| 2009/0249440 A1 * | 10/2009 | Platt | H04L 63/0815 726/1 |
| 2009/0307351 A1 | 12/2009 | Raja et al. | |
| 2010/0042720 A1 | 2/2010 | Stienhans et al. | |
| 2010/0121975 A1 | 5/2010 | Sinha et al. | |
| 2010/0299366 A1 | 11/2010 | Stienhans et al. | |
| 2010/0332617 A1 | 12/2010 | Goodwin et al. | |
| 2011/0138047 A1 | 6/2011 | Brown et al. | |
| 2011/0138049 A1 | 6/2011 | Dawson et al. | |
| 2011/0153721 A1 | 6/2011 | Agarwal et al. | |
| 2011/0154464 A1 | 6/2011 | Agarwal et al. | |
| 2011/0219434 A1 | 9/2011 | Betz et al. | |
| 2011/0277026 A1 | 11/2011 | Agarwal et al. | |

OTHER PUBLICATIONS

D. Nurmi et al., "The Eucalyptus Open-Source Cloud-Computing System," 2009 9th IEEE/ACM International Symposium on Cluster Computing and the Grid, Shanghai, 2009, pp. 124-131.*

Lampropoulos, Konstantinos, et al. "Introducing a cross federation identity solution for converged network environments." Principles, Systems and Applications of IP Telecommunications. ACM, 2010. pp. 1-11.*

U.S. Notice of Allowance on U.S. Appl. No. 13/102,937 dated Jun. 2, 2016.

U.S. Office Action on U.S. Appl. No. 13/102,937 dated Jun. 4, 2015.

U.S. Office Action on U.S. Appl. No. 13/102,937 dated Nov. 2, 2012.

U.S. Office Action on U.S. Appl. No. 13/103,937 dated Mar. 13, 2013.

U.S. Office Action on U.S. Appl. No. 13/102,937 dated Nov. 17, 2015.

\* cited by examiner

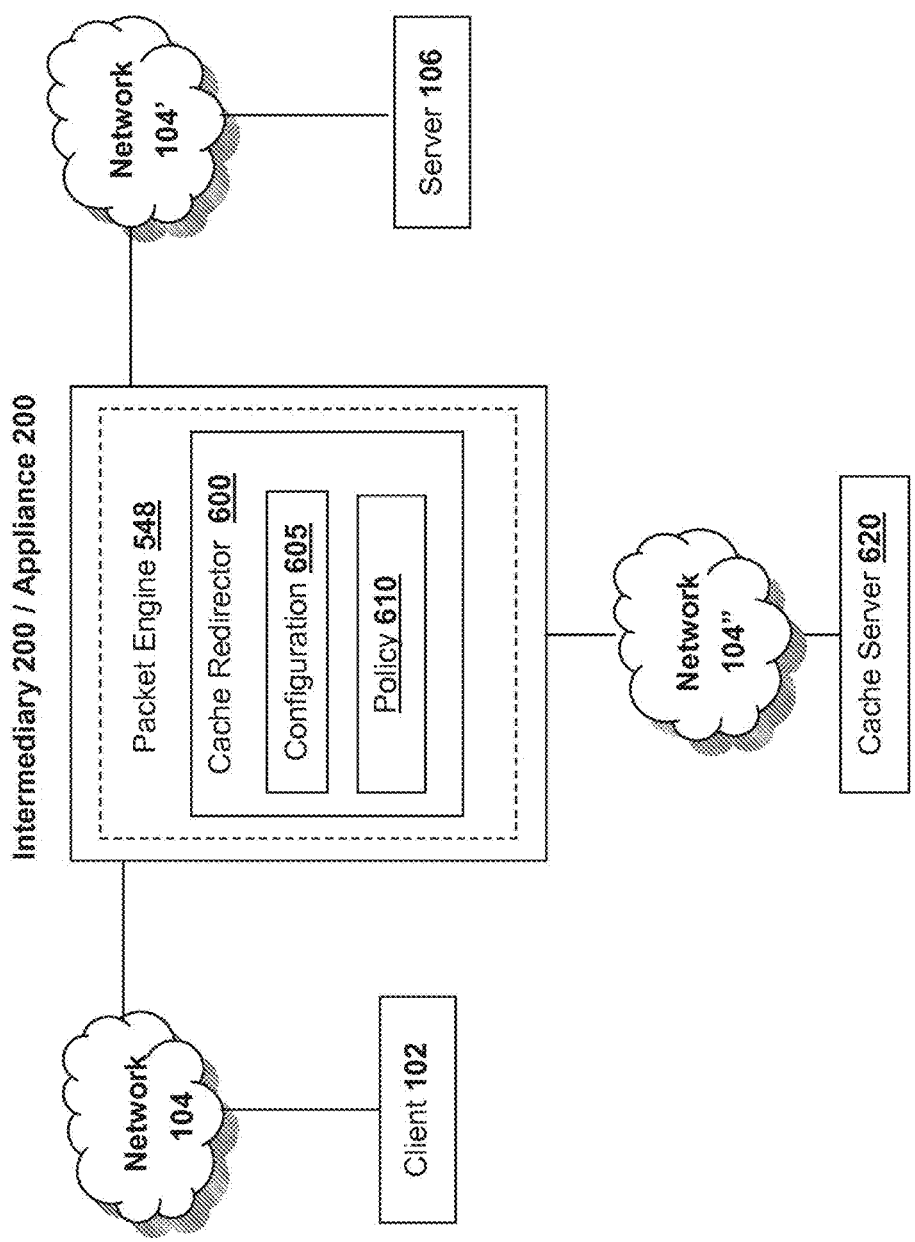

CloudAccess

- Transparent SSO for SaaS, enterprise and cloud applications from any location

- Automatic recognition, authentication and authorization of numerous SaaS and cloud applications

- Integrates and is non-disruptive to existing AAA solutions

- User Provisioning and Password Management are functional parts of the solution
- Single Sign-On (SSO) is included and enables automatic login to SaaS, Web, or XA/XD applications
- SaaS Connectors for each application for SSO

| 1400 Enrollment Rules | | Resource Group | 1302 | 1304 | 1306 |
|---|---|---|---|---|---|
| | | | Workstations | CAD Term | Admin Terminals |
| 1308 | User Group | IT | X | X | X |
| 1310 | | Engineers | X | X | |
| 1312 | | Assts | | | X |

FIG. 14

| Users | TemA | TemB | TemC | AdminA | AdminB | AdminC | CAD A | CAD B | CAD C |
|---|---|---|---|---|---|---|---|---|---|
| Tara | | x | | x | | | x | x | x |
| Tom | x | | x | x | x | x | | | |
| Ted | x | x | x | x | x | x | x | x | x |
| Ellie | x | | | | | x | x | x | |
| Erica | | | x | x | | | | x | x |
| Edward | | x | | | | x | x | x | x |
| Alex | | | | x | x | | | | |
| Amy | | | | | | | | | |
| Andrew | | | | | | | | | |

SYSTEMS AND METHODS FOR PROVIDING A SINGLE CLICK ACCESS TO ENTERPRISE, SAAS AND CLOUD HOSTED APPLICATION

RELATED APPLICATION

This application is a continuation of and claims priority to and the benefit of U.S. Non-provisional application Ser. No. 13/102,937, titled "SYSTEMS AND METHODS FOR PROVIDING SINGLE CLICK ACCESS TO ENTERPRISE, SAAS AND CLOUD HOSTED APPLICATION" and filed on May 6, 2011, which claims the benefit of and priority to U.S. Provisional Application No. 61/332,433, titled "SYSTEMS AND METHODS FOR PROVIDING SINGLE CLICK ACCESS TO ENTERPRISE, SAAS AND CLOUD HOSTED APPLICATION" and filed on May 7, 2010, both of which are incorporated herein by reference in their entirety.

FIELD OF THE INVENTION

The present application generally relates to data communication networks. In particular, the present application relates to systems and methods for providing single click access to a combination of enterprise, SaaS and cloud hosted applications.

BACKGROUND OF THE INVENTION

The number of applications in the data center has grown as well as the types of applications. An enterprise via one or more data centers may provide access to users to a multitude of applications. Some of these applications are hosted by the enterprise, while other applications are hosted by another provider such as an application provided by a Software As A Service (SaaS) service or an application hosted on a cloud service. These disparately hosted applications provide challenges as these disparate systems may not share passwords and authentication systems. This increases the expense and management of passwords and authentication to these different systems.

BRIEF SUMMARY OF THE INVENTION

The solution of the present application addresses the problem of accessing applications on disparately hosted systems by providing a single click access via a single interface to any combination of SaaS and cloud hosted applications as well as traditional enterprise hosted applications. Embodiments of the systems and methods of the present solution are directed to providing a single access interface to a plurality of disparately hosted applications, such as Software As A Service, Platform As A Service (PaaS) hosted applications, Infrastructure As A Service (IaaS) applications, cloud hosted applications and enterprise hosted applications. Any embodiments of the application delivery controller (ADC) described herein may provide a user interface for a remote user to gain access to any one or more of the plurality of differently hosted applications by clicking on a visual representation of the application in a list of published applications for which the user is allowed to access. Via the same remote access user interface, a user may access an application hosted outside the enterprise the same way the user may gain access to a data center or enterprise hosted application. Transparent and seamless to the user, ADC provides access to the disparately hosted systems via a single click user interface upon which the user can launch any one of a SaaS, Cloud or enterprise application.

In some aspects, the present disclosure relates to a method of providing a user a selectable list of disparately hosted applications. A device intermediary to a client and one or more servers may receive a request from a user on the client to access a list of applications published to the user. The device may communicate to the client the list of published applications available to the user, the list of published applications comprising a plurality of graphical icons corresponding to a plurality of disparately hosted applications, at least one graphical icon corresponding to a third party hosted application of the plurality of disparately hosted applications, the third party hosted application served by a remote third party server. The device may receive a selection from the user of the at least one graphical icon corresponding to the third party hosted application. The device may communicate, from the remote third party server to the client of the user, execution of the third party hosted application responsive to the selection by the user.

In some embodiments, the device authenticates the user via a single set of authentication credentials for accessing the plurality of disparately hosted applications. The device may identify applications for the list of published applications available for access to the user. The list of published applications may comprise one or more graphical icons corresponding to one or more applications hosted by third party servers on third party networks and one or more graphical icons corresponding to one or more applications hosted on one or more local servers on a local network of the device. In some embodiments, the device enumerates all disparately hosted applications available for access by the user into the list of published applications, a first application of the list of published applications comprising an application hosted by an enterprise of the device, a second application of the list of published applications comprising an application of the enterprise hosted via a cloud computing service and a third application of the list of published applications comprising a third-party application hosted by a third-party server.

In some embodiments, the device provides the list of published applications via one of a web interface page or a program neighborhood. The device may receive the selection from the user the at least one graphical corresponding to the third party hosted application comprising one of a Software as a Service (SAAS) application, a Platform as a Service (PAAS) application or an Infrastructure as a Service (IAAS) application. The device may automatically perform a login, by the device, to the third party hosted application on behalf of the user. The device may authenticate the user to the third party hosted application using authentication credentials managed by the device for the user. In some embodiments, the device communicates execution of the third party hosted application via one of streaming, a virtualized environment or a remote display protocol. In another embodiment, the device receives a second selection of a second graphical icon corresponding to an application hosted by a local server of an enterprise of the device. The device may communicate execution of the selected second application to the client of the user.

In some aspects, the present disclosure relates to a system for providing a user a selectable list of disparately hosted applications. The system may include a device intermediary to a client and one or more servers. The device may receive a request from a user on the client to access a list of applications published to the user. A packet engine of the device may communicate the list of published applications available to the user. The list of published applications may comprise a plurality of graphical icons corresponding to a plurality of disparately hosted applications, at least one graphical icon corresponding to a third party hosted application of the plurality of disparately hosted applications, the third party hosted application served by a remote third party server. The packet engine may receive a selection from the user of the at least one graphical icon corresponding to the third party hosted application. The execution of the third-party hosed application from the remote third party server may be communicated, via the device, to the client of the user responsive to the selection by the user.

In some embodiments, the device authenticates the user via a single set of authentication credentials for accessing the plurality of disparately hosted applications. In some embodiments, the device identifies applications for the list of applications available for access to the user, the list of published applications comprising one or more graphical icons corresponding to one or more applications hosted by third party servers on third party networks and one or more graphical icons corresponding to one or more applications hosted on one or more local servers on a local network of the device. In further embodiments, the device enumerates all disparately hosted applications available for access by the user into the list of published applications, a first application of the list of published applications comprising an application hosted by an enterprise of the device, a second application of the list of published applications comprising an application of the enterprise hosted via a cloud computing service and a third application of the list of published applications comprising a third-party application hosted by a third-party server.

In some embodiments, the device provides the list of published applications via one of a web interface page or a program neighborhood. In further embodiments, the device receives the selection from the user of the at least one graphical icon corresponding to the third party hosted application comprising one of a Software as a Service (SAAS) application, a Platform as a Service (PAAS) application or an Infrastructure as a Service (IAAS) application. In further embodiments, the device automatically performs a login to the third party hosted application on behalf of the user. In some embodiments, the device authenticates the user to the third party hosted application using authentication credentials managed by the device for the user. In further embodiments, the device communicates execution of the third party hosted application via one of streaming, a virtualized environment or a remote display protocol. In still further embodiments, the device receives a second selection of a second graphical icon corresponding to an application hosted by a local server of an enterprise of the device and communicates execution of the selected second application to the client of the user.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 6A is a block diagram of an embodiment of an intermediary device for maintaining the original IP address of a client request while performing cache redirection;

FIG. 14 is a table depicting example enrollment rules according to an illustrative embodiment of the invention;

FIG. 16 is an enrollment database depicting an example set of enrollments according to an illustrative embodiment of the invention;

In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for policy based transparent client IP insertion;

Section G describes embodiments of systems and methods for transparent end to end cache redirection;

Section H describes embodiments of systems and methods for providing single sign on access to disparately hosted applications;

Section I describes embodiments of systems and methods for methods and systems for generating and delivering an interactive application delivery store;

Section J describes embodiments of systems and methods for providing a Program Neighborhood and Access to applications on remote servers;

Section K describes embodiments of systems and methods for providing single sign on access via an intermediary device to disparately hosted application; and Section L describes embodiments of systems and methods for single click access to a combination of SaaS, cloud and enterprise applications.

A. Network and Computing Environment

Figure 1A:
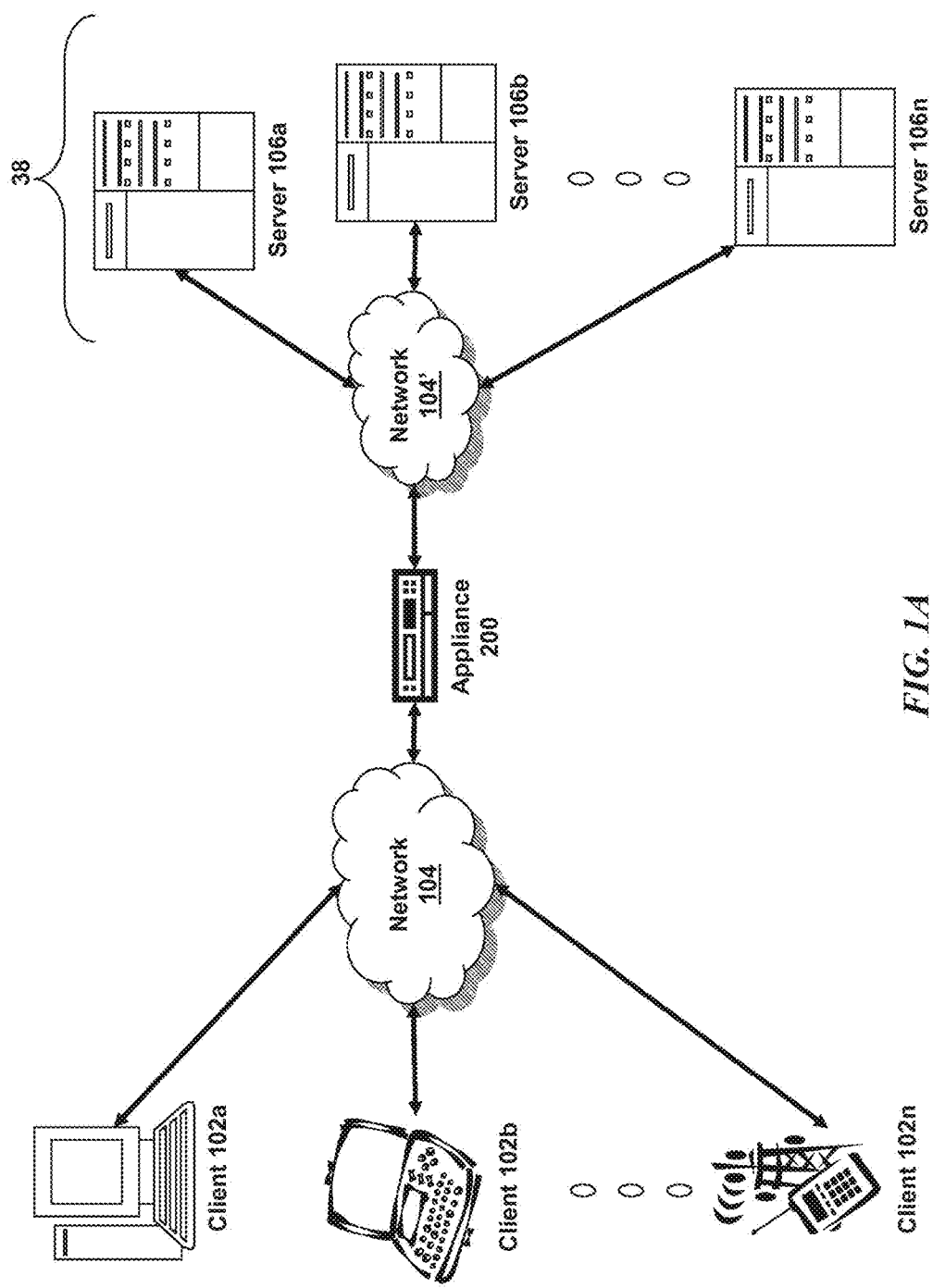
FIG. 1A is a block diagram of an embodiment of a network environment for a client to access a server via an appliance.

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104, 104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
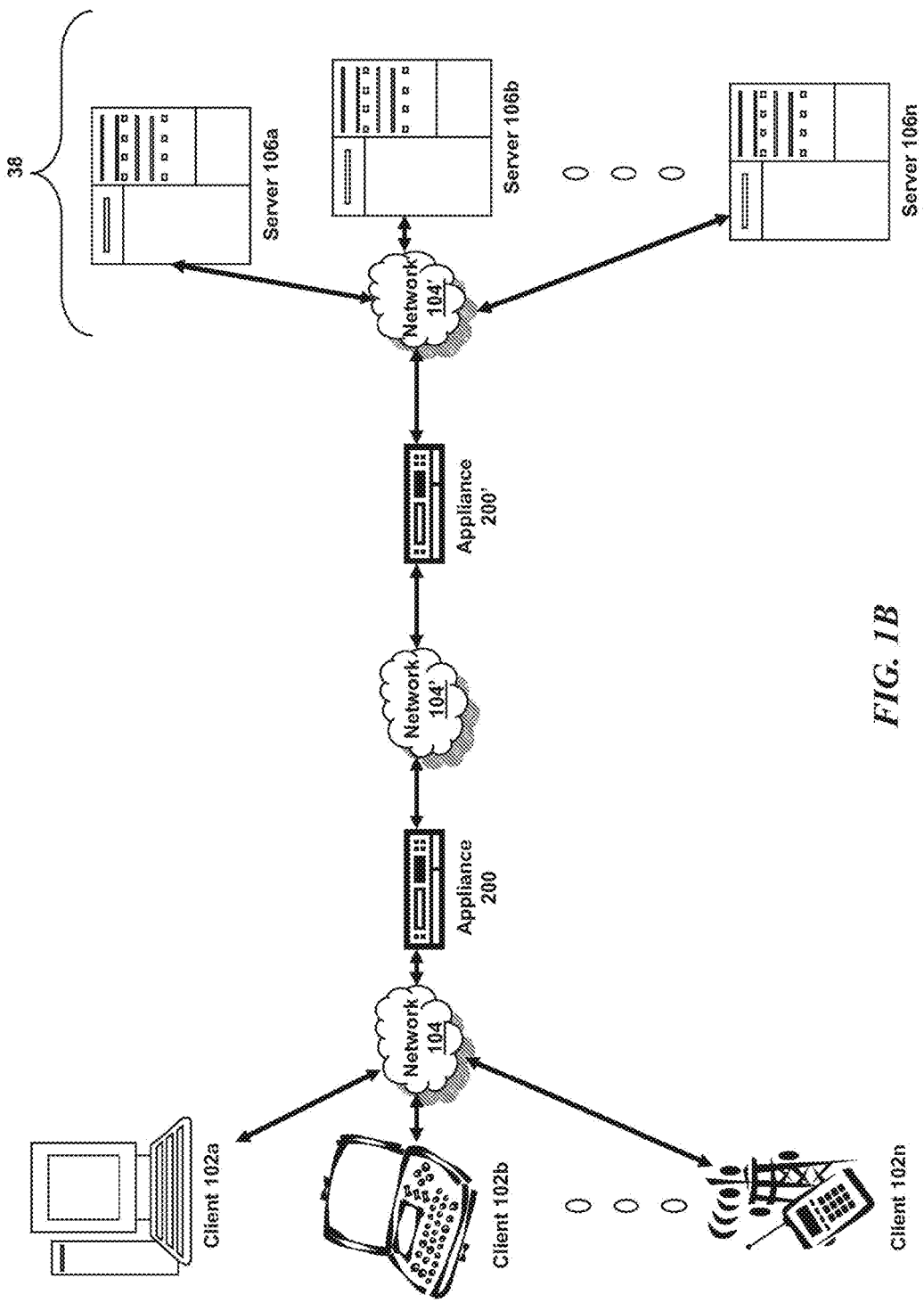
FIG. 1B is a block diagram of an embodiment of an environment for delivering a computing environment from a server to a client via an appliance.
Figure 1C:
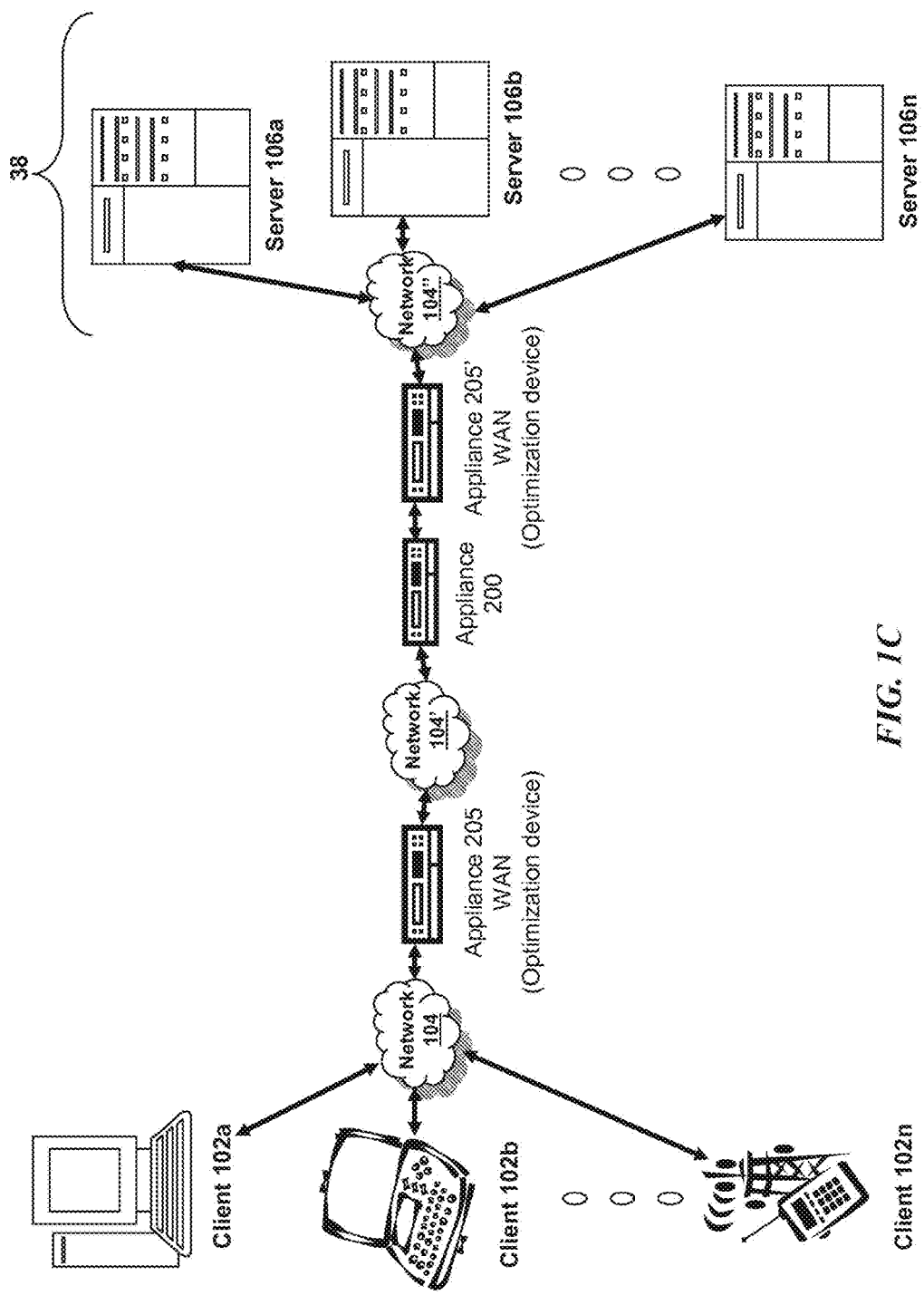
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
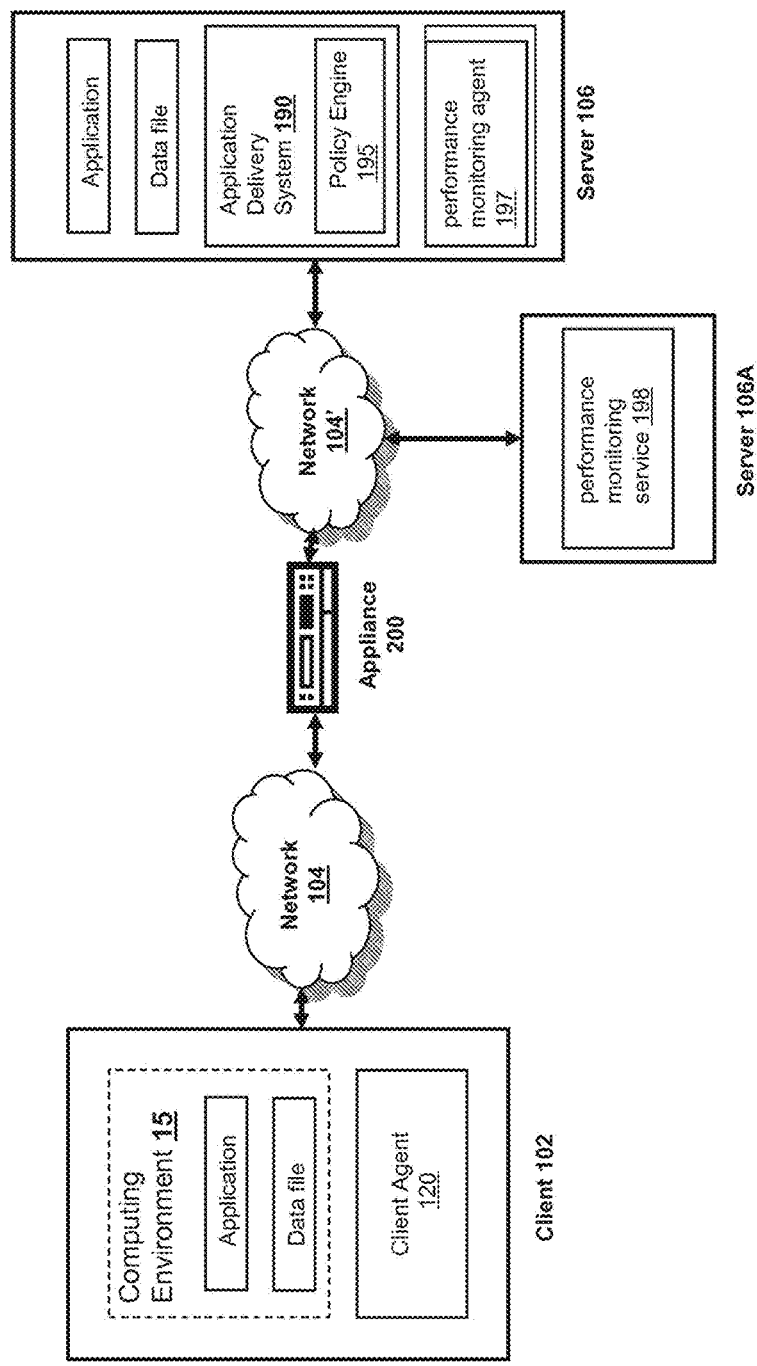
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone.

In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
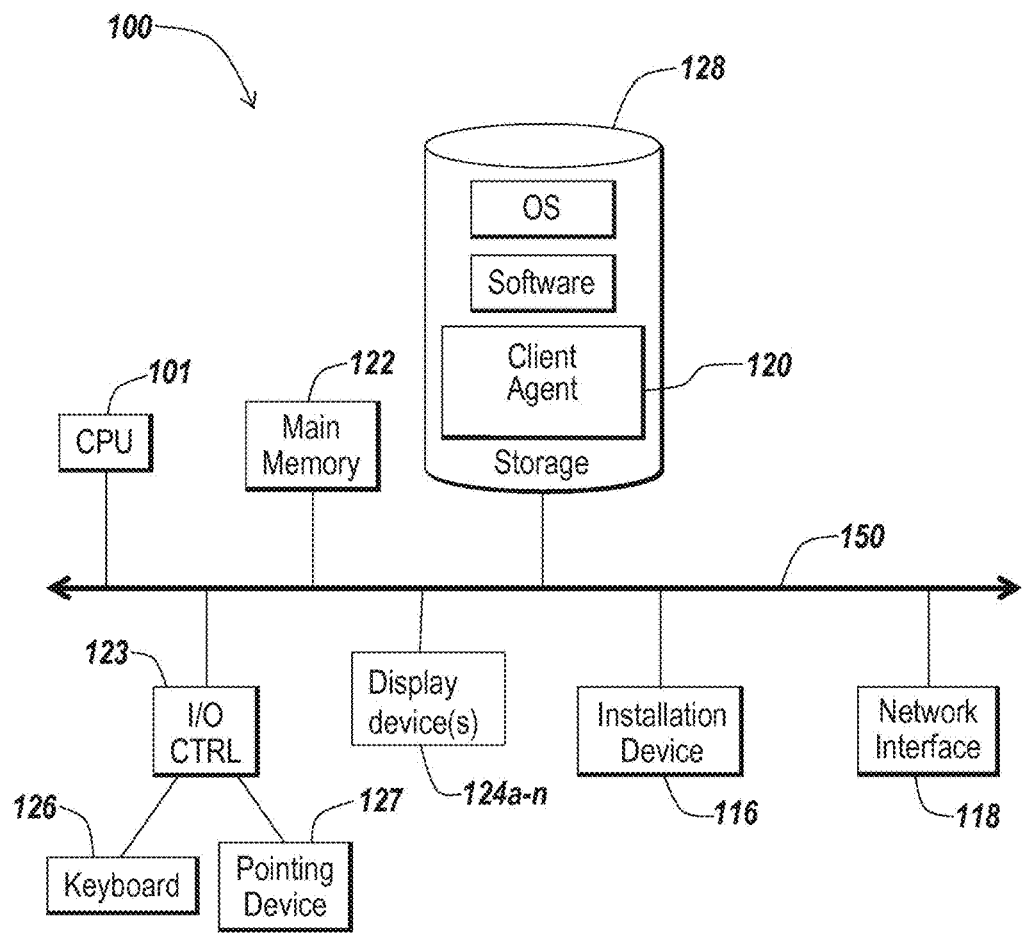
FIGS. 1E-1H are block diagrams of embodiments of a computing device.
Figure 1F:
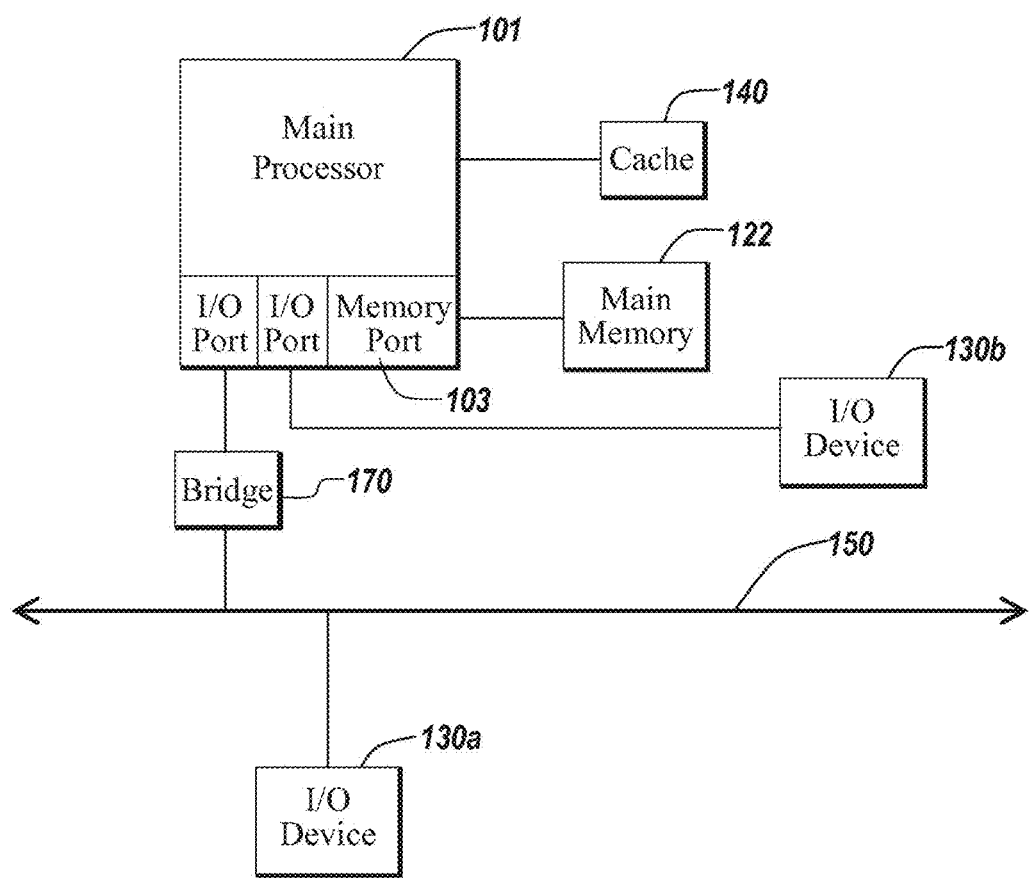

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
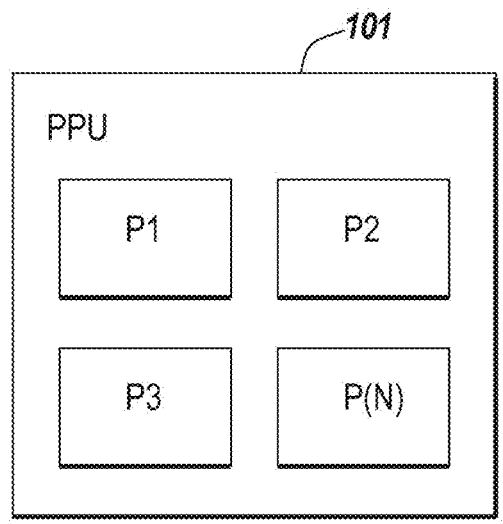

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
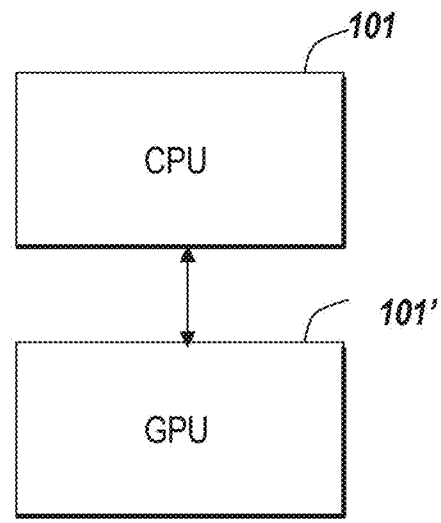

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
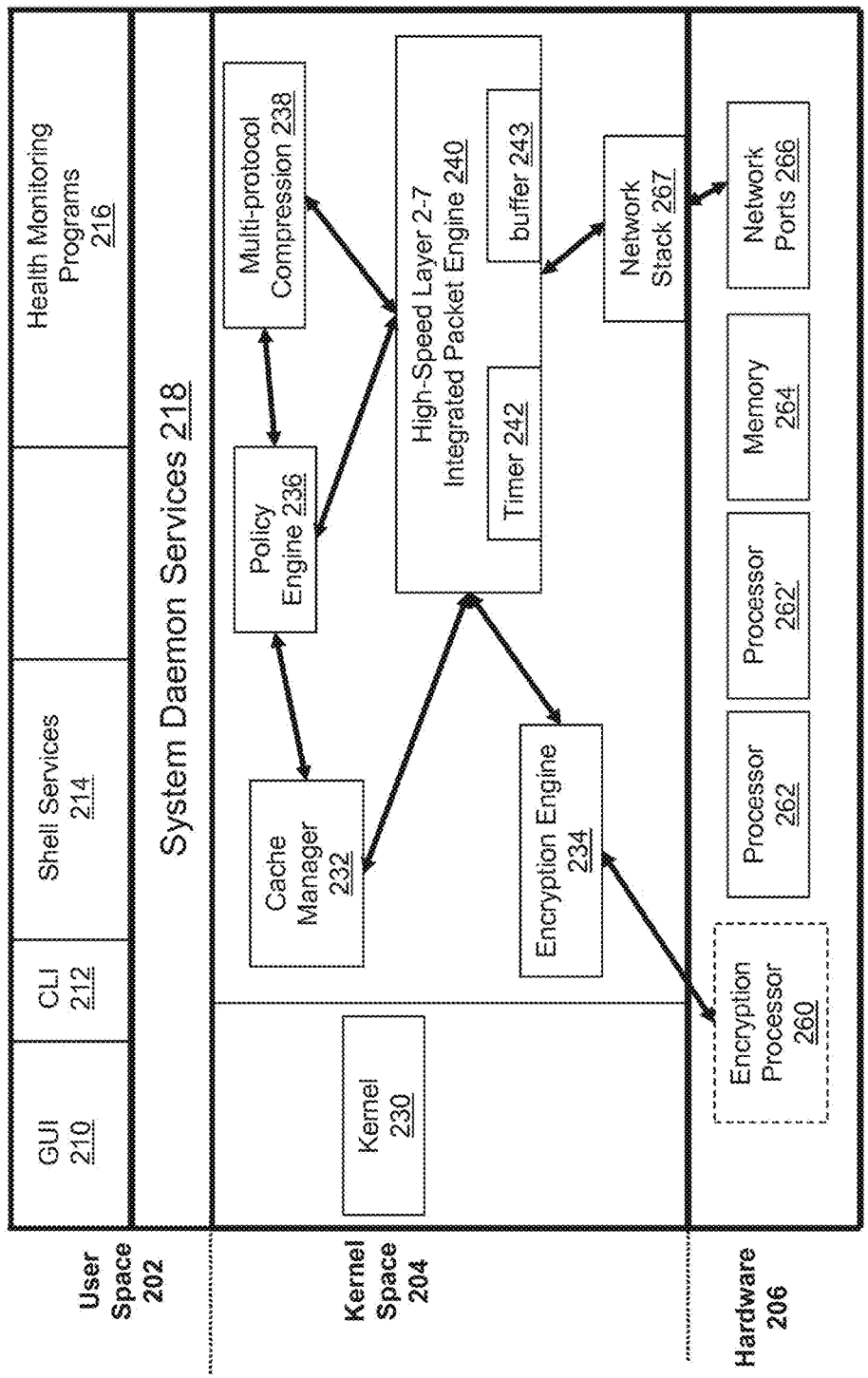
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2A, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202.

In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, e.g., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
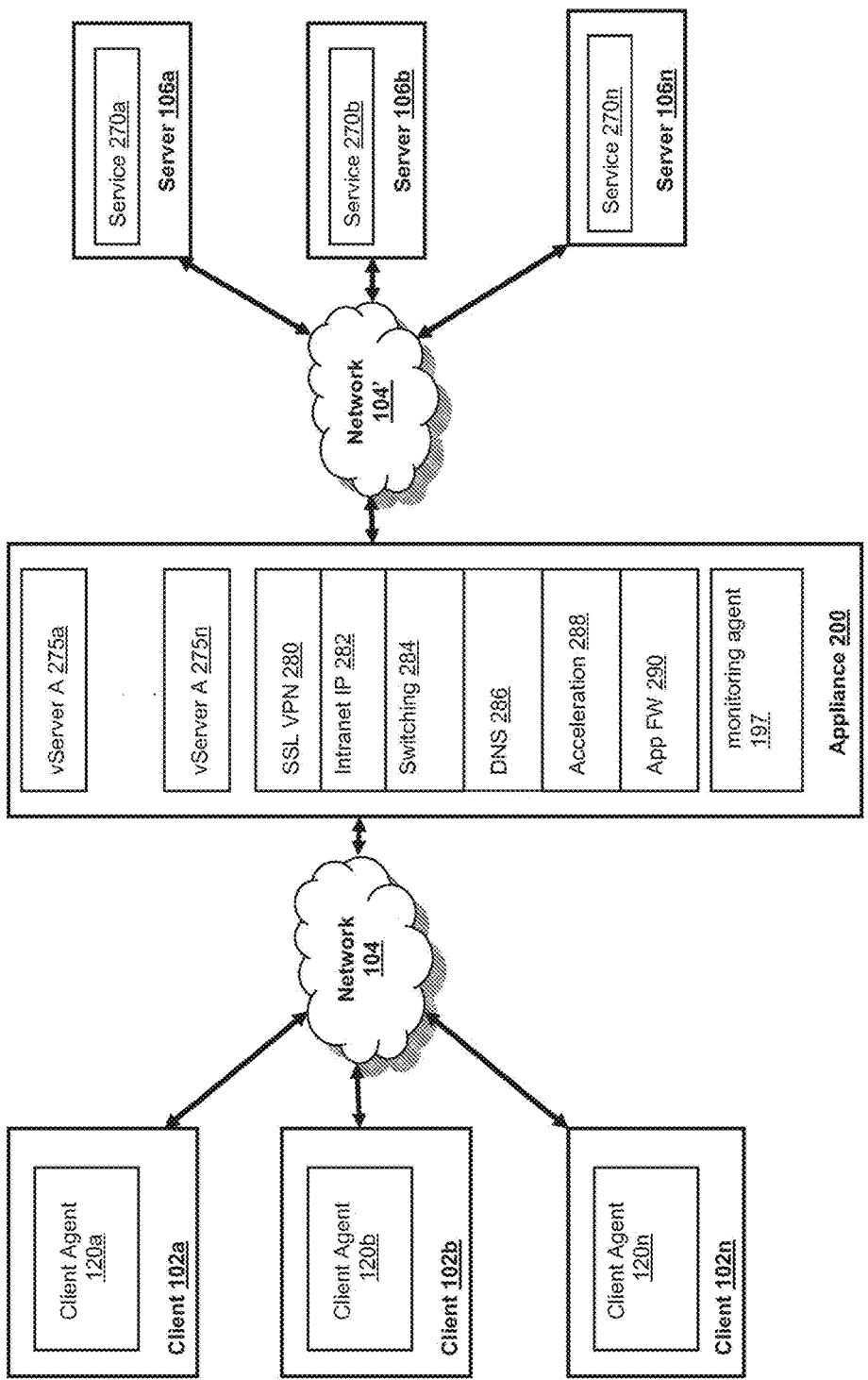
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
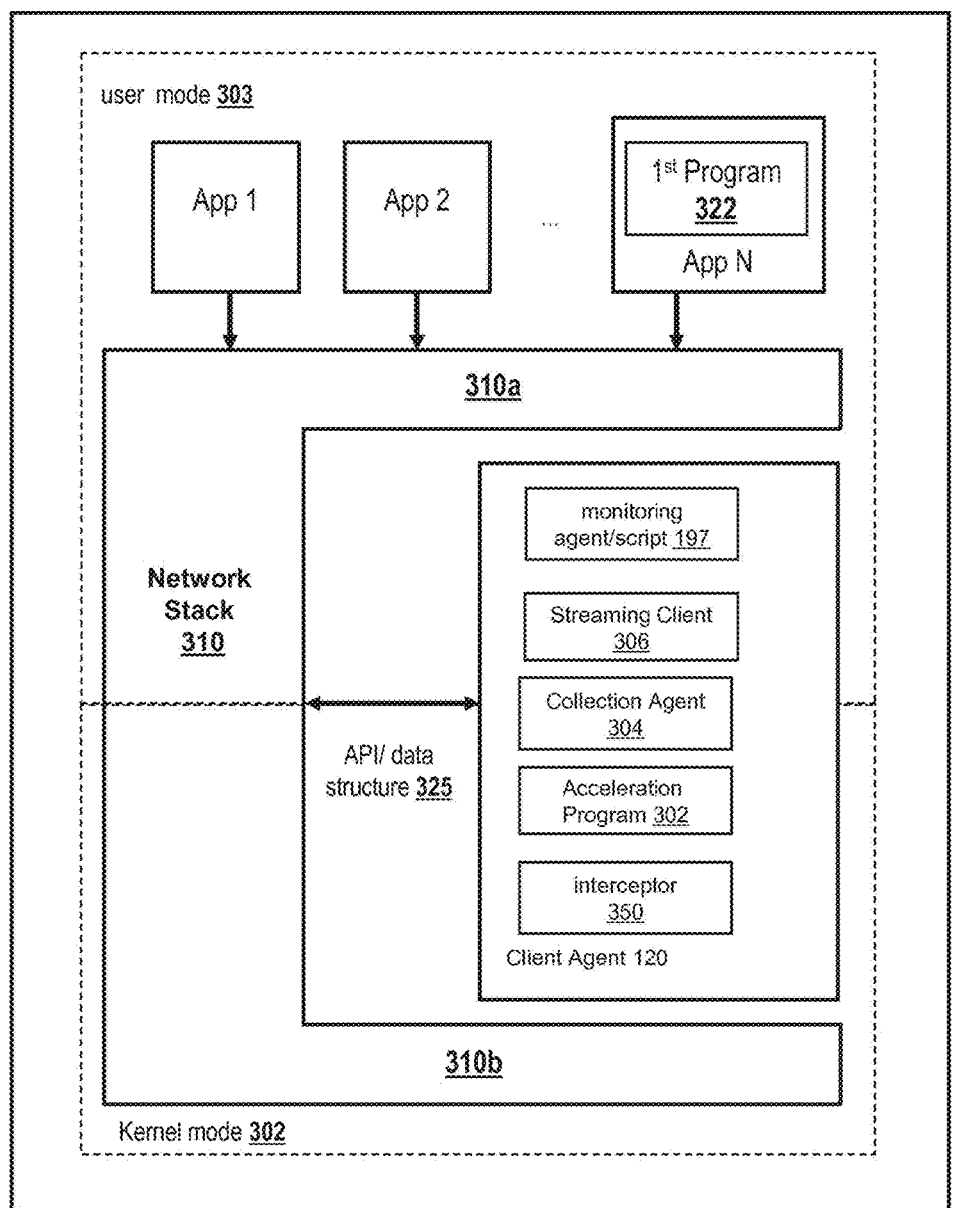
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
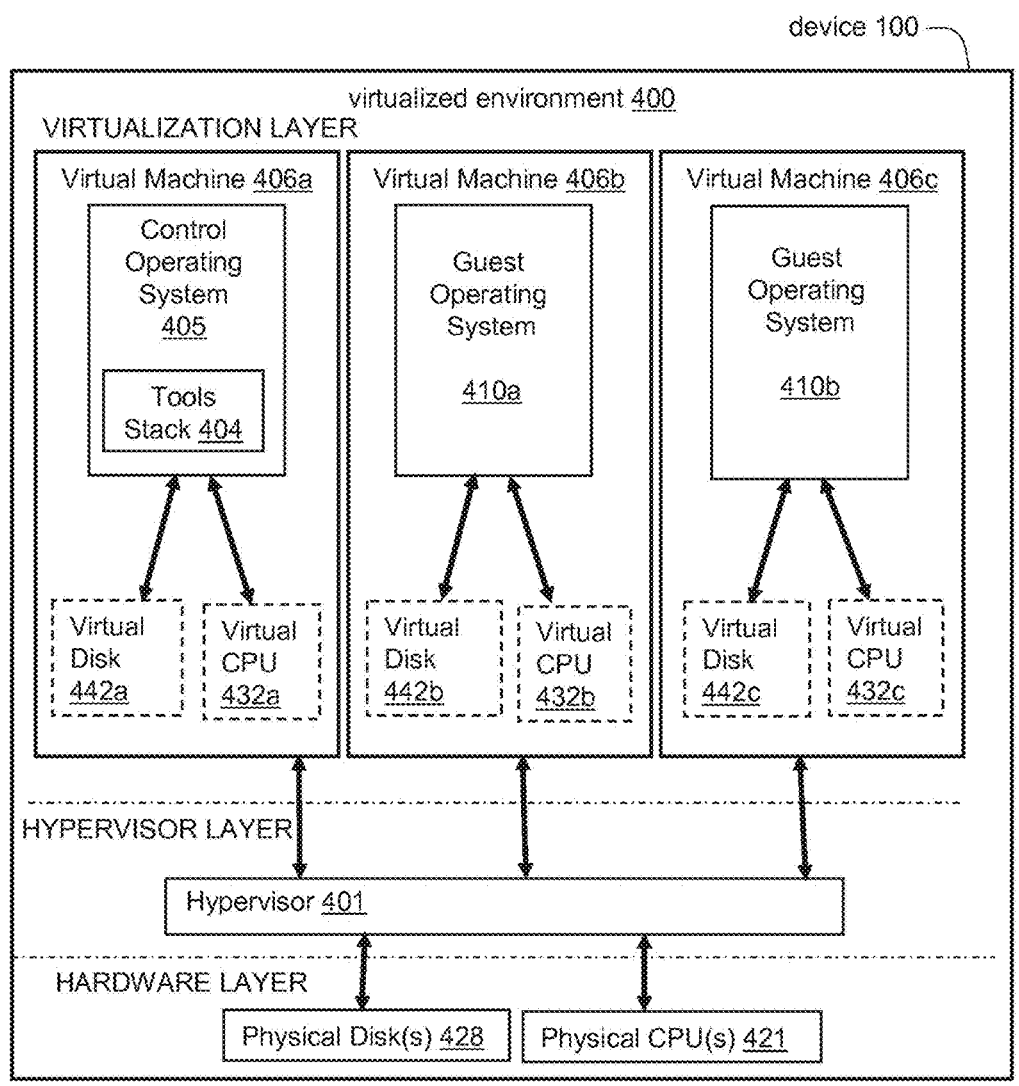
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
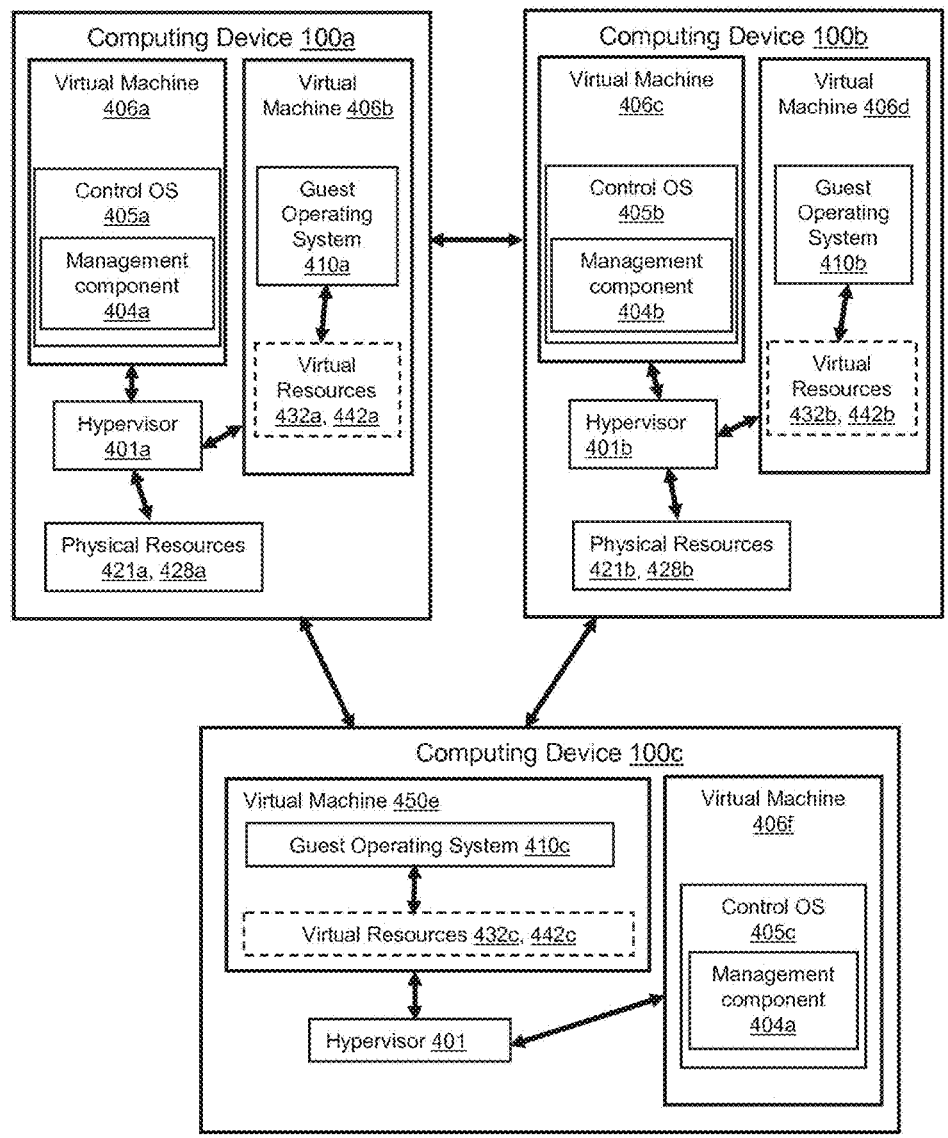
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
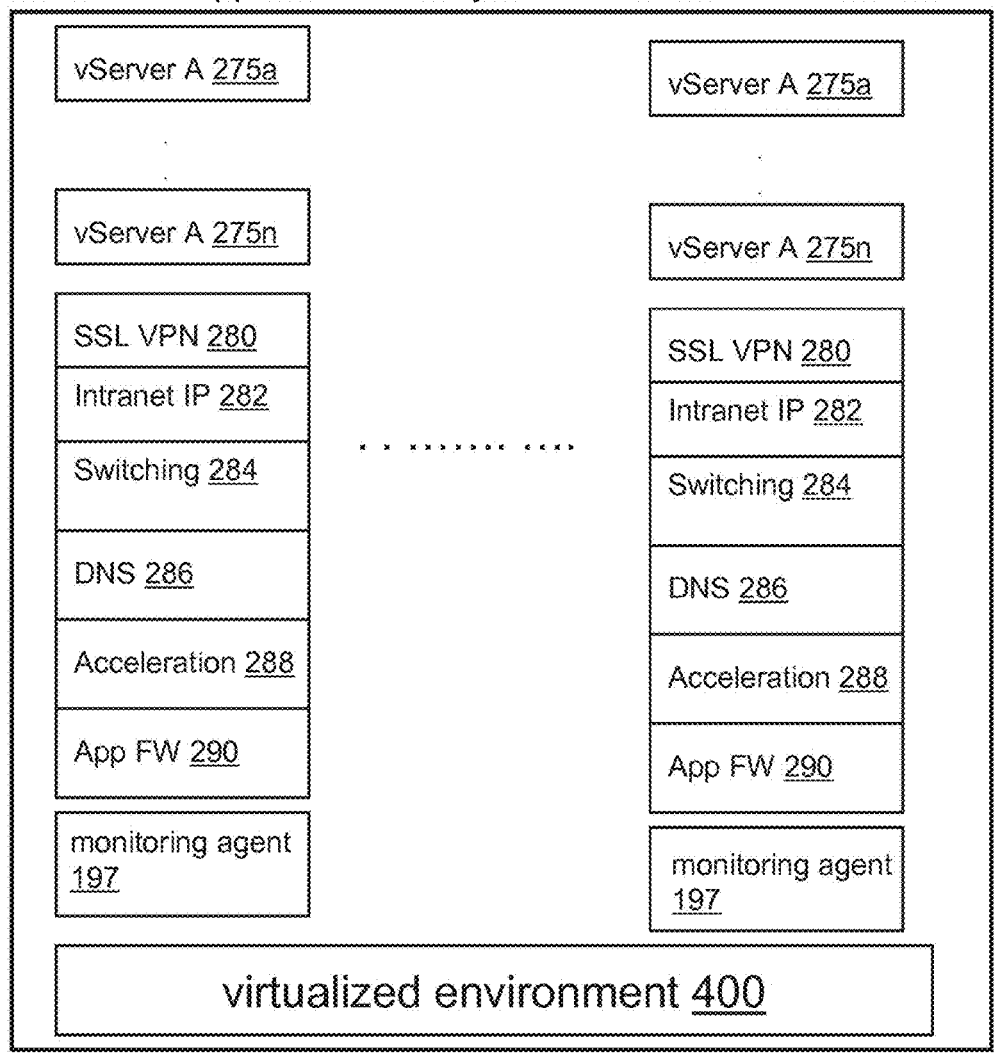
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
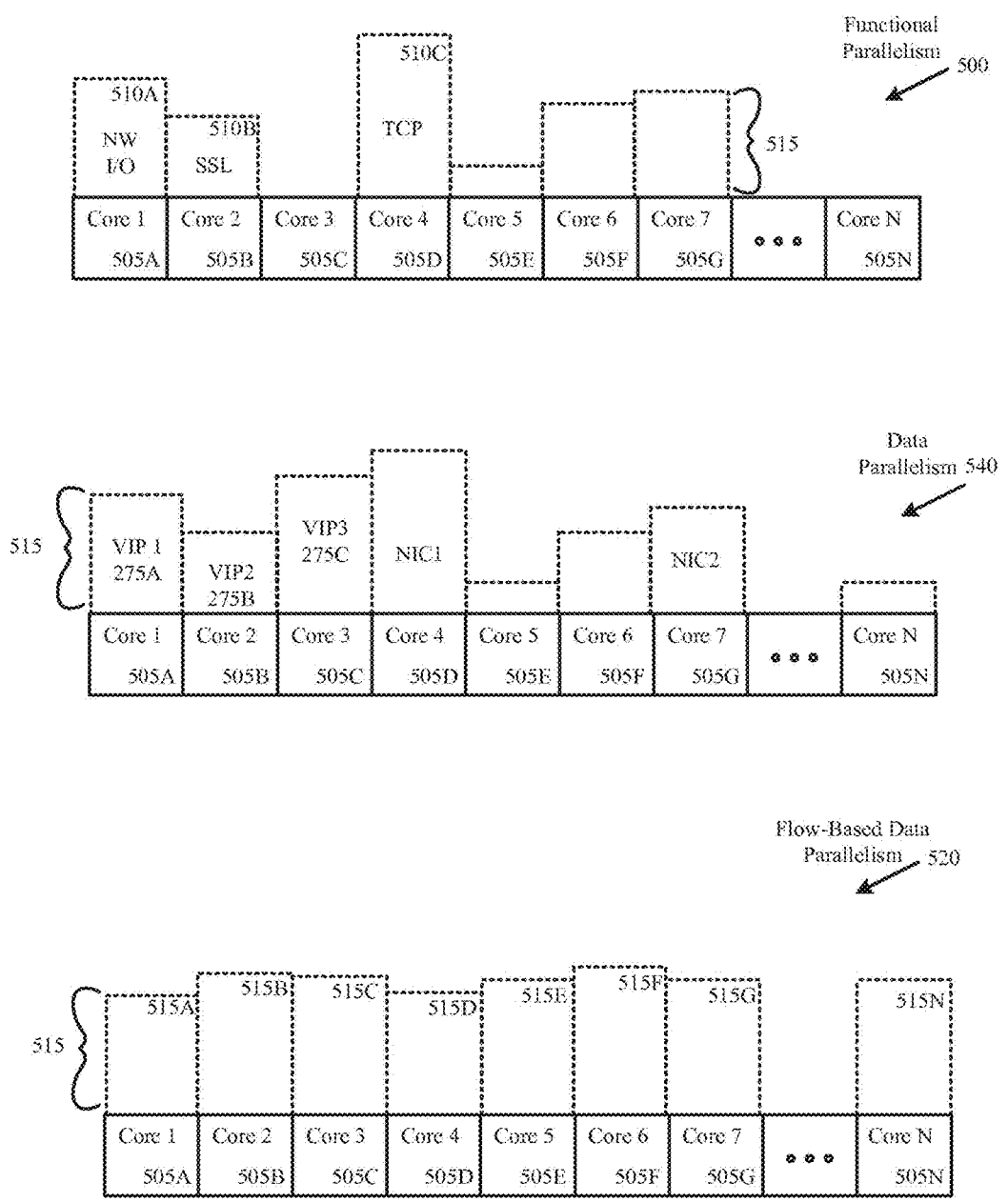
FIG. 5A are block diagrams of embodiments of approaches to implementing parallelism in a multi-core system.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
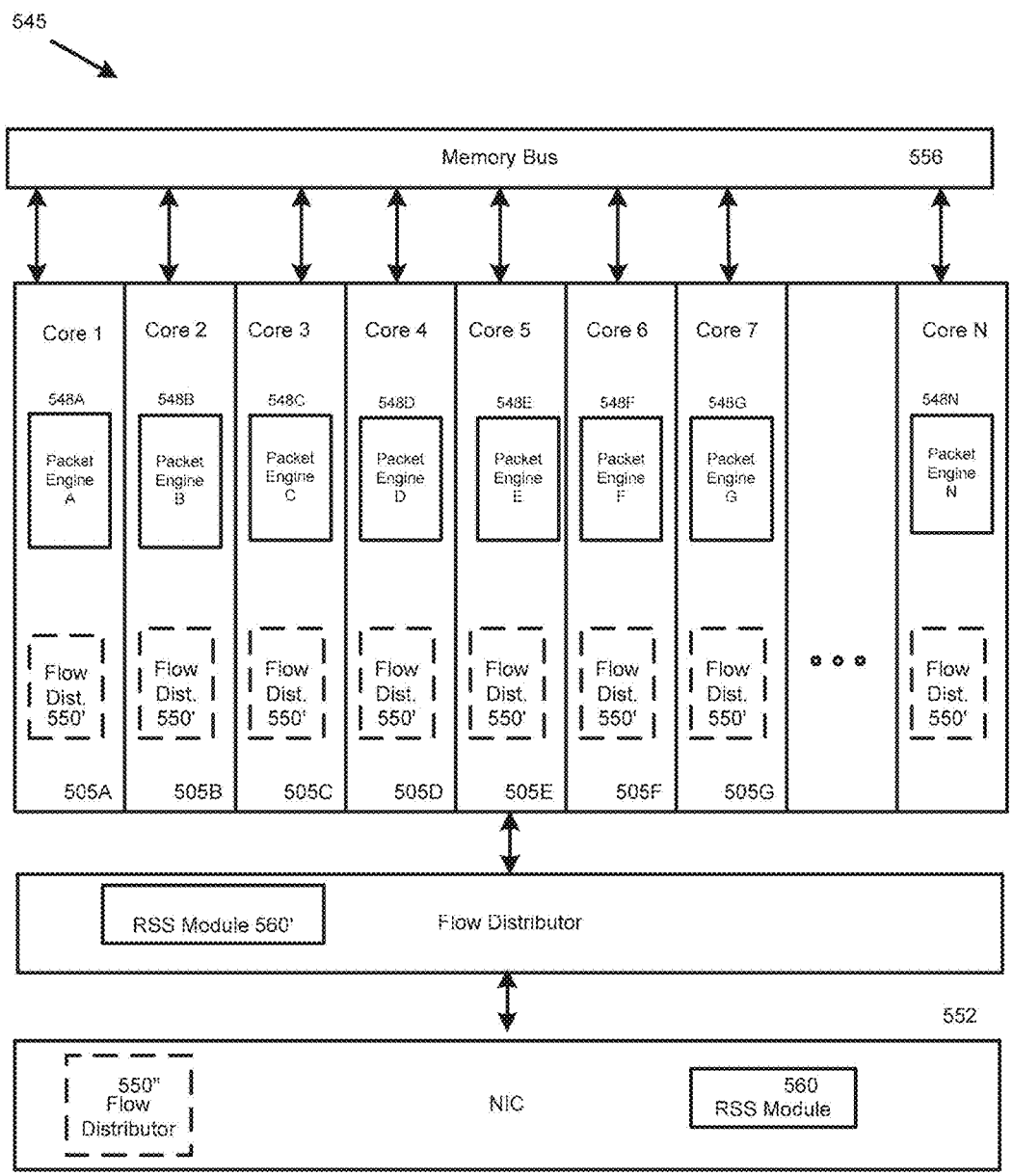
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A.

Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one or more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments, the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505. The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

4-tuple of source TCP Port, source IP version 4 (IPv4) address, destination TCP Port, and destination IPv4 address.

4-tuple of source TCP Port, source IP version 6 (IPv6) address, destination TCP Port, and destination IPv6 address.

2-tuple of source IPv4 address, and destination IPv4 address.

2-tuple of source IPv6 address, and destination IPv6 address.

2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
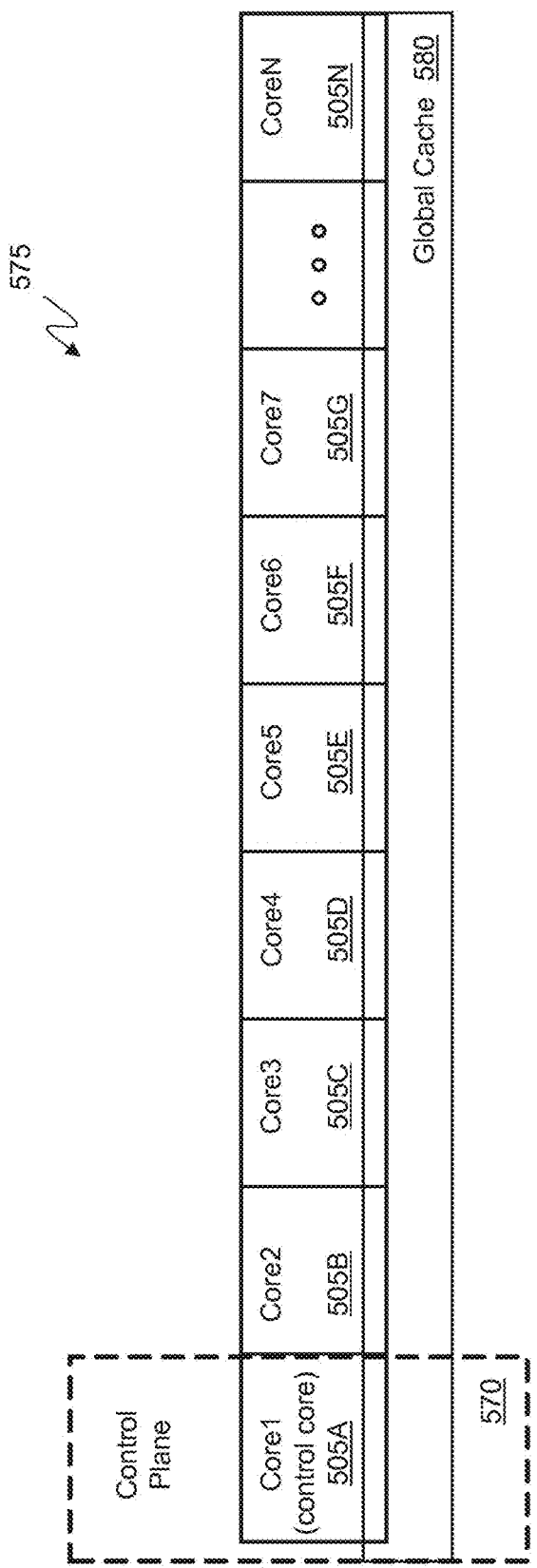
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505.

In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Policy Based Transparent Client IP Address Insertion

Referring now to FIG. 6A, an embodiment of a system for maintaining a source internet protocol (IP) address of a client request while redirecting the client request to a cache server. In brief overview of FIG. 6A, an intermediary device, also referred to as an intermediary 200 or appliance 200, is deployed between one or more clients 102 and one or more servers 106. The intermediary 200 includes a packet engine 548 comprising a cache redirector 600. The cache redirector 600 may include a configuration 605 and a policy 610. The intermediary 200 may be in communication with a cache server 620. Cache redirector 600 may redirect network packets, such a request from the client 102, to the cache server 620 for faster access to the content requested by the client 102. Prior to sending the client request to the cache server 620, cache redirector 600 may implement functions to maintain the original source IP address from the client request even if the client request sent to the cache server 620 is returned by the cache server 620.

In further overview, the intermediary may establish a transport layer connection with the client, referred to for convenience as a first transport layer connection. The intermediary may establish another transport layer connection with the cache server, referred to for convenience as a second transport layer connection. The cache server may establish a transport layer connection with the intermediary, referred to for convenience as a third transport layer connection. The intermediary may establish a transport layer connection with the server, referred to for convenience as a fourth transport layer connection.

The system depicted in FIG. 6A may correspond to an embodiment in which an intermediary 200 uses the cache redirector 600 along with the configuration 605 and policy 610 to modify client requests to ensure that the source IP address of the client requests is maintained. As the intermediary may use a cache server 620 for caching of content requested by the clients 102 in order to facilitate a more efficient access to the content, the intermediary 200 may forward a client request to a cache server 620. In order to ensure that the client IP address of the client request is preserved as the source IP address, the intermediary 200 may insert the client IP address into the header of the client request prior to forwarding the request to the cache server 620. In such embodiments, should the cache server 620 determine that the content requested is not cached by the cache server 620 or that the requested content is expired, outdated or invalid, the cache server 620 may return the client request back to the intermediary 200. Since the original source IP address of the client request was entered in the header of the request, the intermediary 200 may still retrieve the original source IP address even though the client request was received from the cache server 620. The intermediary 200 may then forward the client request even upon the cache miss by the cache server 620 to the intended destination server 106 while maintaining or preserving the client IP address as the source IP address.

Cache redirector 600 may comprise any hardware, software or any combination of hardware and software for redirecting, forwarding, modifying or managing network packets transmitted between the intermediary 200 and the cache server 620. Cache redirector may comprise any functionality of a virtual server 275 or a backup virtual server 276. In some embodiments, cache redirector 600 is a virtual server configured on an intermediary 200. In some embodiments, a virtual server may be configured as a Cache Redirector vServer, referred to as a CR vserver. Cache redirector 600 may include any logic circuits, processors, functions, programs, algorithms or components that alone, or in combination, may provide functionality for redirecting, forwarding, modifying or managing network packets traversing the intermediary 200. Cache redirector 600 may include any functionality to modify, redirect and forward network packets, such as the client requests, server responses, or any data or communication to a cache server 620.

Cache redirector 600 may also include any functionality to receive and manage any responses or requests that are received from the cache server 620. In some embodiments, cache redirector 600 communicates, redirects, receives or forwards network packets to and from any network devices or environments, such as other appliances 200, application servers, proxies, routers, virtual servers 275, other clients 102 or servers 106. Cache redirector 620 may include functions, algorithms, devices and components for establishing, terminating, controlling or managing any connections with a cache server 620. Cache redirector 600 may modify, edit or rewrite a portion of a network packet, such as for example a header or a body of the network packet. In some embodiments, cache redirector 600 modifies or edits a client request redirected or forwarded to a cache server 620 such that an internet protocol address is included or written in a portion of the client request. In further embodiments, cache server 600 modifies or edits a client request received from the cache server 620 to include the IP address stored in the header of the request as the source IP address of the client request. Cache redirector 600 may be comprised by, or in communication with, any of the packet engine 548, virtual server 275, or any other component of the intermediary 200. Cache redirector 600 may include any number of configurations or settings, such as configuration 605. Cache redirector 600 may include any number of rules or policies such as policy 610.

Cache redirector 600 may be configured to include any feature or functionality to support any type and form of protocol or system configuration. In some embodiments, cache redirector is configured to support HTTP and TCP-based protocols. In some embodiments, cache redirector 600 is configured for TCP-based protocols, IP based protocols or any protocols of communication at any level of the network stack. Cache redirector 600 may include one or more modes of operation for redirecting or forwarding the network traffic between any network devices on a network 104. In some embodiments, cache redirector 600 includes a mode for forwarding or receiving the network traffic to and from an origin server or a destination server. Cache redirector 600 may also include a mode for forwarding and receiving the network traffic in accordance with one or more policies which may be configured on the system. Cache redirector 600 may be configured to forward network traffic across one or more virtual servers 275. Cache redirector 600 may be configured to perform any actions or operations based on any number of cache redirection policies, such as a policy 610. The cache redirection policies, such as the policy 610, may provide cache redirector 600 with information to identify cacheable and non-cacheable requests for every communication which may include any type and form of a TCP communication, HTTP transaction or any other communication transmitted between the client 102 and server 106 via the intermediary 200.

Configuration 605 may include any type and form of setting, instruction or a parameter for identifying, activating or triggering operation for maintaining or preserving an IP address of a network packet by the cache redirector 600. Configuration 605 may include a parameter, a setting, a function, an instruction, a character, a string or a command. Configuration 605 may be stored in any memory location of intermediary 200 or cache redirector 600. In some embodiments, configuration 605 is stored within one or more instructions or policies for managing operation of intermediary 200 or the cache server 620. Configuration 605 may be connection based, session based, client 102 based, server 106 based or based on any configuration by a user or an administrator. Configuration 605 may be set or configured for all network packets transmitted via a particular connection, a particular session, from a particular client 102 or a user on the client 102 or transmitted in connection with a particular server 106. In certain embodiments, configuration 605 is preconfigured or preset by a user. Configuration 605 may be installed on the cache redirector 600 or the intermediary 200 in accordance with a setting for a policy 610. In some embodiments, configuration 605 is received from a client 102 or a server 106 to specify the handling of the IP addresses, such as the preservation of the source or the destination IP address by the intermediary 200 and the cache server 620 upon missed cache requests.

Configuration 605 may identify or trigger a set of policies or instructions for operations to be performed to the network packets being forwarded or transmitted between the cache redirector 600 and cache server 620. In some embodiments, configuration 605 includes an information identifying or triggering an operation to write or include an IP address of a network packet inside of a portion of the network packet such as the header or the body. In some embodiments, the IP address to be included is the source IP address, such as the IP address of the source client 102 which originally transmitted the network packet. In some embodiments, configuration 605 identifies a policy 610 that identifies a set of rules or instructions identifying for which network packets to maintain or preserve the IP address. Configuration 605 may identify for the cache redirector 600 that network traffic of a particular connection or a session that will be serviced so that the source IP address of the received network packet is preserved even if the network packet is sent to a cache server 620 and received from the cache server 620. In some embodiments, configuration 605 identifies that the network packets from a specific client 102 or to a specific server 106 will be serviced to maintain the source IP address of the network packet.

Configuration 605 may include an instruction or a directive for identifying a policy 610 to be used by the cache redirector 600 to modify the network packets forwarded to the cache server 620. Configuration 605 may include an information or a setting for determining whether or not to maintain original source IP address from a received request. For example, configuration 605 may identify a specific operation which preserves a source IP address of a network packet in accordance to a policy 610. The configuration 605 may identify a policy 610 which may further specify a set of steps or operations to be performed by the intermediary 200, cache redirector 600 on the network packet. In some embodiments, such set of steps includes instructions to copy a source IP address of the network packet into a string of a portion of a header of the network packet, prior to forwarding the network packet to the cache server 620.

A configuration 605 of a cache redirector 600 of the intermediary device 200 may further include settings or expressions for extracting or obtaining an IP address from a network packet received from a cache server 620. A configuration 605 of the cache redirector 600 may include instructions or code, such as the following:

add cr vserver cr1 http*80—originUSIP (ON|OFF)—srcIPExpr <PI expression>.

The value of the originUSIP may be OFF or ON, depending on the configuration. In some embodiments, a value of ON indicates to maintain the original IP address of the client when communicating to the server and value OFF indicates not maintain the original IP address. The expression "srcIPEXPR" may be an expression used to extract a string from the request, such as the client request. This extracted string may be converted into an IP address. In some embodiments, a request may be received or returned from a cache server when the cache server cannot provide content requested by the request. In such embodiments, upon receiving the client request from a cache server, cache redirector may determine that expression srcIPExpr has been configured. In response to this determination, cache redirector may convert the extracted string to an IP address. This address may then be used to override globalUSIP or Originusip configurations if necessary. In some embodiments, if a client request received from a cache server 620 is destined to a destination, and if the originUSIP has been configured on the cache redirector, then the outgoing connection may be created using the client connection Source IP and the client request may be forwarded to the intended destination.

The configuration may include one or more policies for directed whether to maintain the client IP address and rules on how to maintain the IP address. For example, the configuration may comprise the following policy information:

add cr vserver cr1 http*80—originUSIP (ON|OFF)—srcIPExpr <PI expression>.

The originUSIP may be a policy for the cr Vserver to determine whether or not to maintain the original client IP address. The srcIPExpr may be a rule of the policy to determine how to obtain the client IP address from the redirected packet from the cache.

The intermediary device and/or cache redirector may include any embodiment of a policy engine 236 or 195 as previously described herein. The policy engine may operate on or execute any one or more policies. Policy 610 may include any configuration or information for maintaining IP address of a network packet, such as a policy for a CR vServer. Policy 610 may comprise an algorithm, an executable, an instruction code, a computer program, a configuration, a command or a directive. Policy 610 may be stored in memory of the intermediary 200 or cache server 620. In some embodiments, policy 610 includes a rule identifying or providing a set of instructions to be implemented by the cache redirector 600 or the cache server 620. The set of instructions identified or provided by the policy 610 may be for writing or copying an IP address into a portion of a network packet. In some embodiments, the set of instructions are for retrieving the IP address from the portion of the network packet. In further embodiments, the set of instructions are for inserting the retrieved IP address back into the network packet or modifying the network packet to the state or configuration it was in before being received by the intermediary device 200.

Policy 610 may provide any policy or one or more rules for cache redirector 600 or the cache server 620 to handle, edit or modify a network packet in order to maintain an IP address, such as the source IP address or the destination IP address. Policy 610 may include or identify a set of rules or tasks for storing, copying or writing an IP address of a network packet into a portion of the network packet, such as the header or the body of the same network packet. In some embodiments, policy 610 identifies or provides rules for storing or writing an IP address of a first network packet into a header or a body of a second network packet. The second network packet may enclose or comprise the first network packet. Policy 610 may further identify or provide a set of rules or tasks for retrieving an IP address from a portion of the network packet or from the portion of the second network packet. In some embodiments, policy 610 identifies actions or steps for writing an IP address into a header of a network packet in a form of a string of characters, numbers or letters. Policy 610 may be triggered on the cache server 620 for maintaining the IP address while the network packet is handled by the cache server 620. Policy 610 may include any functionality for instructing the cache redirector 600 or the cache server 60 to modify a network packet accordingly so that the source IP address or the destination IP address of the network packet will be preserved even if the cache server 620 returns the network packet back to the intermediary 200 upon not fulfilling a request to retrieve the content requested by the network packet.

Cache server 620 may comprise any hardware, software or a combination of hardware and software for locally storing and providing the content requested by clients 102. Cache server 620 may comprise any functionality of a server 106, cache engine, proxy server or an intermediary 200, including processors, memory and the functionality to communicate with other network devices. Cache server 620 may comprise any functionality for locally storing any content, such as the web pages or other internet content provided by other servers 106. Cache server 620 may include any functionality to provide the locally stored content, such as the web pages or other internet content to the intermediary 200. In some embodiments, cache server 620 receives from the intermediary 200 requests, such as client requests, for content stored in the storage of the cache server 620. Cache server 620 may include any functionality for determining if the stored content is present in the memory. In some embodiments, the cache server 620 determines if the content requested by the request is valid or invalid. In some embodiments, valid content may be content that is stored and not expired or not outdated. In some embodiments, invalid content may be content that is not stored or that is stored but outdated, expired or corrupted. Cache server 620 may send to the intermediary 200 the content requested by the request if the content is valid. In some embodiments, if the content is invalid or the cache server 620 cannot find or fulfill the request, the cache server 620 sends the request back to the intermediary 200.

Cache server 620 may be configured to handle to preserve an original source IP address of request received from the intermediary 200 upon returning of the request back to the intermediary 200. In some embodiments, cache server 620 is configured such that the source IP address or the destination IP address of the request is maintained or preserved within the request sent back to the intermediary even if the content requested by the request is not sent back to the intermediary 200. In some embodiments, cache server 620 is aware of the configuration 605 and policy 610 of the intermediary 200. In other embodiments, cache server 620 is not aware of the configuration 605 and policy 610 of the intermediary 200. In some embodiments, the source IP address of the request is modified by cache server 620 to include the IP address of the intermediary 200 instead of the original source IP address. In other embodiments, the source IP address of the request is not modified by the cache server 620. Cache server 620 may include functionality to maintain the original source IP address of the request within the header of the request as inserted by the cache redirector 620 prior to forwarding the request to the cache server 620. Cache server 620 may send the request back to the intermediary 200 via the same connection via which the request was received or via a different or new connection.

Figure 6B:
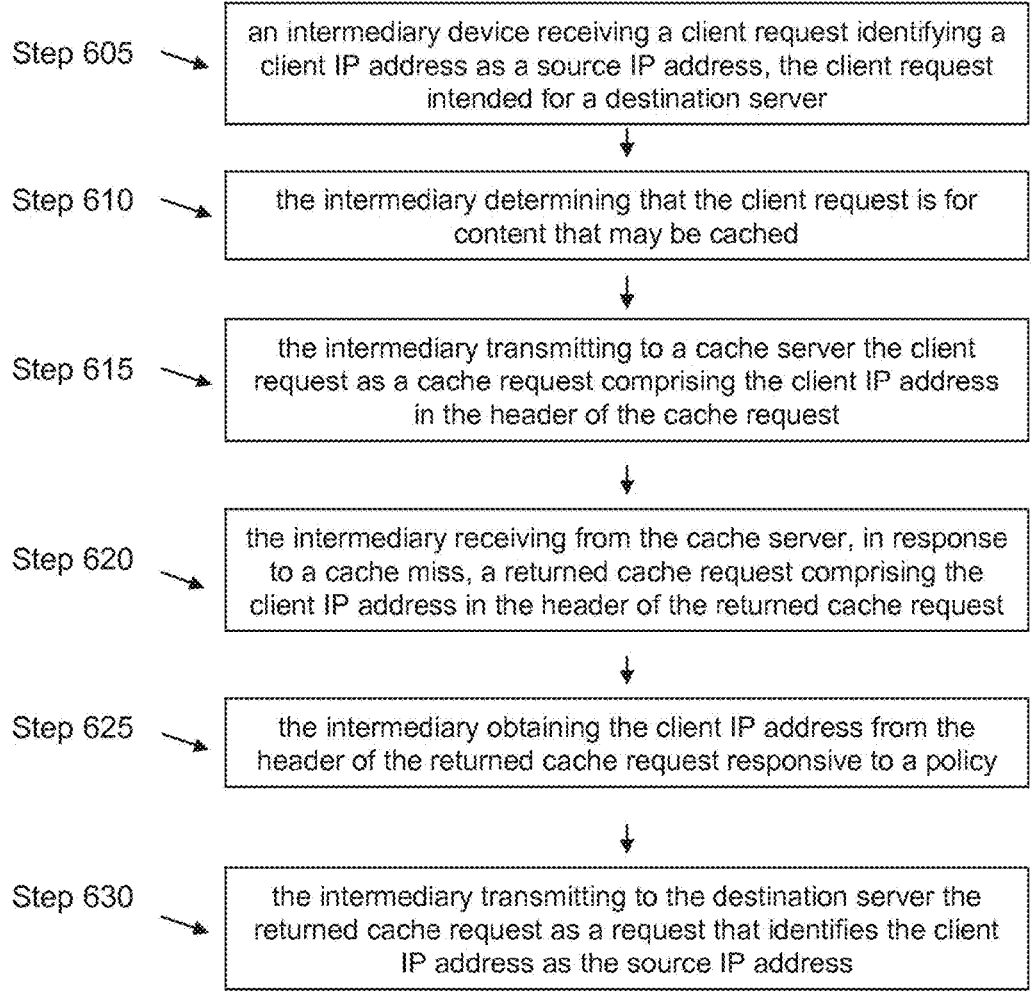
FIG. 6B is a flow diagram of an embodiment of steps of a method for maintaining, by an intermediary device, the original IP address of a client request while performing cache redirection.

Referring now to FIG. 6B, an embodiment of steps of a method for maintaining a source IP address of a client 102 request received from a cache server 620 upon a cache miss by the cache server 620 is illustrated. At step 605, an intermediary network device 200 receives from a client 102 a request destined to server 106, where the request identifies an IP address of the client 102 as the source IP address. At step 610, the intermediary 200 determines that the client request is for content that may be cached by the cache server 620. At step 615, the intermediary 200 transmits to the cache server 620 the client request as a cache request which is modified to include the IP address of the client 106 in the header of cache request. At step 620, the intermediary receives from the cache server 620 a returned cache request in response to a cache miss by the cache server. The returned cache request includes the client IP address in the header and a source IP address that is modified by the cache server 620. At step 625, the intermediary 200 obtains the client IP address from the header of the cache request in response to a policy 610. At step 630, the intermediary 200 transmits to the destination server 106 the client request that includes the IP address of the client 102 as the source IP address of the client request.

At step 605, an intermediary device 200 receives from a client 102 a client request destined for server 106 and identifying the IP address of the client 102 as the source IP address. The client request may be received via a transport layer connection between the client and intermediary device. The intermediary device may receive a plurality of requests from one or more clients. In some embodiments, the intermediary receives the request via an established transport layer connection, such as a TCP connection. In other embodiments, the intermediary 200 receives the request via an established session to a client 102 or a session between a client 102 and a server 106. The client request may request for a particular type and form of content or service provided by server 106. The client request may comprise a URL for a particular page, which may further identify one or more objects to be received by the requesting client. In some embodiments, the content requested by the client request includes any type and form of web content, such as the HTTP, HTML, XML, audio, video, graphics, presentation, data stream or any type and form of service or application content.

At step 610, intermediary 200 determines that the client request is for content that may be cached. In some embodiments, intermediary 200 parses the client request. The intermediary 200 may identify, via parsing, that a portion of the request references a webpage, a file, a picture, a video or audio stream, a graphical feature, a portion of text or a document. The intermediary 200 may determine that a portion of the request, such as the URL, a portion of the text, a document or an object identifies content that may be cached. Intermediary 200 may determine that any portion of the client request identifies components which may be stored or cached at a cache server 620. The intermediary 200 may make a determination using a compression history or history of the network traffic traversed. In some embodiments, the intermediary 200 maintains a communication with the cache server 620 and receives information from the cache server 620 to be used to identify the content that may be cached. In some embodiments, the intermediary may determine that the client request may be for cacheable content based on one or more policies.

At step 615, the cache redirector 600 modifies the client request to include the IP address of the client from the source of the client request into the header of the client request and transmits the modified client request to the cache server 620 as a cache request. Intermediary 200 may transmit to cache server 620 the client request via a connection established between intermediary 200 and cache server 620. The cache redirector 600 may transmit the modified client request as the cache request via a second transport layer connection between the intermediary and the cache server while the intermediary previous received the client request via a first transport layer connection between the intermediary and the client. In some embodiments, the client request is modified and transmitted to the cache server 620 as the cache request in response to the determination, at step 610, that the client request is for the content that may be cached.

The cache request may be the modified client request to include the IP address in the portion of the client request, such as the header or the body. In some embodiments, the cache request is a network packet that encloses or includes the client request. The cache redirector 600 may store or write a source IP address and/or a destination IP address from the original client request into the header of the cache request. In some embodiments, cache redirector 600 copies the IP address from the source of the client request and/or from the destination of the client request into a portion of the client request prior to forwarding the request to the cache server 620 as the cache request. In certain embodiments, the client IP address is obtained from the source IP location of the client request and written in a portion of the header, a portion of the body, or a portion of the payload of the cache request. The client IP address may be stored in or written into a TCP header. In some embodiments, the client IP address is stored or written into a header of an application layer protocol. For example, the cache request may be modified to include the client IP address in an HTTP header. In some embodiments, the client IP address is included in an X-forward header or X-real-ip header of an HTTP request.

The client IP address may be entered into the cache request or the client request in the form of numbers, characters, string of characters or any other format. The client IP address may be included into a second request, such as a cache request, which may comprise the client request. In some embodiments, cache redirector 600 inserts or writes the IP address from the source of the client request into a header of the cache request which comprises or envelops the client request. The cache redirector 600 may forward the cache request to the cache server 620.

At step 620, the intermediary 200 receives from the cache server 620 a returned or a missed cache request. The intermediary device may determine the request is from the cache server based on the port that the request is received. For example, a port number or range of numbers may be designed as a cache proxy port. In other embodiments, the intermediary device may determine the request is from the cache based on any tuple information about the connection. The returned or the missed cache request may be received by the intermediary 200 via a third transport layer connection between the cache server 620 and the intermediary 200. The cache request may comprise the client request. In some embodiments, the cache request is a client request modified to include the client IP address in a header of the client request. The returned or missed cache request may be the client request modified by the cache server 620. The modified client request may be modified by the cache server 620 to include an IP address of the intermediary 200 as the source IP address. The modified client request may further comprise the client IP address written in the header of the request, or the body of the request. In some embodiments, the returned or missed cache request is the cache request from the step 615 which has been modified by the cache server 620 to include the IP address of the intermediary 200 as the source IP address. The cache request may further comprise the client IP address stored in the header of the cache server modified cache request. The client request may be returned from the cache server 620 to the intermediary 200 whenever the cache server 620 upon receiving the request for content requested by the client request is not able to provide the content requested. The returned cache request may be returned to the intermediary 200 in response to a cache miss by the cache server 620. The cache request may be not implemented or may be missed due to any number of reasons. In some embodiments, the cache is missed because the content requested by the client request is not cached by the cache server 620. In some embodiments, the cache is missed because the cache server 620 determines that the content requested is expired, outdated or invalid. In some embodiments, the cache is missed because the content is damaged or corrupted. In further embodiments, the cache is missed because the cache server 620 is incapable of servicing the request. The cache server may maintain the client IP address in the same header as provided by the intermediary. In other embodiments, the cache server may write or store the client IP address in a different header.

At step 625, the intermediary 200 obtains the client IP address stored in the cache request received from the cache server 620. In some embodiments, a policy 610 initiates an action by the cache redirector to obtain the client IP address from the received cache request in response to a policy 610. A rule of the policy, such as an expression, may be evaluated in order to identify, parser or extract the client IP address from the request received from the cache.

The policy 610 may further specify to replace the source IP address of the cache request with the client IP address to form a request to send to the destination server. The policy 610 may initiate or specify other functions to modify the cache request to resemble the client request which was originally received from the client 102. The client IP address may be obtained in response to the policy 610 in order to restore the client IP address the source IP address and thereby maintain the source IP address as originally received at step 605. In some embodiments, upon obtaining the client IP address stored in the header of the cache request, the cache redirector 600 modifies the cache request to include the source IP address from the header of the cache request into the source of the cache server 620 modified cache request. Similarly, the cache redirector 600 may modify the cache request received from the cache server 620 to include the destination IP address stored in the header of the client request into the destination of the client request or the cache request. Intermediary 200 may modify the cache request to resemble the client request as was received by the intermediary at step 605.

At step 630, the intermediary 200 transmits to the destination server 106 the client request that includes the IP address of the client 102 as the source IP address of the client request. The client request may include the cache request modified to include the client IP address stored in the header or the body of the cache request as the source IP address of the client request. The client request may include the cache request modified to include the destination IP address which was stored or written in the header of the body of the request as the destination IP address of the request. Intermediary 200 may transmit the client request to the destination server 106 upon ensuring that the source IP address and/or the destination IP address are modified to reflect their original settings. The client request may be transmitted to the destination server 106 via a transport layer connection between to the intermediary and server, referred to as a fourth transport layer connection. The client IP address may be stored in or written into a TCP header of the request sent to the destination. In some embodiments, the client IP address is stored or written into a header of an application layer protocol of the request sent to the destination. For example, the cache request may be modified to include the client IP address in an HTTP header. In some embodiments, the client IP address is included in an X-forward header or X-real-ip header of an HTTP request sent to destination.

In one embodiment, an intermediary network device receives from a client of a plurality of clients a client request. The intermediary device may receive the client request via a transport layer connection between the client and the intermediary network device. The client request may include a network packet that comprises an information identifying a particular content, such as a URL, an object, a file name or file path, a document name or any other type and form of content identifying information. The intermediary device may monitor or review or parse the requests, such as the client request. Upon review, monitoring or parsing of the client request, the intermediary device may determine that the client request is requesting a content which may be stored on a cache server. The cache redirector may comprise configurations and/or policies to modify the client request to include the source IP address of the client request into the header of the client request. The cache request may, in response to the determination that the client request is for the content that may be cached, forward the modified client request to the cache server.

The cache server may return the client request to the intermediary network device upon determining that the cache server is not able to provide the content requested by the client request. In some embodiments, the cache server may modify, change or replace the source IP address of the client request. Therefore, the client request received by the intermediary device from the cache server may include a source IP address which was not the same source IP address that was received by the intermediary from the client. However, since the original source IP address has been stored in the header of the client request by the cache redirector, the original source IP address may still be preserved despite being modified by the cache server.

G. Transparent End to End Cache Redirection

Figure 7A:
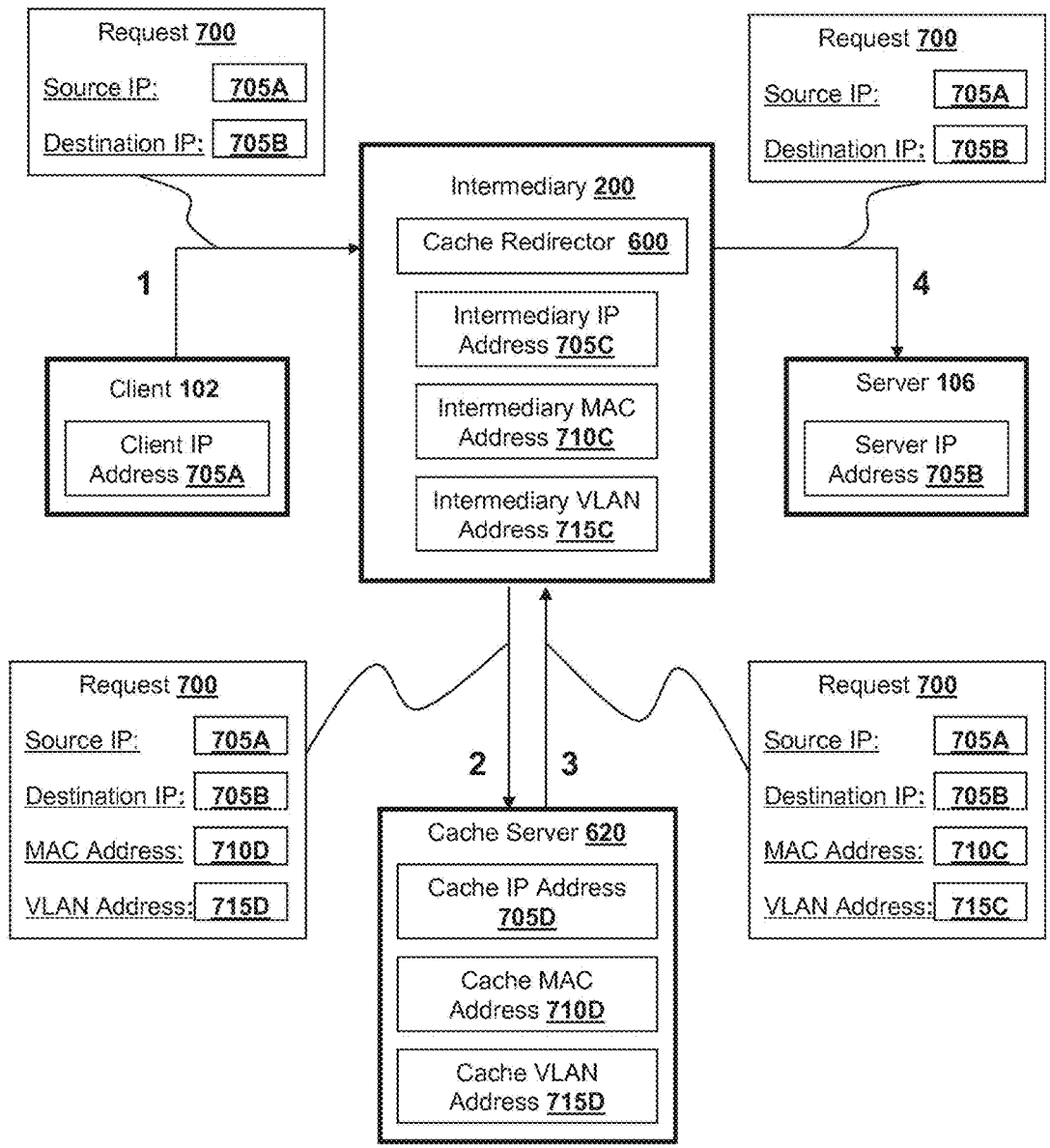
FIG. 7A is a block diagram of an embodiment of an intermediary device for maintaining original source and destination IP addresses of a client request while performing transparent cache redirection by an intermediary device.

Referring now to FIG. 7A, an embodiment of a system for maintaining a transparent end to end cache redirection via an intermediary device is illustrated. In some embodiments, FIG. 7A relates to system for maintaining an internet protocol address of a destination server while performing cache redirection by an intermediary network device. In brief overview, FIG. 7A illustrates an intermediary device 200 deployed between a client 102 and a server 106. Client 102 is identified by a client IP address 705A. Similarly, server 106 is identified by a server IP address 705B. The intermediary device 200 comprises a cache redirector 600, an intermediary IP address 705C, an intermediary Media Access Control (MAC) address 710C and an intermediary virtual local area network (VLAN) address 715C. Intermediary 200 is in communication with a cache server 620 that includes a cache IP address 705D, a cache MAC address 710D and a cache VLAN address 715D. FIG. 7A further depicts request 700 being transmitted from client 102 to intermediary 200, and then forwarded from intermediary 200 to cache server 620, from cache server 620 back to intermediary 200 and then from intermediary 200 to server 106.

In further overview, the intermediary may establish a transport layer connection with the client, referred to for convenience as a first transport layer connection. The intermediary may establish another transport layer connection with the cache server, referred to for convenience as a second transport layer connection. The cache server may establish a transport layer connection with the intermediary, referred to for convenience as a third transport layer connection. The intermediary may establish a transport layer connection with the server, referred to for convenience as a fourth transport layer connection Arrow 1 of the FIG. 7A refers to transmission of a client request 700 from client 102 to intermediary 200. Request 700 comprises client 102 IP address 705A as the source IP address and server 106 IP address 705B as the destination IP address. Arrow 2 refers to transmission of the request 700 by intermediary 200 to cache server 620. At arrow 2, in addition to source IP address 705A and 705B, request 700 also includes cache server 620 MAC address 710D and cache server 620 VLAN address 715D. Arrow 3 refers to the transmission of request 700 from cache server 620 to intermediary 200. At arrow 3, request 700 is modified to include intermediary 200 MAC address 710C and intermediary 200 VLAN address 715C, while still retaining source IP address 705A and destination IP address 705B. Arrow 4 refers to transmission of the client request 700 from intermediary 200 to server 106. At arrow 4, request 700 still maintains client 102 IP address 705A as the source IP address and server 106 IP address 705B as the destination IP address. In some aspects, FIG. 7A refers to a system for transparent handling of a client request via an intermediary device and a cache server. In some embodiments, the embodiment presented represents a system that maintains original source and destination IP addresses of a client request throughout the journey of the client request from client 102 to intermediary 200, from intermediary 200 to cache server 620, from cache server 620 back to intermediary 200 and then from intermediary 200 to the destination server 106.

Addresses, such as IP addresses 705, MAC addresses 710 and VLAN addresses 715 may include any type and form of unique identifier identifying a network device. Addresses, such as IP addresses 705, MAC addresses 710 and VLAN addresses 715 may include any numerical identification, logical address or a character identification of any particular device, node or a network component. Addresses may include numbers, letters and characters for identifying a network device in a network environment. An IP address 705 may include any label, such as a numerical label assigned to a network device for communicating via the Internet Protocol. A MAC address 710 may comprise an identifier to be used for communication using Media Access Control protocol sub-layer. In some embodiments, MAC address 710 includes an identifier used at a layer 2, or a data link layer, of the Open System Interconnection (OSI) reference model. A VLAN address 715 may include any type and form of an identifier for a local area network or a virtual local area network. Any of the addresses may use or include any functionality or feature of any addressing mechanism or system used for network communication. Each network device, such as client 102, server 106, intermediary 200 or cache server 620, may be assigned a unique IP address. Similarly, each network device may be assigned a unique MAC address and/or a VLAN address.

Request 700 may include any type and form of communication transmitted between two network devices. Request 700 may include any unit of data, or a packet carried by a network 104. In some embodiments, request 700 includes a network packet. Request 700 may comprise any number or format of bytes, characters or bits. Request 700 may comprise control information, such as a header. In some embodiments, request 700 comprises a payload. Request 700 may include any type and form of information or content, such as bits, bytes, text, characters, audio and video content or information, HTTP and HTML content or information, objects, URLs, links, web pages, instructions, commands, drawings, graphics or any other type and form of information transmitted via a network packet. In some embodiments, request 700 is a client request transmitted from client 102 to request access to content on a server 106. In certain embodiments, request 700 includes a request for a particular content, such as a web page, a document, a file, a service or a resource provided by server 106. Request 700 may comprise any combination of addresses or identifiers, such as: a source IP address, a destination IP address, a source MAC address, a destination MAC address, one or more port identifiers, a source VLAN address and a destination VLAN address. In some embodiments, request 700 may further include any other type and form of information which may be used for network communication or may be stored in a header of the request 700.

In addition to aforementioned embodiments, cache redirector 600 may further include a functionality or a configuration for using OSI network Layer 2 properties, also referred to as the data link layer properties, for uniquely identifying a connection. In some embodiments, cache redirector 600 may include configuration to identify a connection between intermediary 200 and cache server 620 using a MAC address or a VLAN address. In some embodiments, cache redirector 600 may be configured to support transparent cache redirection by identifying connections using a MAC address or a VLAN address. Cache redirector may include instructions or configurations that identify policy and rules/actions of the policy, such as:

enable ns mode USIP
    add service svc_cache_1 ip1 http port1—cacheType TRANSPARENT
    add lb vserver lb_cache_1—m MAC
    bind lb vserver lb_cache_1 svc_cache_1
    add cr vserver cr1*80—type TRANSPARENT—cacheVserver lb_cache_1—L2CONN ON
    bind cr vserver cr1—policyName bypass-non-get
    bind cr vserver cr1—policyName bypass-dynamic-url-extraORIGIN For example, these configurations or instructions may enable client request 700 to retain the original client IP address even as client request 700 is forwarded from intermediary 200 to cache server 620, and back from cache server 620 to intermediary 200. By including parameter setting L2CONN ON, the intermediary 200 may be configured to look up or identify the source of the request 700 received from cache server 620 using layer 2 properties, also referred to as data link layer properties, such as the MAC address and the VLAN address. Intermediary 200 may use layer 2 properties to recognize or identify request 700 or the connection via which the request 700 is received. In some embodiments, intermediary 200 uses other layer 2 properties or information for similar purposes, such as the port identifier information, logical ethernet links or channels, such as the etherchannel by Cisco Systems. Cache redirector 600 may use any layer 2 properties or information to identify any of the connections between intermediary 200 and cache server 620, intermediary 200 and client 102 and intermediary 200 and server 106. Similarly, cache redirector may use layer 2 properties, also referred to as the data link layer properties, or information to identify any communications transmitted via any of the connections, such as the request 700 or a response to request 700.

Figure 7B:
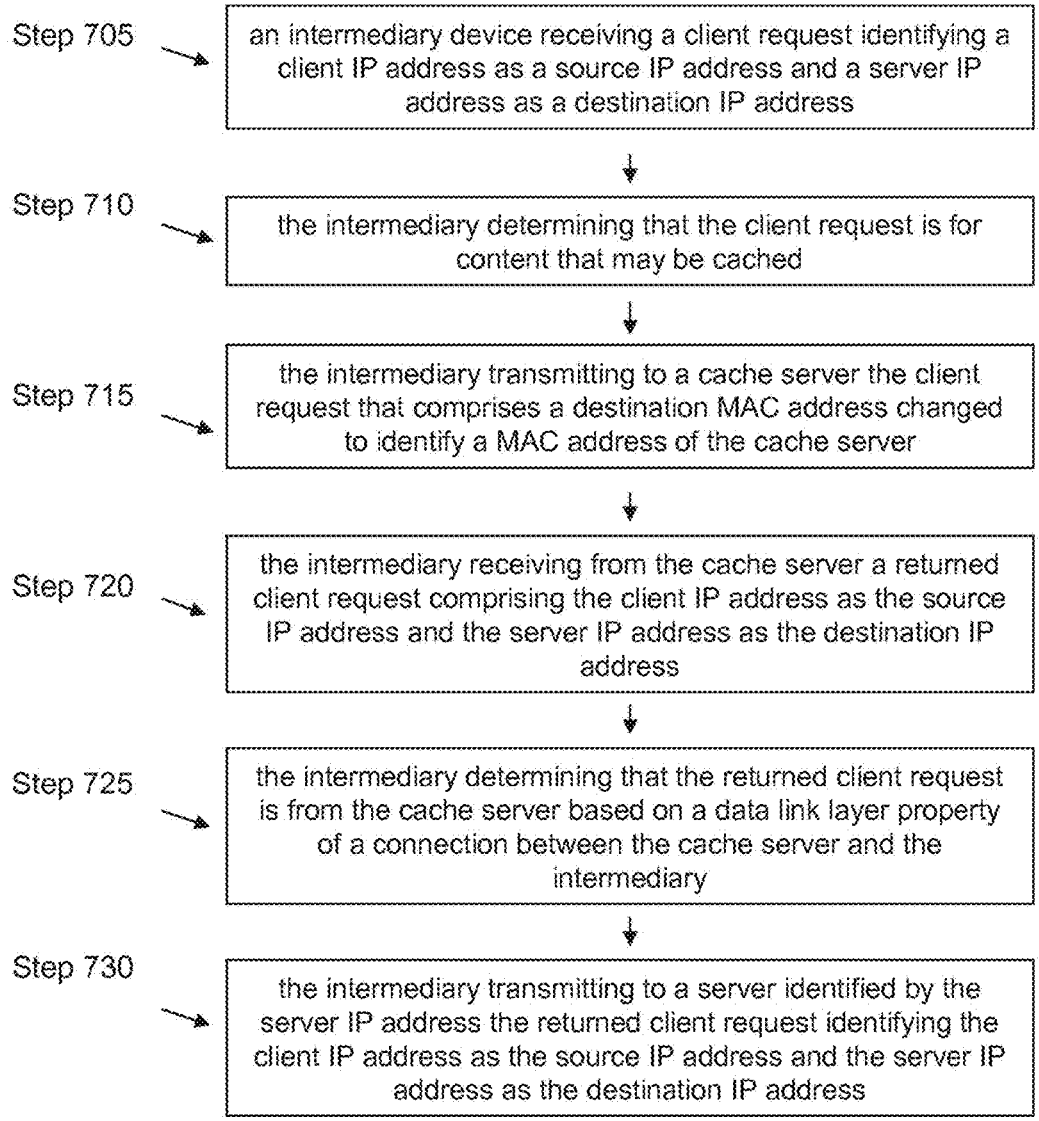
FIG. 7B is a flow diagram of an embodiment of steps of a method for maintaining original source and destination IP addresses of a client request while performing transparent cache redirection by an intermediary device.

Referring now to FIG. 7B, an embodiment of steps of a method for transparent cache redirection by an intermediary device while maintaining a source IP address and a destination IP address the cache redirected client request is illustrated. At step 705, intermediary device 200 receives a client request 700 identifying a client IP address 705A as a source IP address and a server IP address 705B as a destination IP address of the client request. At step 710, intermediary device 200 determines that client request 700 is for content that may be cached. At step 715, intermediary 200 transmits client request 700 to cache server 620, the client request comprising a destination MAC address changed to identify a MAC address of the cache server, while maintaining 705A as the source IP address and 705B as the destination IP address. At step 720, intermediary 200 receives from cache server 620 a returned client request 700 still comprising 705A as the source IP address and 705B as the destination IP address. At step 725, intermediary 200 determines that the returned client request 700 is from cache server based on a data link layer property of a connection between cache server 620 and intermediary 200. At step 730, intermediary 200 transmits to server 106 identified by server IP address 705B the client request 700 identifying the client IP address 705A as the source IP address and the server IP address 705B as the destination IP address.

At step 705, intermediary network device 200 receives a request 700 identifying client IP address 705A as a source IP address of the request and server IP address 705B as a destination IP address of the request. Request 700 may be received via a transport layer connection, such as a transport layer connection established between intermediary 200 and client 102. In some embodiments, the intermediary receives request 700 via a TCP connection. The intermediary device 200 may receive any number of requests 700 from any number of clients 102 or other intermediaries 200. In some embodiments, intermediary 200 receives request 700 via an established session to a client 102 or via a session established between a client 102 and a server 106 via intermediary 200. Request 700 may be for a particular type and form of content or service provided by server 106. Request 700 may include a URL for a particular page, which may further identify one or more objects to be received by the requesting client. In some embodiments, the content requested by the client request includes any type and form of web content, such as the HTTP, HTML, XML, audio, video, graphics, presentation, data stream or any type and form of service or application content.

At step 710, intermediary device 200 determines that request 700 is for content that may be cached. In some embodiments, intermediary 200 parses request 700. The intermediary 200 may identify, via parsing, that a portion of request 700 references or requests a webpage, a file, a picture, a video or audio stream, a graphical feature, a portion of text or a document. Intermediary 200 may determine that a portion of request 700, such as a URL, a portion of the text, a document or an object identifies content that may be cached. Intermediary 200 may determine that any portion of request 700 identifies components which may be stored or cached at a cache server 620. The intermediary 200 may make a determination using a compression history or history of the network traffic traversed. In some embodiments, intermediary 200 maintains a communication with the cache server 620 and receives information from the cache server 620 to be used to identify the content that may be cached.

At step 715, intermediary 200 transmits to cache server 620 request 700 that includes a destination MAC address identifying a MAC address of the cache server, while maintaining client IP address 705A as the source IP address and server IP address 705B as the destination IP address. Intermediary 200 may transmit to cache server 620 the request 700 via a connection established between intermediary 200 and cache server 620 for transmitting communication from intermediary 200 to the cache server 620. In some embodiments, intermediary 200 transmits to cache server 620 request 700 that includes a destination VLAN address identifying a VLAN address of the cache server. In some embodiments, intermediary 200 transmits to cache server 620 request 700 that includes any OSI network Layer 2 property. In further embodiments, intermediary 200 transmits to cache server 620 request 700 that includes a port identifier. In still further embodiments, intermediary 200 transmits to cache server 620 request 700 that includes the client IP address 705A as the source IP address of the request and the server IP address 705B as the destination IP address of the request. In some embodiments, request 700 is modified by intermediary 200 or cache redirector 600 to include MAC address of the cache server. In certain embodiments, request 700 is modified by intermediary 200 or cache redirector 600 to include VLAN address of the cache server 620. In specific embodiments, request 700 is modified by intermediary 200 or cache redirector 600 to include any OSI network Layer 2 property of the cache server 620. In further embodiments, intermediary 200 or cache redirector 600 modifies a network Layer 2 property to identify cache server 620 based on a policy, such as policy 610 or a configuration, such as configuration 605.

At step 720, intermediary 200 receives from cache server 620 the returned request 700 that still includes client IP address 705A as the source IP address and server IP address 705B as the destination IP address. The returned or bounced request 700 may be received by the intermediary 200 via a third transport layer connection between the cache server 620 and the intermediary 200. In some embodiments, request 700 returned by cache server 620 is request 700 modified to include the MAC address 710C of intermediary 200 as the destination MAC address. Returned request 700 may also be modified to include MAC address 710D of cache server 620 as the source MAC address. Returned request 700 may be modified to include VLAN address 715C of intermediary 200 as the destination VLAN address. In some embodiments, the returned request 700 includes VLAN address 715D of cache server 620 as the source VLAN address. In certain embodiments, returned request 700 identifies a port of intermediary 200 as the destination port an a port of cache server 620 as the source port. In some embodiments, returned cache server 700 includes any network Layer 2 property of intermediary 200 as the destination property and any network Layer 2 property of cache server 620 as the source property. Returned request 700 may include client IP address 705A as the source IP address and server IP address 705B as the destination IP address. Returned request 700 may be returned to the intermediary 200 in response to a cache miss by cache server 620. Returned request 700 may include a request for content which may have been missed or not satisfied by cache server 620 due to any number of reasons. In some embodiments, returned request 700 was for content which cache server 620 could not produce, which was not stored on cache server 620 or which was corrupted, expired, or invalid. Cache server 620 may return request 700 received from intermediary 200 via a connection established between the cache server 620 and the intermediary 200 for transmitting communication by the cache server 620 to the intermediary 200. Cache server 620 may use any of the MAC address of the cache server, VLAN address of the cache server, port identifier of the cache server or any other network Layer 2 property to provide information for intermediary 200 to identify the connection between intermediary 200. Cache server 620 may also use any network Layer 2 property of the cache server 620 or intermediary 200 to provide information for intermediary 200 to determine that the returned request 700 was received from the cache server 620.

At step 725, intermediary 200 determines that the returned client request is from cache server 620 based on a data link layer property of a connection between cache server 620 and intermediary 200. In some embodiments, intermediary 200 parses the returned request 700 to identify the source of the returned request 700. In some embodiments, intermediary 200 identifies that the returned request 700 is from cache server 620 by identifying cache MAC address 710D of the cache server 620 as the source MAC address of the request 700. In certain embodiments, intermediary 200 identifies that the request 700 is from cache server 620 by identifying cache VLAN address 715D of the cache server 620 as the source VLAN address of the request 700. In some embodiments, intermediary 200 identifies that the returned request 700 is from cache server 620 by identifying any data link layer or network layer 2 property of the request 700 as the data link layer 2 property of the cache server 620. In further embodiments, intermediary 200 determines that a port of the returned request 700 identifies a port of cache server 620. Intermediary 200 may associate any data link layer information of the cache server 620 with the connection between the cache server 620 and intermediary 200. Intermediary 200 may use any data link layer information of the cache server 620 to identify the returned request 700 as the request returned from the cache server 620. Intermediary 200 may determine that the returned request 700 comprises client IP address 705A as the source IP address and server IP address 705B as the destination IP address of the returned request 700.

At step 730, intermediary 200 transmits to server 106 request 700 received from cache server 620. Request 700 transmitted by intermediary 200 to server 106 may identify the client IP address 705A as the source IP address and the server IP address 705B as the destination IP address. In some embodiments, request 700 transmitted to server 106 comprises information identifying content request 700 is requesting. In certain embodiments, request 700 identifies the content requested by client 102 via a URL, object, web page, link, document name, file name, resource name or a service name provided by server 106. In some embodiments, intermediary 200 transmits request 700 via a connection established between intermediary 200 and server 106. Intermediary 200 may transmit to the server 106 the returned request 700 received from cache server 620 in response to the cache server 620 not being able to provide the content requested by the request 700. Request 700 transmitted by intermediary 200 to server 106 may include body or payload that is same as the body or content of the request 700 received by intermediary 200 at step 705.

H. Systems and Methods for Single Sign on (SSO) to Disparately Hosted Application Embodiments of the systems and methods of the present solution are directed to providing a single authentication domain across disparately hosted applications, such as Software As A Service, Platform As A Service (PaaS) hosted applications, Infrastructure As A Service (IaaS) applications, cloud hosted applications and enterprise hosted applications. Any embodiments of the application delivery controller (ADC), e.g., appliance 200 or packet engine, may provide an interface for a remote user to use a single sign on to the system to gain access to any one or more of the plurality of differently hosted applications. With the same sign on, a user may access an application hosted outside the enterprise the same way the user may gain access to a data center or enterprise hosted application. Transparent and seamless to the user, the same sign on to the ADC provides access to the disparately hosted systems which may have different passwords and/or authentication systems.

Figure 8A:
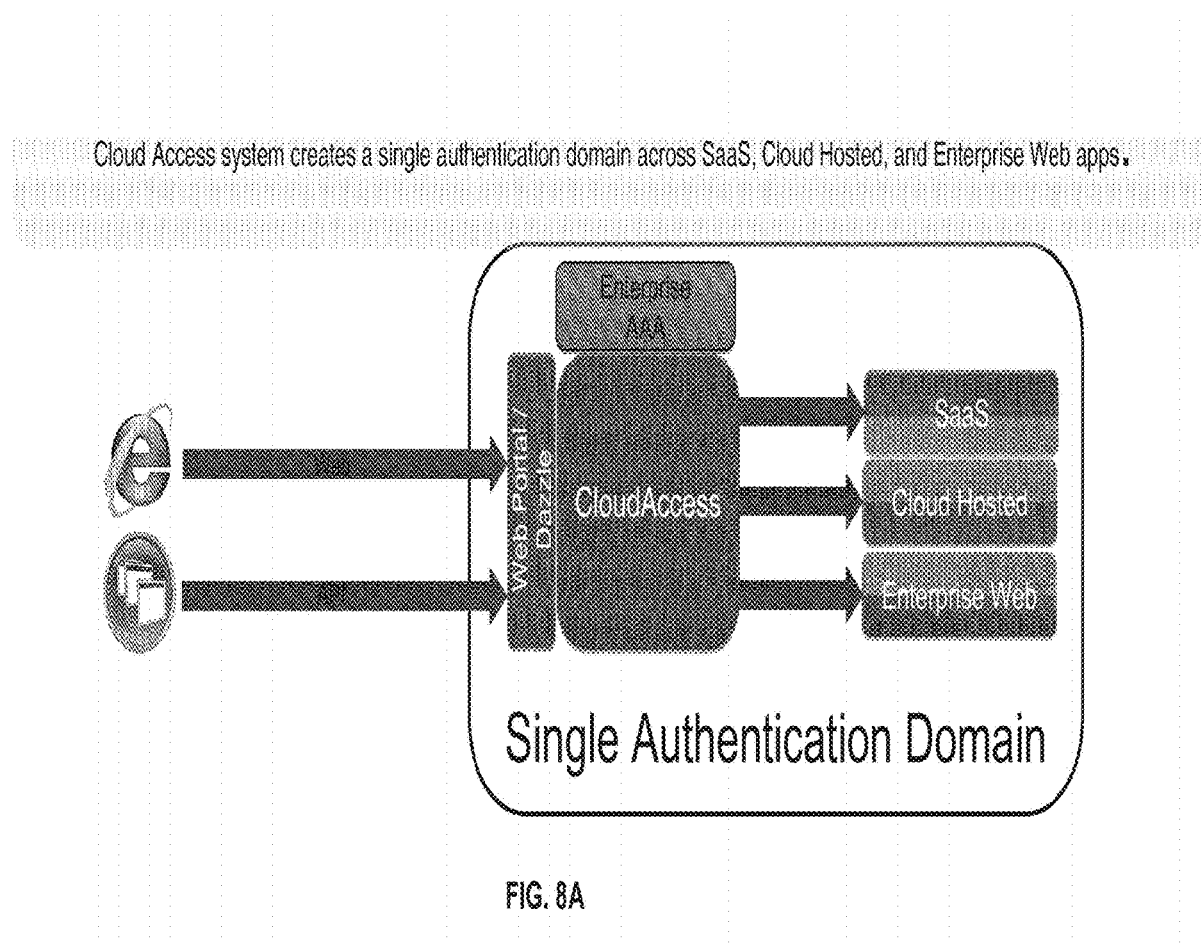
FIG. 8A is a block diagram of an embodiment of a single authentication domain across disparately hosted applications.

Referring to FIG. 8A, an embodiment of a cloud access solution to provide a single authentication domain across a plurality of disparately hosted applications is depicted. In brief overview, a user may access one or more of a plurality of disparately hosted applications via a web portal or interface provide by a cloud access system. The cloud access system may include, interface, communicate or integrate with any type and form of authentication, authorization and/or auditing (AAA) system to provide AAA services for the user's access. The cloud access system may include, interface, communicate or integrate via an API to any applications of the user running on a client that requests access to the back-end applications. The cloud access system may interface, communicate or integrate to any one or more type of applications, including but not limited to SaaS applications, cloud hosted application and/or enterprise web based applications.

The plurality of disparately hosted applications may include any type and form of application that is executed, accessed and controlled or managed separately from any other application. A disparately hosted application may be any application hosted on a system, server or service external to the enterprise or the data center of the enterprise. A disparately hosted application may be any application hosted on a system, server or service separately and/or controlled and managed externally to the enterprise or the data center of the enterprise, such as via a second or different enterprise or company. A disparately hosted application may be any application hosted on a system, server or service that has different authentication credentials for a user from another application accessed by the user. A disparately hosted application may be any application hosted on a system, server or service that has different authentication systems and/or access for a user from another application accessed by the user.

The plurality of hosted applications accessed via the cloud access system may include any combination of heterogeneous or homogeneous applications, including but not limited, to any one or more SaaS applications, Platform as a Service (PaaS) applications, Infrastructure as a Service (IaaS) applications, and/or any applications hosted, executed, services or accessed via any type and form of cloud hosting platform or service, such as a private cloud or public cloud service.

The cloud access system creates and provides a single authentication domain and access system to the plurality of disparately hosted applications. A user via the web interface may access the cloud access system using one set of authentication credentials and gain access to each of the plurality of applications, which may each require or use a different set of authentication credentials for the user. The cloud access system manages the different set of authentication credentials and authenticating the user to each of the plurality of hosted applications. For example, a user gains access to the system by authentication to the cloud access system. In turn, the cloud access system may authenticate the user to one or more SaaS applications and/or one or more Cloud hosted applications.

Figure 8B:
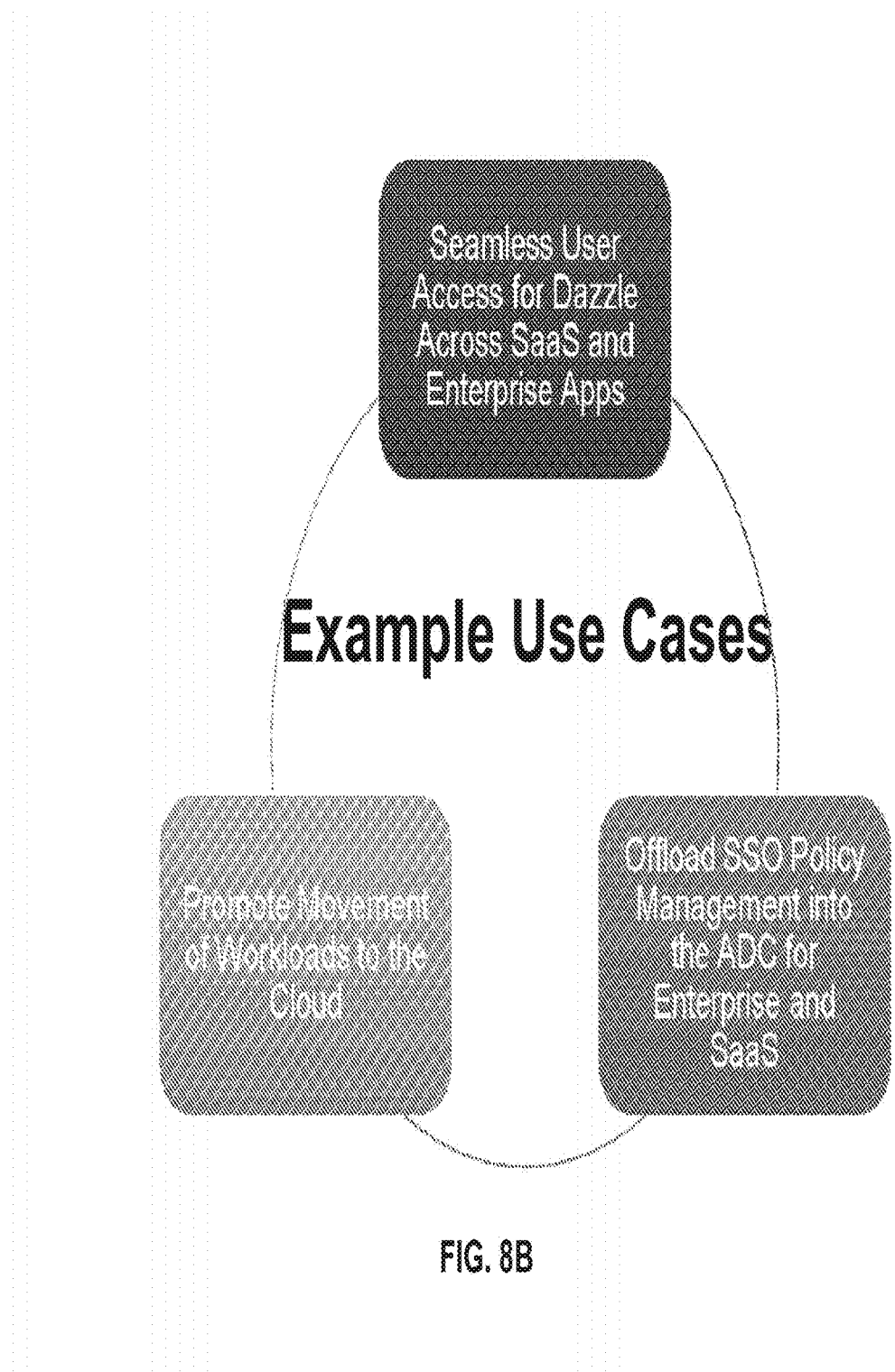
FIG. 8B is a depiction of embodiments of use cases of a single authentication domain across disparately hosted applications.

The cloud access system enables and provides for a plurality of advantageous and beneficial user case scenarios. Referring now to FIG. 8B, an example embodiment of such use case scenarios are highlighted. Embodiments of the cloud access system of the present solution may provide:

(i) seamless user access via a web interface to any combination of SaaS, cloud hosted and enterprise applications;

(ii) offloading of Single Sign On (SSO) management to an intermediary device, such as appliance 200', for any combination SaaS, cloud hosted and enterprise applications;

(iii) promotes and supports the movement of workloads and applications to the SaaS/PaaS/IaaS model and/or cloud hosted services.

Figure 8C:
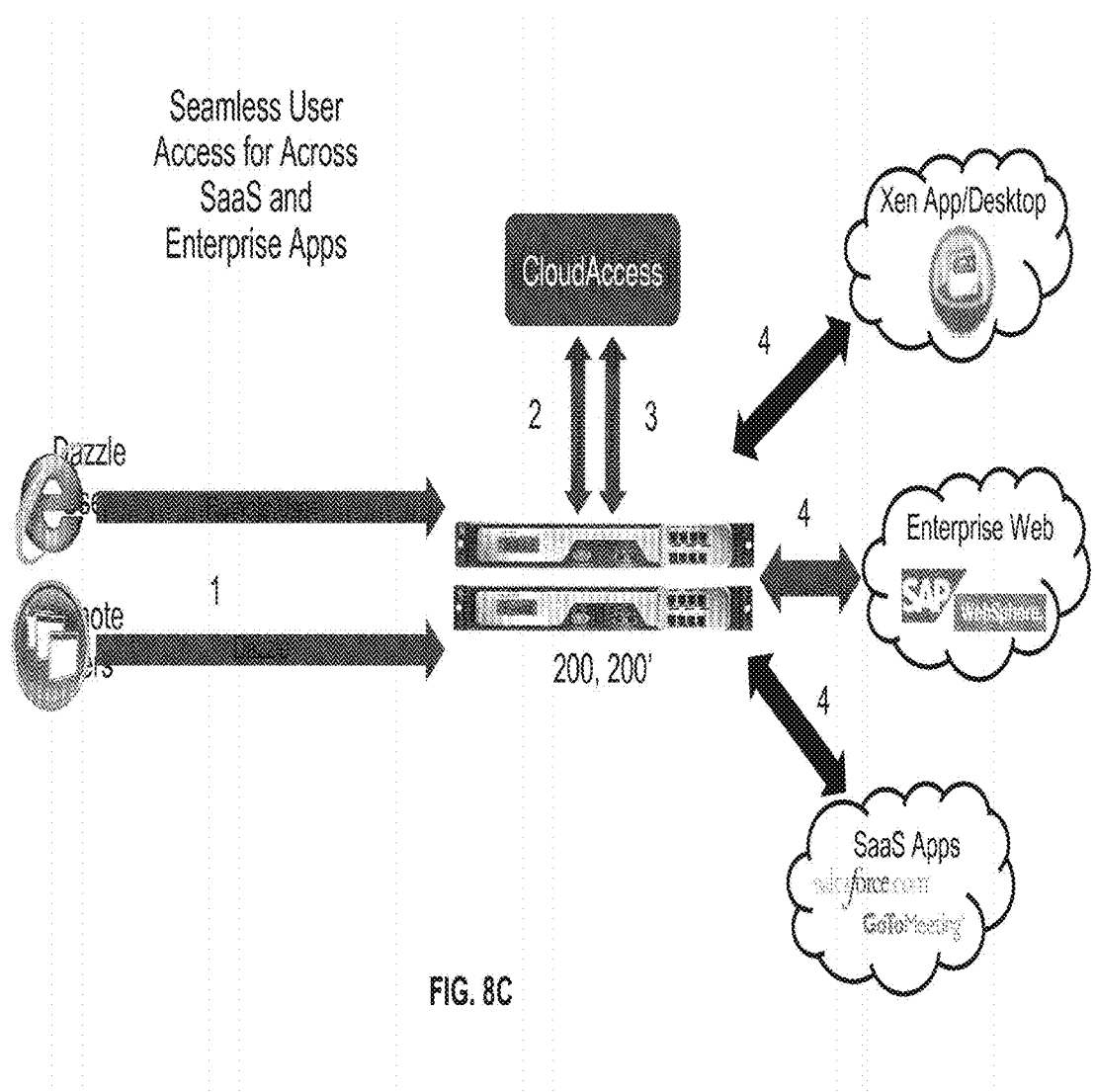
FIG. 8C is a depiction of embodiments of a use case of a seamless user access across disparately hosted applications.
Figure 8D:
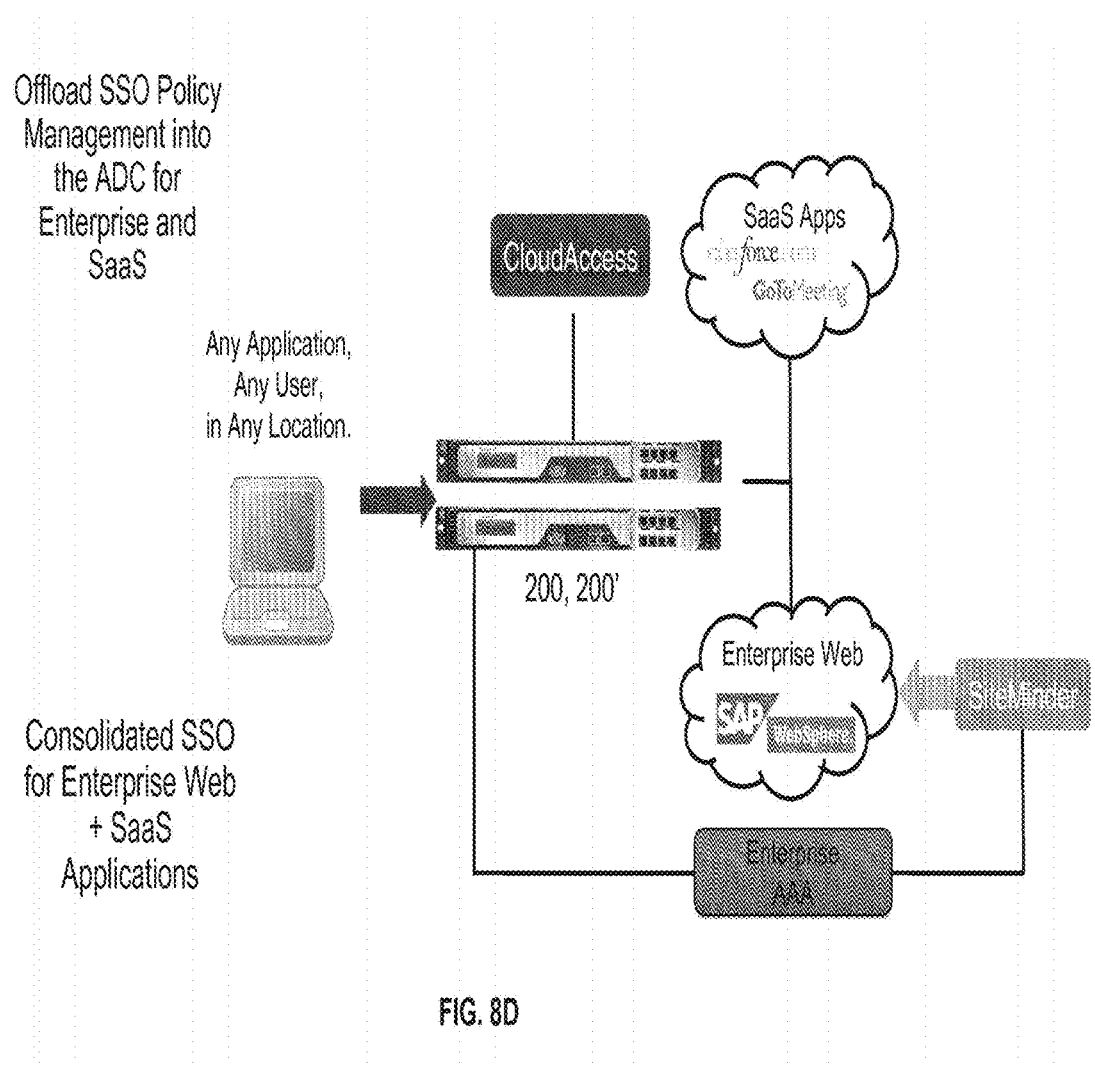
FIG. 8D is a depiction of embodiments of a use case of offloaded single sign on (SSO) policy management for disparately hosted applications.
Figure 8E:
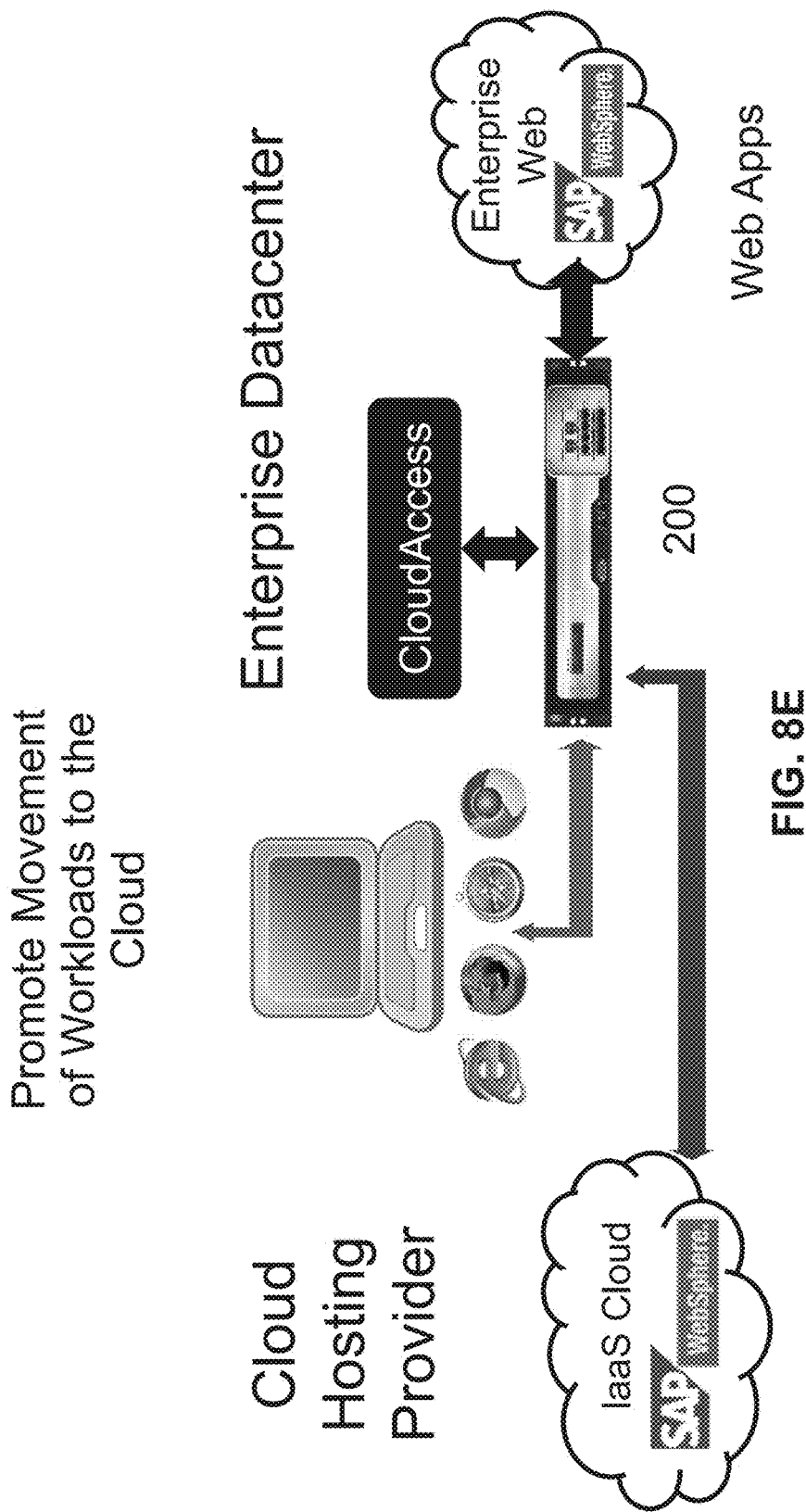
FIG. 8E is a depiction of embodiments of a use case of promoting movement of workloads or applications to the cloud.

FIGS. 8C through 8E further illustrate embodiments of these use case scenarios.

Referring now to FIG. 8C, an embodiment of a seamless access across the plurality of disparately hosted applications is depicted. An application delivery controller such as any embodiment of appliance 200 may provide seamless and transparent access to the various hosted applications. The ADC 200 may include integrate or communicate with any type and form of cloud access system, device or software, such as any embodiments of Apere's Access Control and SaaS SSO software and/or devices. The ADC may use any embodiments of the cache redirection functionality and operations described in conjunctions with FIGS. 6A-7B to interface or communicate with the cloud access system, device or software. The ADC may be configured, constructed and designed to redirect, manage and control traffic to the cloud access system, device or software and to receive responses, instructions, configuration or commands from the cloud access system, device or software to provide seamless and transparent access to the user to any of the SaaS and/or cloud hosted systems in conjunction with any enterprise applications.

Referring now to FIG. 8D, an embodiment of offloading SSO policy management to an ADC for SaaS and/or cloud hosted applications s depicted. An application delivery controller such as any embodiment of appliance 200 may provide centralized SSO policy management for any application, any user at any location. An application delivery controller such as any embodiment of appliance 200 may provide centralized SSO policy management for any combination of the plurality of disparately hosted applications. In overview, the ADC 200 may include, interface with any one or more cloud access and security systems. The ADC 200 may also include, interface with any one or more enterprise AAA system, such as any embodiments of SiteMinder provided by CA of Islandia, N.Y. As such, the ADC may provide a centralized, single point of access and interface to a plurality of different AAA/access systems corresponding either to a SaaS/Cloud hosted application and/r to an enterprise application. Instead of having SSO policies being managed at each of these different AAA/access systems, management of these SSO policies may be offloaded to a centralized point via a set of one or more ADC device(s).

Referring now to FIG. 8E, an embodiment of a use case of movement of workloads to the cloud is depicted. With seamless, transparent and centralized SSO and management thereof provided by embodiments of the ADC of the present solution, the enterprise may move one or more applications to be hosted by a cloud service provider. With the ADC providing the SSO management and access to the disparately hosted applications, the enterprise may migrate, transform, move, convert or change any applications from enterprise hosted model to a SaaS/PaaS/IaaS hosted model or to any private or public cloud model. Embodiments of the ADC of the present solution provides for changes in back-end deployment of such applications to different hosted systems and models, different authentication credentials and authentication systems while maintaining the seamless and transparent access to the user to such applications and/or maintaining a single sign on process.

Figure 8F:
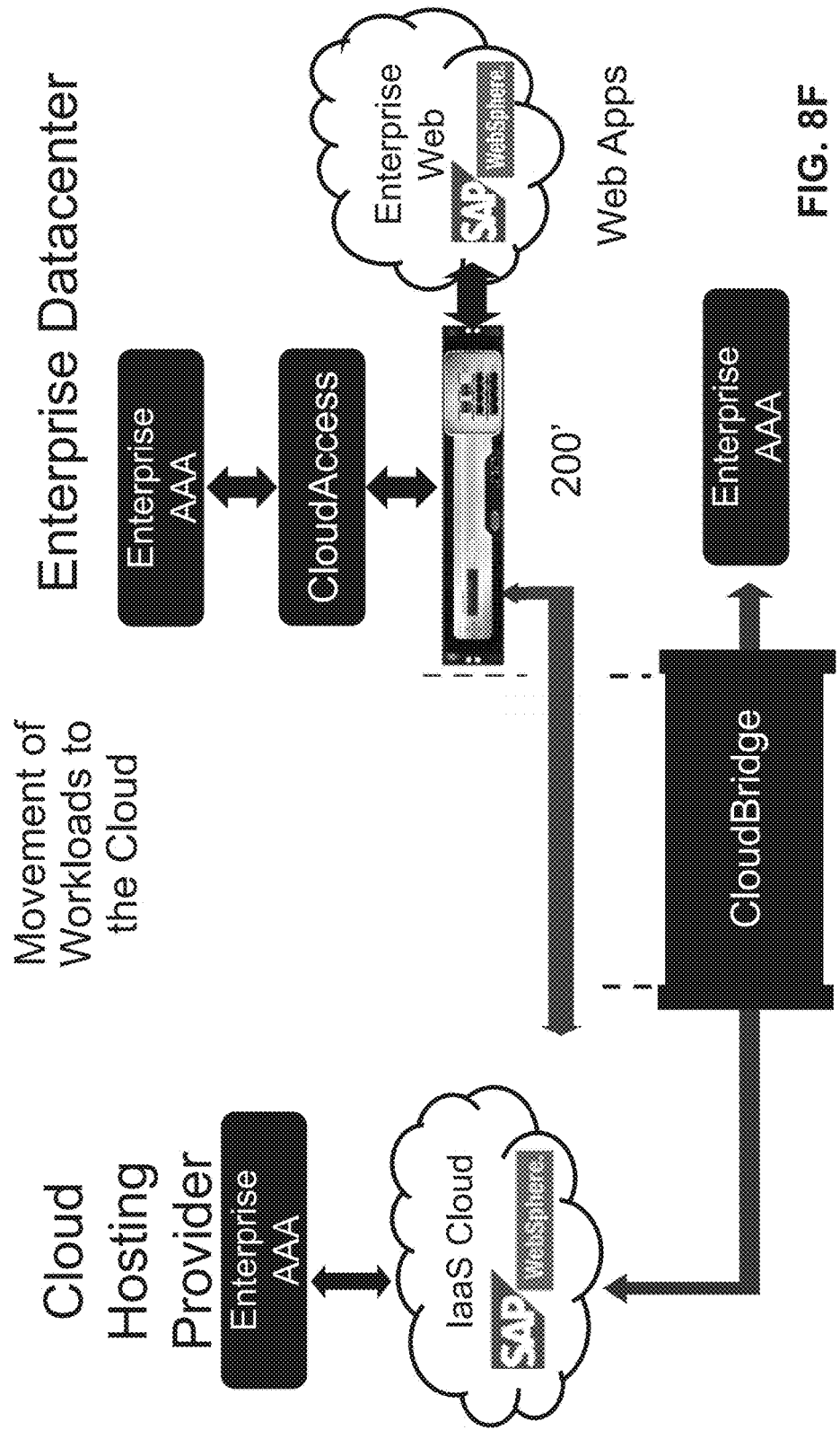
FIG. 8F is a depiction of another embodiment of moving workloads or applications to the cloud.

Referring now to FIG. 8F, an embodiment of another use case of movement of workloads to the cloud is depicted. In this embodiment, a cloud bridge system, device, software or service may be used to bridge the migration of an enterprise application hosted in the data center to an application hosted on a cloud platform, such as an IaaS cloud. In some embodiments, the ADC may include, integrate or communicate with a cloud bridge to provide seamless and transparent migration of an application from the data center to a cloud hosting provider. This may be performed while the application is running and the ADC provides to the remote user seamless, continuous and transparent access to the application during and after migration of the application.

Figure 9A:
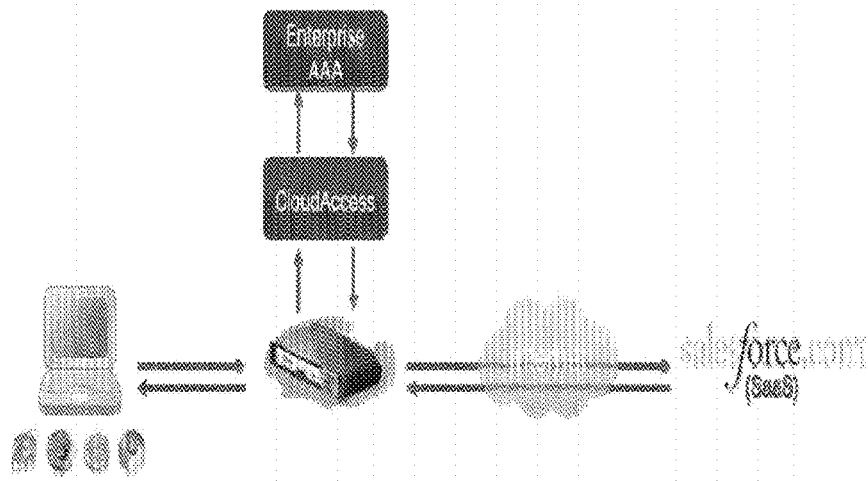
FIG. 9A is a block diagram of an embodiment of SSO access to SaaS, enterprise and cloud hosted applications.

Referring now to FIG. 9A, an illustration of features of embodiments of the cloud access solution is shown. The integrated cloud access solution of embodiments of the ADC provides transparent SSO access to any combination of SaaS, enterprise and cloud locations from any location for any user. Embodiments of the ADC provides, supports and facilitates automatic recognition, authentication and authorization for a plurality of SaaS and cloud applications.

Embodiments of the ADC integrated and provides a non-disruptive solution to existing AAA solutions.

Figure 9B:
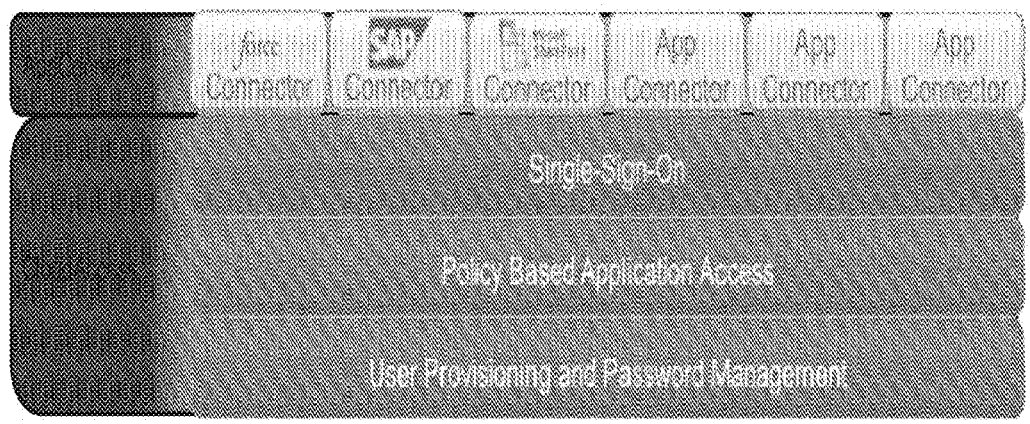
FIG. 9B is a block diagram of another embodiment of SSO access to SaaS, enterprise and cloud hosted applications.

Referring now to FIG. 9B, an illustration of features of embodiments of the cloud access solution is shown. The integrated cloud access solution of embodiments of the ADC provides user provisioning and password management. The cloud access solution also includes Single Sign On control, management, and automated login to any SaaS, Web or XenApp or XenDestop Application. The cloud access solution may include one or more application connectors to any predetermined SaaS, Enterprise, Cloud or any other type and form of application.

Figure 9C:
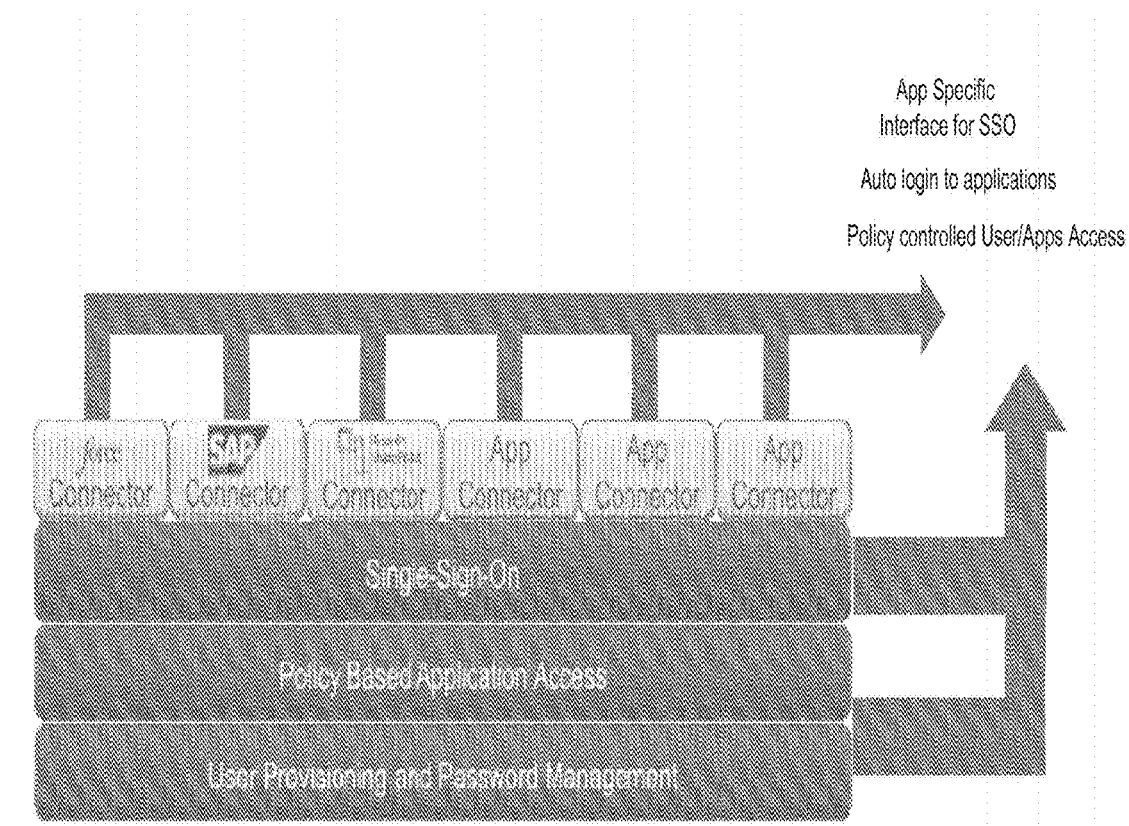
FIG. 9C is a block diagram of another embodiment of SSO access to SaaS, enterprise and cloud hosted applications.

Referring now to FIG. 9C, an illustration of features of another embodiment of the cloud access solution is shown. With the integration and combination of SSO, policy based application access and user provisioning and password management, the cloud access solution provides the following features:

(i) application specific interfaces for SSO (ii) automated authentication and login to each of the applications (iii) centralized policy controlled user and applications access.

Figure 10A:
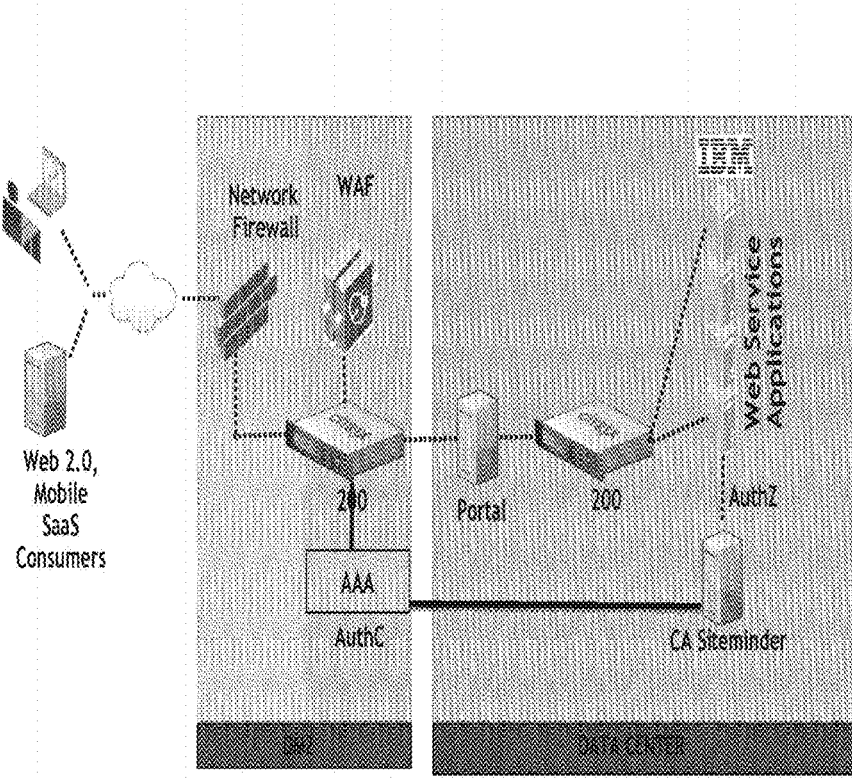
FIG. 10A is a block diagram of example deployment of an embodiment of the present solution.

Referring now to FIG. 10A, an example embodiment of a deployment of the cloud access solution is depicted. In this example embodiment, two ADCs or applications may be deployed in the end to end solution. A first ADC or appliance may be deployed in the DMZ zone to provide consolidated and centralized AAA access control to the network and services of the data center. A second ADC or appliance may be deployed for or with the data center to provide support and rollout of new application in the data centers.

Figure 10B:
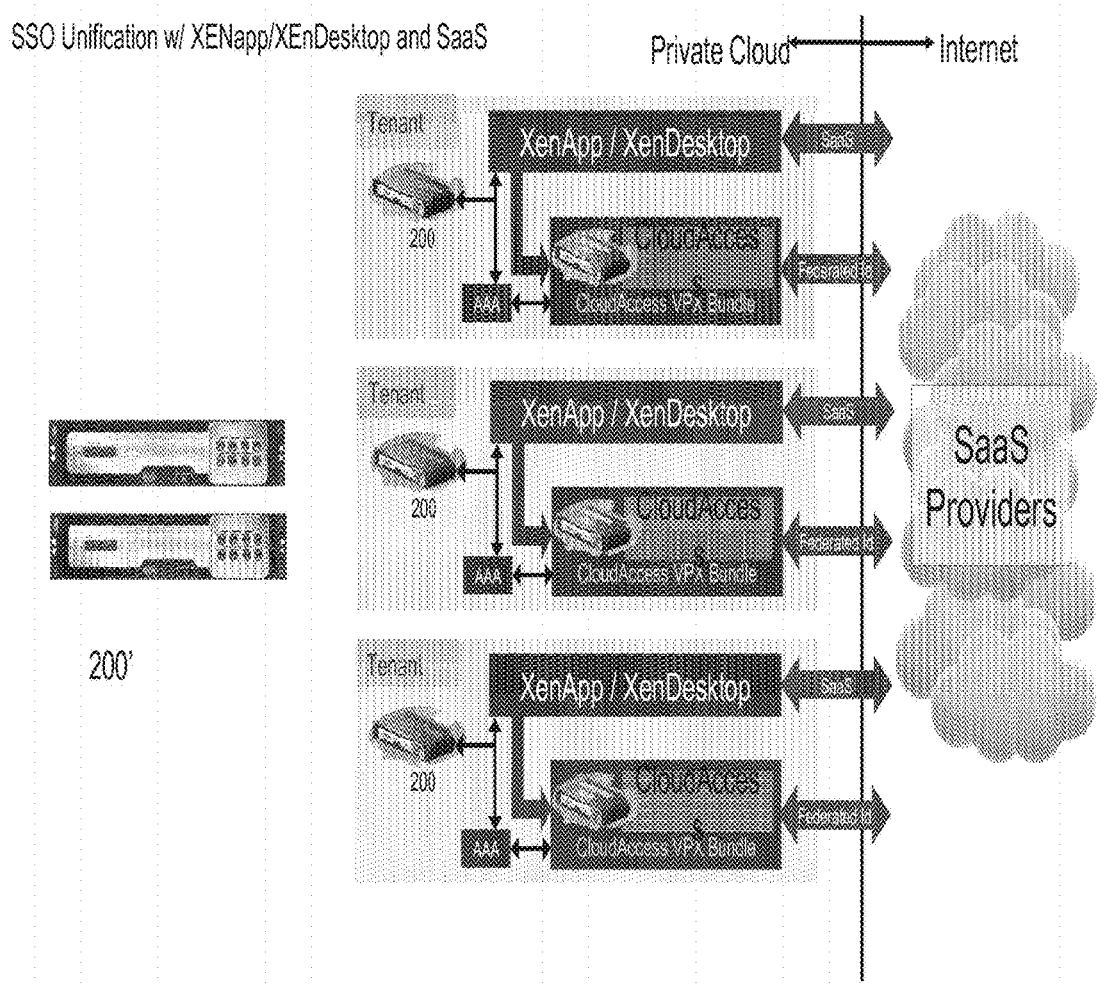
FIG. 10B is a block diagram of another example deployment of an embodiment of the present solution.

Referring now to FIG. 10B, an example embodiment of a deployment of the cloud access solution for a multi-tenant XenApp/XenDesktop is depicted. In this example embodiment, one or more ADCs or appliances 200' may provide local or global load balancing to a plurality of ADCs 200. In some embodiments, the ADCS 200' may provide monitoring and dynamic deployment of one or virtualized ADCs, which may be deployed or hosted on a cloud platform. A set of one or more ADCs 200 may be used for one tenant to provide a cloud access solution that provides access to enterprise XenApp and XenDesktop solutions of Citrix Systems, Inc. while providing access also to any one or more SaaS provided applications. The cloud access solution of this deployment provides SSO service to multi-tenant ADC configurations and enterprise and SaaS applications.

Figure 10C:
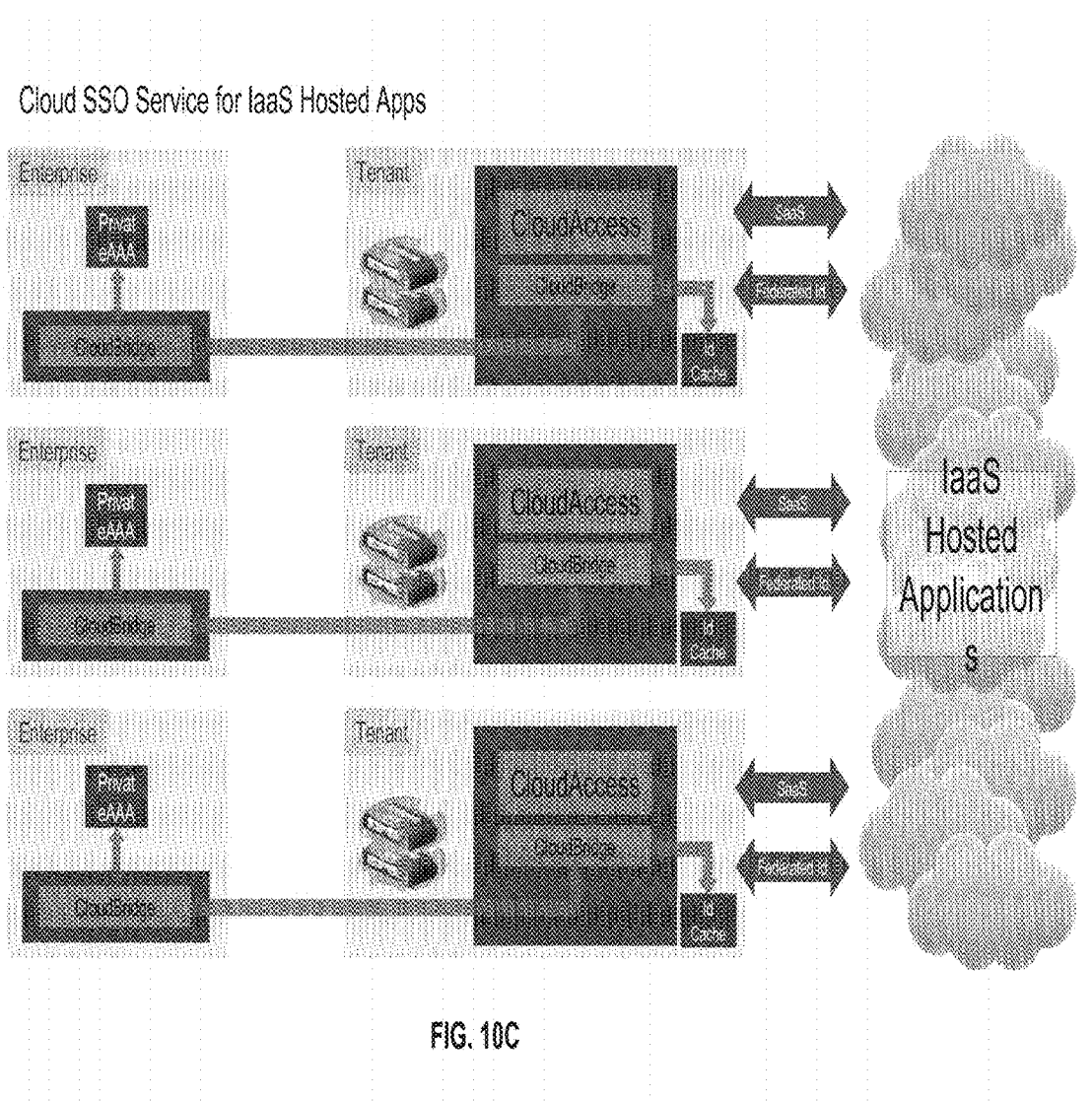
FIG. 10C is a block diagram of another example deployment of an embodiment of the present solution.

Referring now to FIG. 10C, an example embodiment of a deployment of the cloud access solution for IaaS hosted applications is depicted. In these embodiments, the enterprise may use a private or enterprise hosted AAA system with a cloud bridge to access the ADC and ADC provided cloud access solution to gain SSO access to one or more IaaS hosted applications.

Figure 10D:
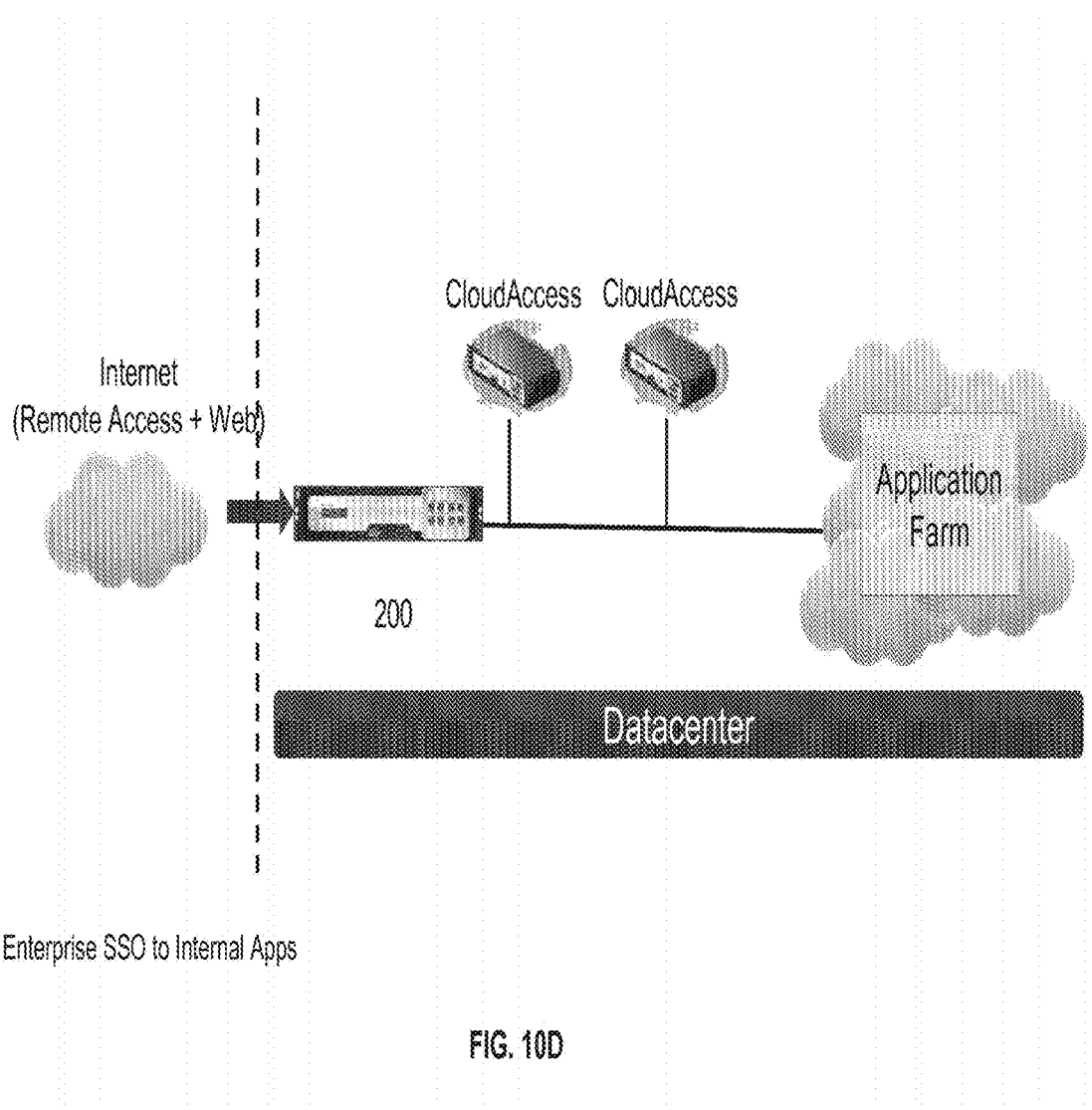
FIG. 10D is a block diagram of another example deployment of an embodiment of the present solution.

Referring now to FIG. 10D, an example embodiment of a deployment of the cloud access solution for SSO to Internal or Enterprise applications is depicted. The ADC 200 may communicate or interface with a plurality of cloud access systems and an enterprise application server farm. While providing SSO via any of the cloud access systems to any cloud hosted application, the ADC uses SSO to also authenticate and provide access to any applications in the application farm.

Figure 11:
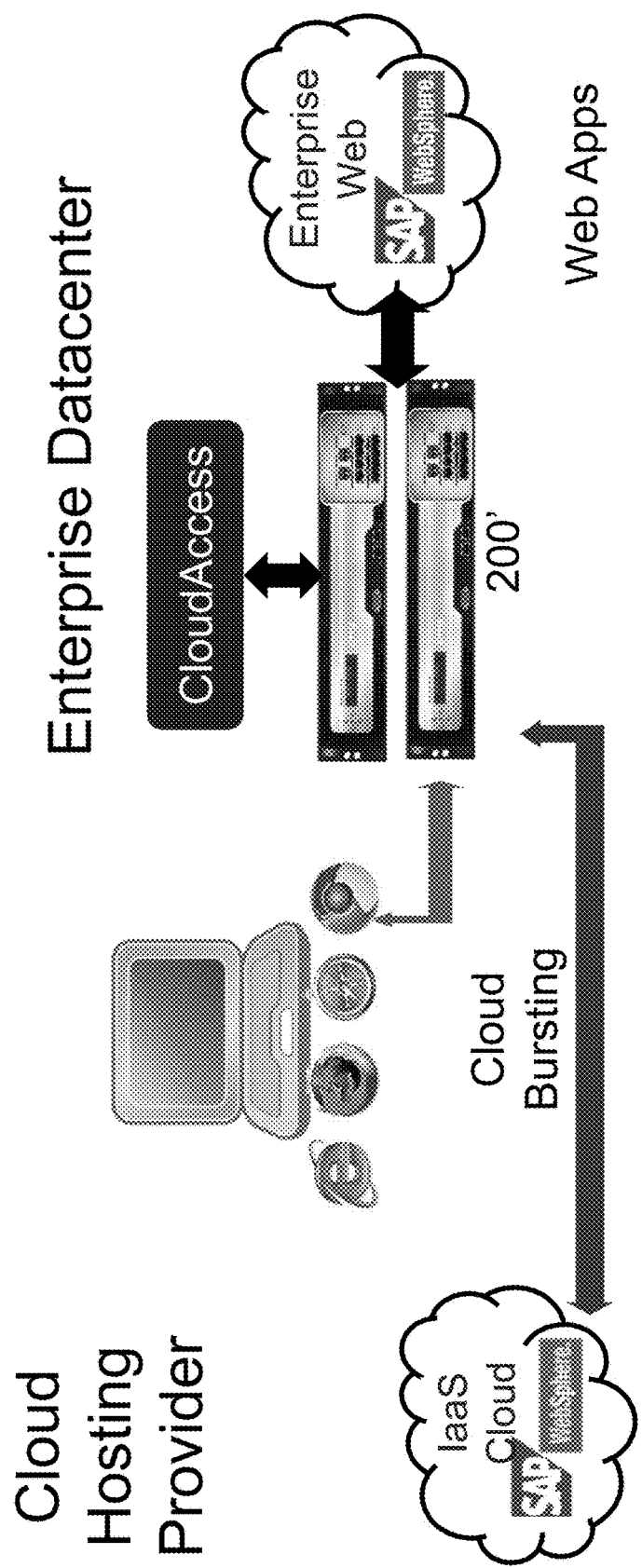
FIG. 11 is a block diagram of an embodiment of cloud bursting.

Referring now to FIG. 11, an example embodiment of a deployment of the cloud access solution for cloud bursting is depicted. The ADC 200 may perform traffic management and monitoring of any of the enterprise web applications and the servers or resources supporting such applications. From monitoring, the ADC may detect that operations or performance of the enterprise applications may not be within a desired threshold and responsive to such detection, the ADC may perform cloud bursting to deploy the application on the cloud and provide seamless and transparent access to the user the application that now is bursted or hosted by a cloud service provider.

In addition to transparency, seamlessness and consolidated SSO, the ADC may provide acceleration of any of the network traffic to the SaaS and cloud hosted applications. Any combination of the disparately hosted applications may be accelerated by the ADC.

Figure 12A:
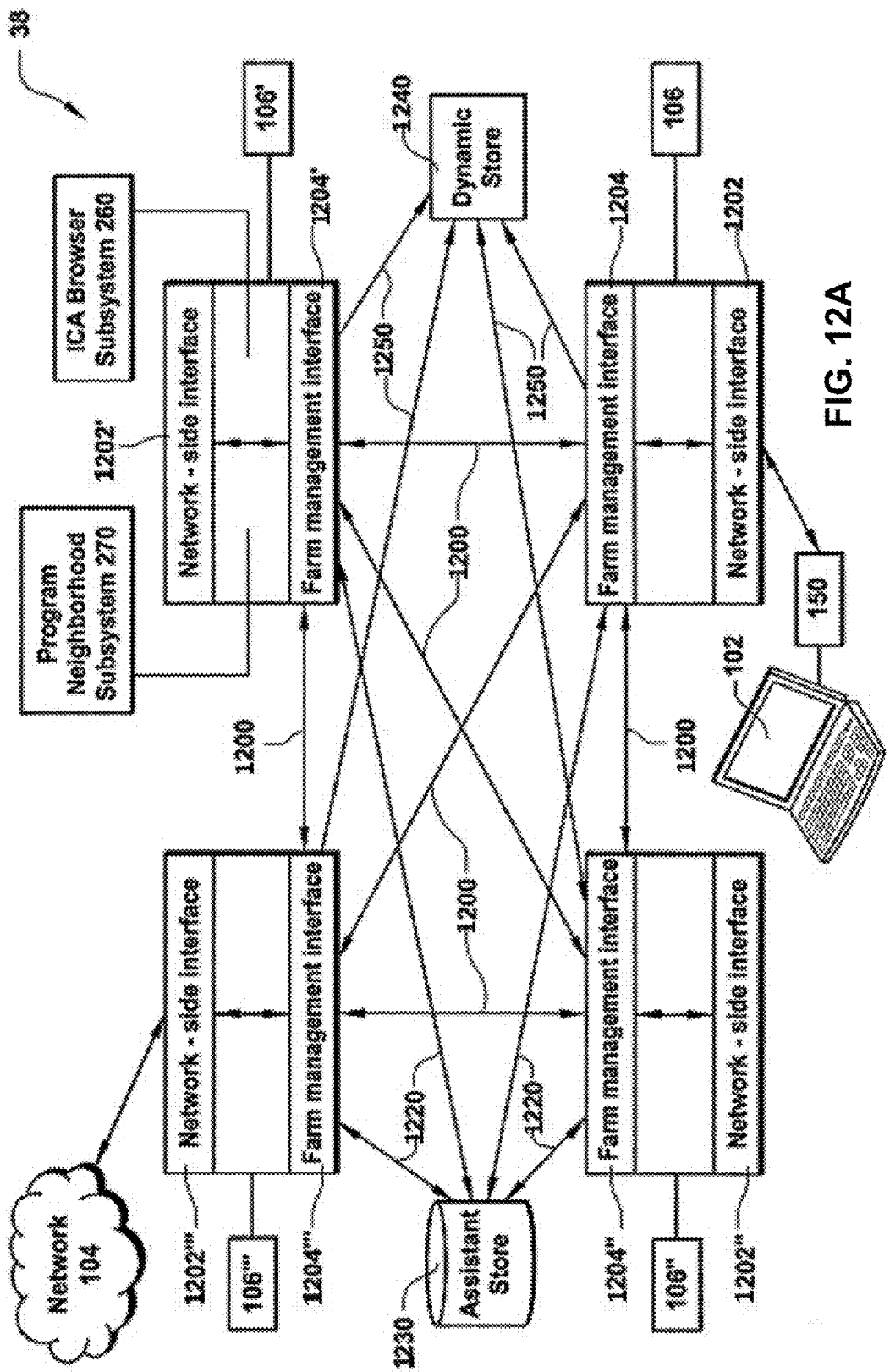
FIG. 12A is a block diagram depicting an embodiment of a server farm.

I. Systems and Methods for Methods and Systems for Generating and Delivering an Interactive Application Delivery Store Referring now to FIG. 12A, together the servers 106 comprise a farm 38 or server farm, where each server 106 can include a network-side interface 1202 and a farm-side interface 1204. The network-side interface 1202 can be in communication with one or more clients 1102 or a network 104. The network 104 can be a WAN, LAN, or any other embodiment of a network such those networks described above.

Each server 106 has a farm-side interface 1204 connected with one or more farm-side interface(s) 1204 of other servers 106 in the farm 38. In one embodiment, each farm-side interface 1204 is interconnected to other farm-side interfaces 1204 such that the servers 106 within the farm 38 may communicate with one another. On each server 106, the farm-side interface 104 communicates with the network-side interface 1202. The farm-side interfaces 1204 can also communicate (designated by arrows 1220) with a persistent store 1230 and, in some embodiments, with a dynamic store 1240. The combination of servers 106, the persistent store 1230, and the dynamic store 1240, when provided, are collectively referred to as a farm 38. In some embodiments, a server 106 communicates with the persistent store 1230 and other servers 106' communicate with the server 106 to access information stored in the persistent store. The persistent store 1230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 1230 for more than one farm 38. The persistent store 1230 maintains static data associated with each server 106 in farm 38 and global data used by all servers 106 within the farm 38. In one embodiment, the persistent store 1230 may maintain the server data in a Lightweight Directory Access Protocol (LDAP) data model. In other embodiments, the persistent store 1230 stores server data in an ODBC-compliant database. For the purposes of this description, the term "static data" refers to data that do not change frequently, i.e., data that change only on an hourly, daily, or weekly basis, or data that never change. Each server uses a persistent storage subsystem to read data from and write data to the persistent store 1230.

The data stored by the persistent store 2130 may be replicated for reliability purposes physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 1240 (i.e., the collection of all record tables) can be embodied in various ways. In one embodiment, the dynamic store 1240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 1240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 1240. In another embodiment, each collector point stores a portion of the dynamic store 1240, i.e., it maintains runtime data of a particular data type. The type of data stored by a server 106 may be predetermined according to one or more criteria. For example, servers 106 may store different types of data based on their boot order. In some embodiments, the type of data stored by a server 106 may be configured by an administrator using an administration tool (Not Shown.) In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106" can operate as a collector point for licensing information and for loading information. In these embodiments, each collector point may amass a different type of run-time data. For example, to illustrate this case, the server 106''' can collect licensing information, while the server 106" collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 1260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 1260 also supports requests made by clients 10 running a program neighborhood application that provides the client 102, upon request, with a view of those applications within the farm 38 for which the user is authorized. The ICA browser subsystem 1260 forwards all of the above-mentioned client requests to the appropriate subsystem in the server 106.

In one embodiment, each server 106 in the farm 38 that has a program neighborhood subsystem 1270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons. The functionality provided by the program neighborhood subsystem 1270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 1270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 1516 described in connection with FIG. 6 below, providing program neighborhood functionality on a server 106.

In one embodiment, the program neighborhood-enabled client does not have a connection with the server with a program neighborhood subsystem 1270. For this embodiment, the client 102 sends a request to the ICA browser subsystem 1260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 1270. In one embodiment, the program neighborhood subsystem 1270 sends the credentials to a user management subsystem for authentication. The user management subsystem may return a set of distinguished names representing the list of accounts to which the user belongs. Upon authentication, the program neighborhood subsystem 1270 establishes the program neighborhood virtual channel. This channel remains open until the application filtering is complete. The program neighborhood subsystem 1270 then requests the program neighborhood information from the common application subsystem 1524 associated with those accounts. The common application subsystem 1524 obtains the program neighborhood information from the persistent store 1230. On receiving the program neighborhood information, the program neighborhood subsystem 270 formats and returns the program neighborhood information to the client over the program neighborhood virtual channel. Then the partial ICA connection is closed. For another example in which the program neighborhood-enabled client establishes a partial ICA connection with a server, consider the user of the client 102 who selects a farm 38. The selection of the farm 38 sends a request from the client 102 to the ICA browser subsystem 1260 to establish an ICA connection with one of the servers 106 in the selected farm 38. The ICA browser subsystem 2160 sends the request to the program neighborhood subsystem 1270, which selects a server 106 in the farm 38. Address information associated with the server 106 is identified and returned to the client 102 by way of the ICA browser subsystem 1260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 1270 pushes program neighborhood information updates to the client 102. To obtain updates, the program neighborhood subsystem 2170 subscribes to events from the common application subsystem 1524 to allow the program neighborhood subsystem 1270 to detect changes to published applications.

Figure 12B:
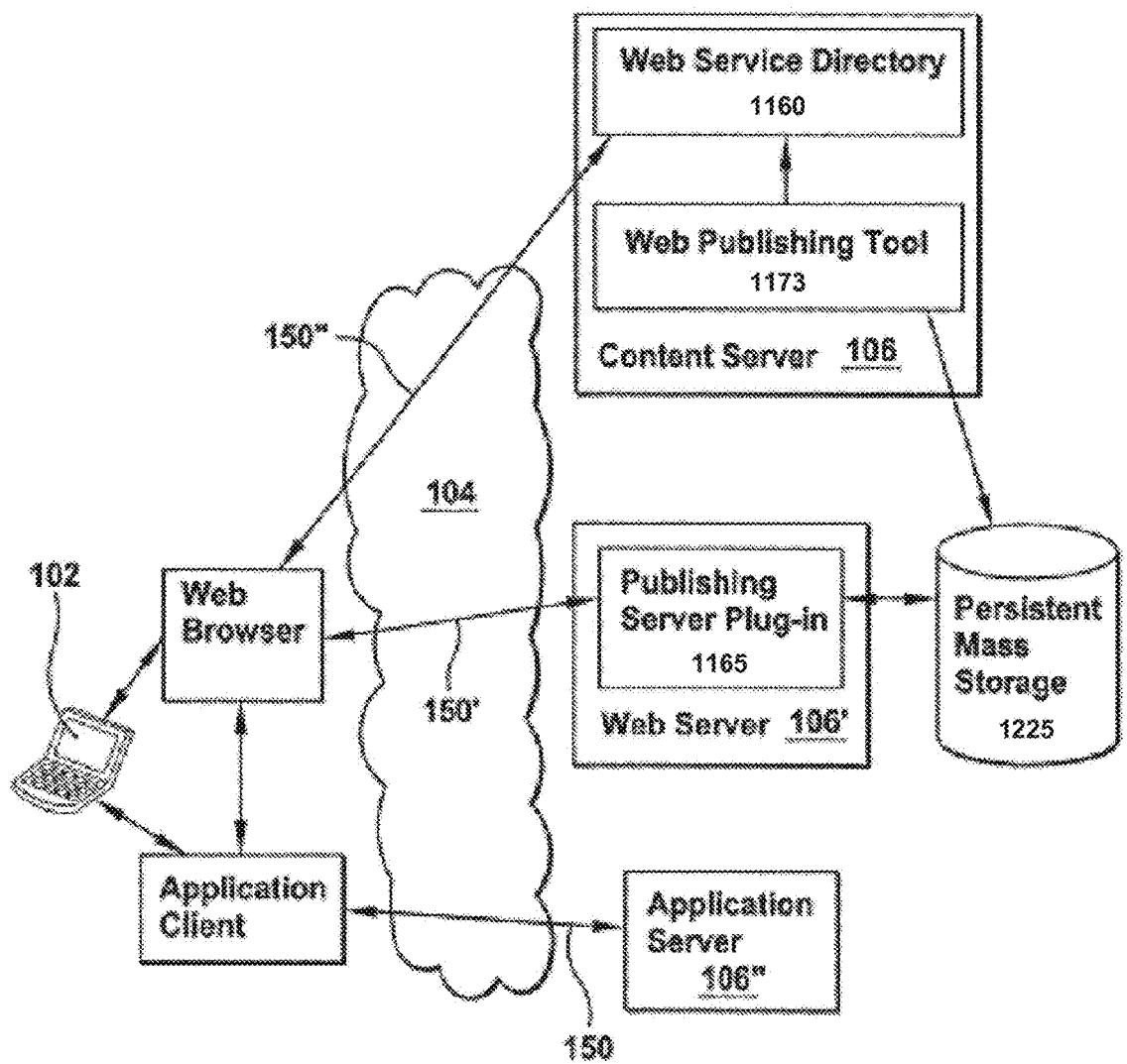
FIG. 12B is a block diagram depicting one embodiment of a system for providing a plurality of application programs available to the client via publishing of GUIs in a web service directory.

Referring to FIG. 12B, a block diagram depicts another embodiment of a system architecture for providing a plurality of application programs available to the client via publishing of GUIs in a web service directory. The system includes the client 102, and a plurality of servers 106. A first server 106 functions as a content server. A second server 106' provides web server functionality, and a third server 106" provides functionality for providing access to application files and acts as an application server or a file server. The client 102 can download content from the content server 106, the web server 106', and the application server 106" over the network 104. In one embodiment, the client 102 can download content (e.g., an application) from the application server 106" over the client-application server communication channel 150. In one embodiment, the web browser on the client 102 uses Secure Socket Layer (SSL) support for communications to the content server 106 and/or the web server 106'. SSL is a secure protocol developed by Netscape Communication Corporation of Mountain View, Calif., and is now a standard promulgated by the Internet Engineering Task Force (IETF). The web browser can connect to the content server 106 and/or the web server 106' using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the IETF. In other embodiments, the web browser communicates with the servers 106 using a communications protocol without encryption, such as the HyperText Transfer Protocol (HTTP).

The client 102 can additionally include an application client 13 for establishing and exchanging communications with the application server 106" over the client-application server communication channel 150. In one embodiment, the application client is a GUI application. In some embodiments, the application client is an Independent Computing Architecture (ICA) client, developed by Citrix Systems, Inc. of Fort Lauderdale, Fla., and is also referred to below as ICA client 13. Other embodiments of the application client include a Remote Display Protocol (RDP) client, developed by Microsoft Corporation of Redmond, Wash., an X-Windows client 13, a client-side player, interpreter or simulator capable of executing multimedia applications, email, Java, or .NET code. Moreover, in one embodiment the output of an application executing on the application server 106" can be displayed at the client 102 via the ICA client. In some embodiments, the application client is an application client such as the application streaming client 1552, described in greater detail in connection with FIG. 16.

The client 102 searches the web service directory 160 for a web service. In one embodiment, the search is a manual search. In some embodiments, the search is an automatic search. The web service directory 1160 may also provide a service based view, such as white and yellow pages, to search for web services in the web service directory. In another embodiment, the web service directory 1160 supports a hierarchical browsing based on a structured service name and service kind for GUI applications. In one embodiment, the web service directory 1160 executes on a server independent of the content server 106, such as a directory server. In other embodiments, the web service directory 1160 executes on multiple servers.

In some embodiments, the content server 106 enables the client 102 to select web services based on additional analysis or information by providing this information or analysis in the web service directory 1160. Examples of service information that the web service directory 1160 can list includes, but is not limited to, the name of the business offering the service, the service type, a textual description of the service, one or more service access points (SAPs), the network type, the path to use (e.g., TCP or HTTPS), and quality of service (QoS) information. Moreover, service information can be client device type or user (e.g., role) specific. Thus, service selection can be based on one or more of the above attributes.

In one embodiment, the service type denotes a programming interface that the client 102 must use to access the web service. For instance, the service type can state that the service is encoded by an interface description language, such as Web Services Description Language (WSDL). The service access point, or SAP, is a unique address for an application. The SAPs enable the computer system to support multiple applications at the client 102 and each server 106. For example, the application server 106" may support an electronic mail (i.e., e-mail) application, a file transfer application, and/or a GUI application. In one embodiment, these applications would each have a SAP that is unique within the application server 106". In one embodiment, the SAP is a web or Internet address (e.g., Domain Name System (DNS) name, IP/port, or Uniform Resource Locator (URL)). Thus, in one embodiment the SAP identifies the address of the web server 106' as part of the address for an application stored on the web server 106'. In some embodiments, the SAP identifies the address of a publishing server plug-in 1165 as part of the address for an application stored on the web server 106', as described below. In one embodiment, the SAP is an "accessPoint" from the UDDI registry.

To prepare an item for publishing in the web service directory 1160, the content server 106 includes a web publishing tool 1170. In one embodiment, the web publishing tool 1173 is a software module. In some embodiments, the web publishing tool 1173 is another server that may be externally located from or internally located in the content server 106.

In one embodiment, the web server 106' delivers web pages to the client 102. The web server 106' can be any server 106 capable of providing web pages to the client 102. In another embodiment, the web server 106' is an Enterprise Information Portal (e.g., corporate Intranet or secured business-to-business extranet). Enterprise portals are company web sites that aggregate, personalize and serve applications, data and content to users, while offering management tools for organizing and using information more efficiently. In some companies, portals have replaced traditional desktop software with browser-based access to a virtual workplace.

The web server 106' can also include a publishing server plug-in 1165 to enable the publishing of graphical user interface (GUI) applications. More specifically, the publishing server plug-in 1165 translates a new web service entry URL into a GUI application service so that the GUI can be accessed via the web service directory 1160. In one embodiment, the publishing server plug-in 1165 is a Common Gateway Interface (CGI) script, which is a program designed to accept and return data that conforms to the CGI specification. The program can be written in any programming language, such as C, Perl, Java, or Visual Basic. In another embodiment, the publishing server plug-in 1165 is a Java Server Page (JSP). Using the publishing server plug-in 165 to facilitate the publishing of remote GUI applications, the client 102 can thereby access the web service, not through a programming interface or a web page, but through a full GUI interface, such as with Citrix's ICA or Microsoft's RDP.

The application server 106" hosts one or more applications that are available for the client 102. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

In some embodiments, one or more communication links 150 are established over different networks. For example, the client-content server communication channel 150' can belong to a first network (e.g., the World Wide Web) and the client-web server communication channel 150" can belong to a second network (e.g., a secured extranet or Virtual Private Network (VPN)).

In one embodiment, the web publishing tool 1173 stores information about an application that the web publishing tool 1173 is currently publishing in the web service directory 160 in a persistent mass storage 1225. In one embodiment the information is a URL for the dynamic publishing server plug-in 1165. The persistent mass storage 1225 may be a magnetic disk or magneto-optical drive. In one embodiment, the persistent mass storage 1225 is a database server, which stores data related to the published application in one or more local service databases. The persistent mass storage 1225 may be a component internally located in or externally located from any or all of the servers 106.

In other embodiments, the content server 106 or the web server 106' communicate with a server 106 in the farm 38 to retrieve the list of applications. In one of these embodiments, the content server 106 or the web server 106' communicate with the farm 38 instead of with the persistent mass storage 1225.

Figure 13A:
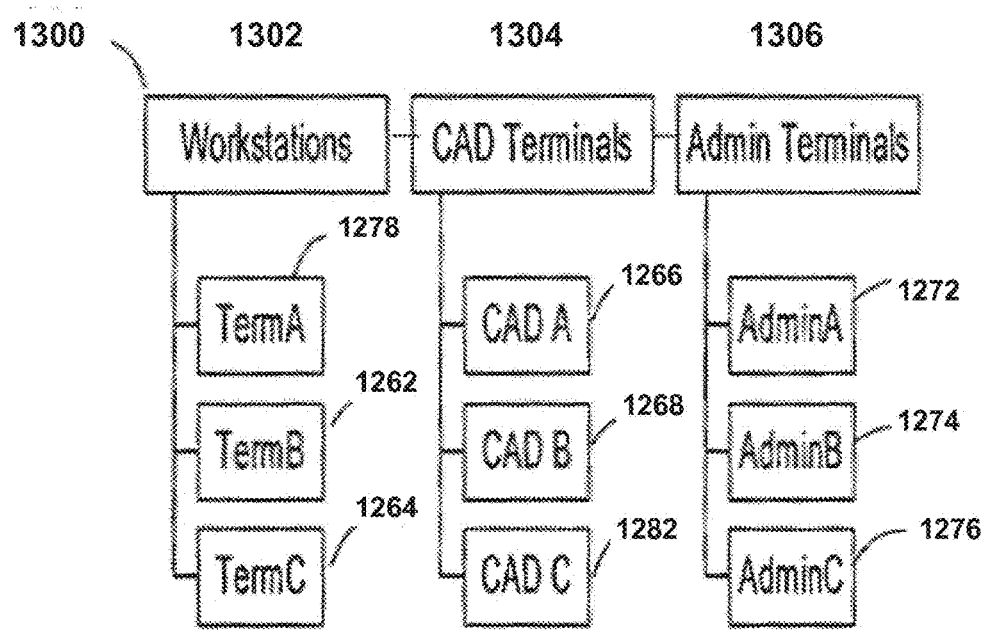
FIG. 13A is a diagram of a set of computer network resource groupings according to an illustrative embodiment of the invention.
Figure 13B:
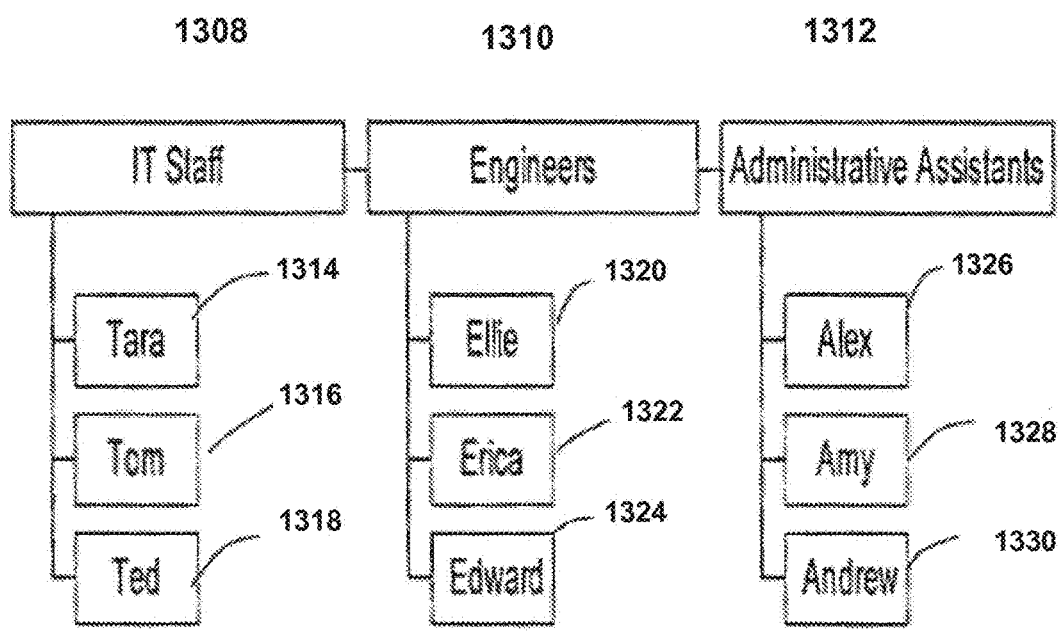
FIG. 13B is a diagram of a set of computer network user groupings according to an illustrative embodiment of the invention.

Referring to FIG. 13A and FIG. 13B, to ease the burden on system administrators, system administrators may use the access administration system 1226 or one of its constituent systems to aggregate users and resources into groups that share common characteristics, since as the number of network resources and users of a computer system 1200 increases, it becomes increasingly time consuming to individually assign access rights to each user. Referring to FIG. 14A, an illustrative set 1300 of network resources of the computer system 1200 may be grouped into Workstations 1302 which includes TermA 1202, TermB 1204, and TermC 1206; CAD Terminals 304 which includes CAD A 1214, CAD B, 1216, and CAD C 1218; and Administrative Assistant Terminals AdminA 1208, AdminB 1210 and AdminC 1212. Referring to FIG. 12B, an illustrative set 1307 of computer users may be grouped as follows: Tara 1314, Tom 1316, and Ted 1318 may be grouped as members of the Information Technology (IT) Staff 1308; Ellie 1320, Erica 1322, and Edward 1324 may grouped as Engineers 1310, and Alex 1326, Amy 1328, and Andrew 1330 may be grouped as Administrative Assistants 3112.

In one embodiment, a system administrator may specify groupings of users and/or resources using the access administration system 1226. In one embodiment, the access administration system 1226 provides a graphical user interface with which a system administrator may drag and drop, or point-and-click to add users or resources to groups. In another embodiment, the enrollment administration system 2128 also provides group-management functionality via a similar interface. The groups created for the purposes of specifying enrollment rules may be different from the groups created for specifying other access rules.

After groups of users and resources are defined, rules may be specified to limit the ability of a group of users 1308, 1310, or 3112 to both directly and/or remotely access and use a group of network resources 1302, 1304, and 1306. For example, since members 1314, 1316, and 1318 of the IT staff 1308 are responsible for maintaining the computers 1202, 1204, 1206, 1208, 1210, 1212, 1214, 1216, and 1218, a system administrator would likely want to give the of IT Staff 1308 access to all of the computers 1202, 1204, 1206, 1208, 1210, 1212, 1214, 1216, and 1218. In contrast, a system administrator may want to limit Administrative Assistants 1312 to only be able to access the Administrative Assistant Terminals with lesser capabilities. Engineers 3110 may be granted access to Workstations 1302 and CAD Terminals 3104, but not to the Administrative Assistant Terminals 1306 used by Administrative Assistants 1312.

In one embodiment, a system administrator may restrict the ability of a user to remotely access a networked resource without specifying individual user/resource limitations. As mentioned above, the computer system 2100 operates under a presumption that a computer user should only be able to remotely access a computer to which the user is capable of achieving direct physical access. If a user does not have physical access to a networked resource, that user should not be able to circumvent physical security measures by accessing the networked resource remotely. Here, physical access means access to an input device (such as a keyboard, mouse, trackball, microphone, touchscreen, joystick, etc.) connected to a console that is physically attached to the networked resource. Connection may include wireless communication in the case where input devices communicate with a resource using a short range wireless signal (e.g., a wireless keyboard or mouse). In a simple example, Engineers 1310, in general, have access to CAD Terminals 1304 but only in the buildings in which they work. Engineer Ellie 1220, working in the second building 1222, does not have physical access to CAD C 1212, because it is located in the first building 1220. Likewise, if Ellie keeps her Workstation 1302, TermA 1402, in a locked office for privacy or security reasons, other users will not have physical access to that workstation 1302.

According to an embodiment of the invention, to enforce this extension of physical access limitations into the remote access environment, the computer system 1200 includes the enrollment functionality described above. Namely, a user cannot gain remote access to a networked resource of the computer system 1200 if the user has not first enrolled the networked resource. In some embodiments, a user may only enroll a networked resource if the user requests enrollment using an input device (e.g., keyboard, mouse, microphone, display, etc.) connected to a console that is physically attached to the networked resource. As such, if a user cannot physically access such an input device, the user will not be able to enroll the network resource and will not be able to access the networked resource remotely.

In one such embodiment, not all users who have direct physical access to a computer may enroll the computer. Enrollment rules specify which users or groups of users are authorized to enroll which networked resources or groups of networked resources. In some embodiments, the enrollment rules are specified at a user/resource group level rather than at an individual user/resource level, for purposes of efficiency. The groups may be the same groups as used for specifying other access rules or the groups may be different.

Referring to FIG. 14A, a table 1400 depicts illustrative enrollment rules, where rows represent groups of users 1308, 1310, and 1312, and columns represent groups of networked resources 1302, 1304, and 1306. A system administrator specifies enrollment rules, for example using the enrollment administration system 1228. To do so, the system administrator defines a plurality of groups of users 1308, 1310, and 1312 and also defines groups of networked resources 1302, 1304, and 1306 as described above with respect to FIGS. 13A and 12B. The system administrator then specifies which groups of users may enroll which groups of networked resources. For example, in the table 1400, a system administrator has specified that IT staff members 1308 can enroll Workstations 1302, CAD Terminals 3104, and Administrative Assistant Terminals 1306 as indicated by the "X" s at the intersections of the IT Staff 1308 row and the columns for each of the groups of networked resources. Similarly, Engineers 1310 can enroll Workstations 1302 and CAD Terminals 1304, and Administrative Assistants 1312 can only enroll Administrative Assistant Terminals 1306.

It should be understood that these rules may be specified in a table form as just described, but also or instead through use of commands, data lists, data files, XML, tags or any other suitable mechanism for rule specification.

Using the enrollment administration system 1228, system administrators can readily alter enrollment rules once specified. For example, to reflect changes in staffing (e.g., the firing, hiring or shifting of an employee) the system administrator may add or remove users to and from user groups. The same may be done for networked resource groups. Policy decisions affecting entire groups may be implemented by changing the groups of networked resources that a group of users is permitted to enroll. For example, if the system administrator that specified the enrollment rules in the table 1400 decided that Administrative Assistants 1312 should also be able to enroll all workstations, the rule for Administrative Assistants 1312 may be altered accordingly.

In the case that a system administrator removes the ability of one or more users, or groups of users to enroll one or more network resources, the users affected will no longer be able to enroll those networked resources. In some embodiments, if the networked resources were already enrolled by the affected users, the change in the enrollment rule may cause the networked resources to be unenrolled.

Figure 15:
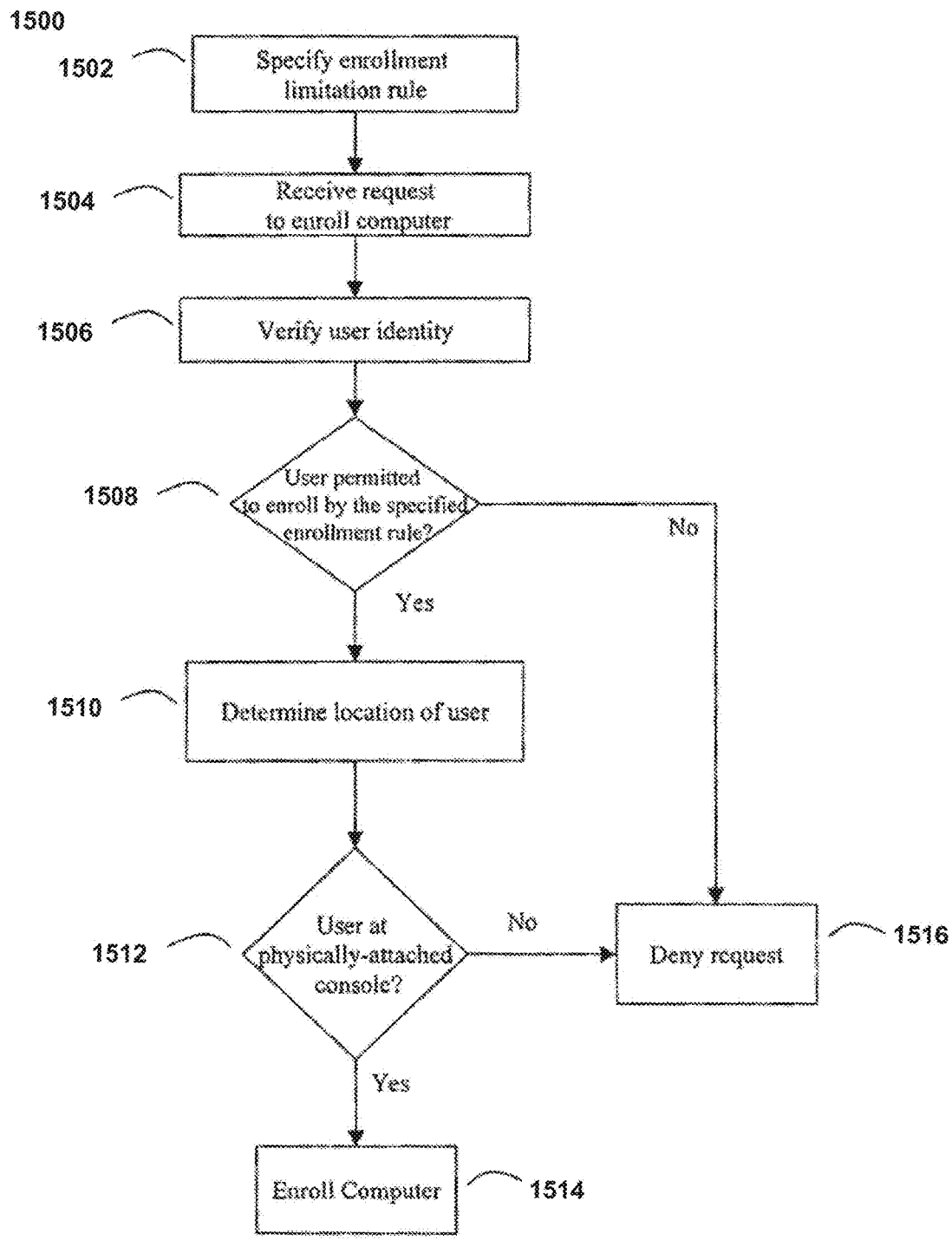
FIG. 15 is a flow chart of a method for enrolling a networked resource according to an illustrative embodiment of the invention.

Referring to FIG. 15, a flow chart of a method 5100 of enrolling a networked resource (e.g., computers 1202, 1204, 1206, 1208, 1210, 1212, 1214, 1216, and 1218) begins with specification of enrollment rules (step 1502), for example by a system administrator as described above. When a user requests to enroll a networked resource (step 1504), the enrollment system 230 verifies the identity of the user (step 1506). Identity verification (step 1506) may be achieved through any identity authentication means, including for example, user-password or PIN authentication, biometric identification, voice identification, etc.

The enrollment system 1230 and the enrollment administration system 2128 determine whether the user is permitted by the enrollment rules to enroll the networked resource that the user is requesting to enroll (step 1508). In the illustrative embodiment, the enrollment system 1230 sends an enrollment request to the enrollment administration system 1228. The enrollment request includes the identification of the networked resource that the user is requesting to enroll and the identification of the user. The enrollment administration system 1228 then compares the networked resource/user pairing with the enrollment rules to determine if the user is a member of a group that has permission to enroll any of the networked resources of the group to which the networked resource in question belongs.

Single-use copies of the enrollment rules may be downloaded to the networked resource from the enrollment administration system 1228 each time a user attempts to enroll a networked resource, and in other implementations a networked resource may maintain a persistent set of enrollment rules that is updated by the enrollment administration system 1228 when a system administrator alters the enrollment rules. In either of these cases, the permission verification (step 1508) is carried out on the networked resource.

If the user is permitted to enroll the networked resource based on the enrollment rules, the location of the user is determined (step 1510). In one embodiment, a locator system determines the location of the user by retrieving the IP address of the networked resource from which the enrollment request was sent, typically included in the header of the packets that made up the communication, and executing a reverse Domain Name Server (DNS) look-up routine to determine the source of the request. The enrollment administration system 1228 then determines whether the user requested enrollment of the networked resource from a console that is physically attached to networked resource the user is requesting to enroll (step 1512) by comparing the determined enrollment request source with the networked resource that is identified in the enrollment request. In another embodiment, the locator system transmits to, and causes the execution of a Java® applet or ActiveX® control on the requested resource to determine whether the user is actually logged in to a console that is physically attached to the resource. In a further embodiment, the source of the request may be verified by transmitting to, and causing the execution of a Java® applet or ActiveX® control on the source of the request that forces the source to identify itself. The enrollment administration system 1228 then compares the forced identification with the network resource the user requested to enroll. In one embodiment, the enrollment administration system carries out a combination of two or more of the above listed verification methods to ensure a robust request source identification.

If it is determined that the user sent the enrollment request from a console that is physically attached to the networked resource that the user is requesting to enroll (step 1512), the enrollment administration system 1228 enrolls the networked resource for the user (step 1514) by updating an enrollment database. (See FIG. 17 below). If the user is not permitted to enroll the networked resource based on the enrollment rules, or it is determined that the user is attempting to enroll the computer from a remote location, enrollment is denied (step 1516). In an another embodiment, the enrollment administration system 2128 determines the location of the user and verifies that the user is requesting enrollment of the networked resource from which the enrollment request originated before determining whether the user is permitted to enroll the networked resource according to the enrollment rules. In a further embodiment, the enrollment administration system 1228 enables a system administrator to specify enrollment rules that allow a group of users to remotely enroll networked resources or to specify groups of resources that may be enrolled remotely. For example, in one embodiment, enrollment rules allow a user to enroll a file server (or a portion of a file server) that is part of a secure network from a console that is a part of that secure network but that is not physically attached to the file server.

Referring to FIG. 16, the enrollment administration system 1228 maintains the information about enrolled resources and users. This storage may be implemented in many ways, including in the form of data files in a database. As shown in the illustrative depiction of the contents of an enrollment database 1600, in the figure, the database 1600 stores enrollment data for each individual user and each networked resource. When a user successfully enrolls a networked resource (step 1514), the enrollment is stored in the enrollment database 1600. For example, according to the enrollment database 1600, engineer Ellie 1320 has enrolled TermA, CAD A and CAD B. The table is consulted when a user attempts to remotely access a networked resource.

Figure 17:
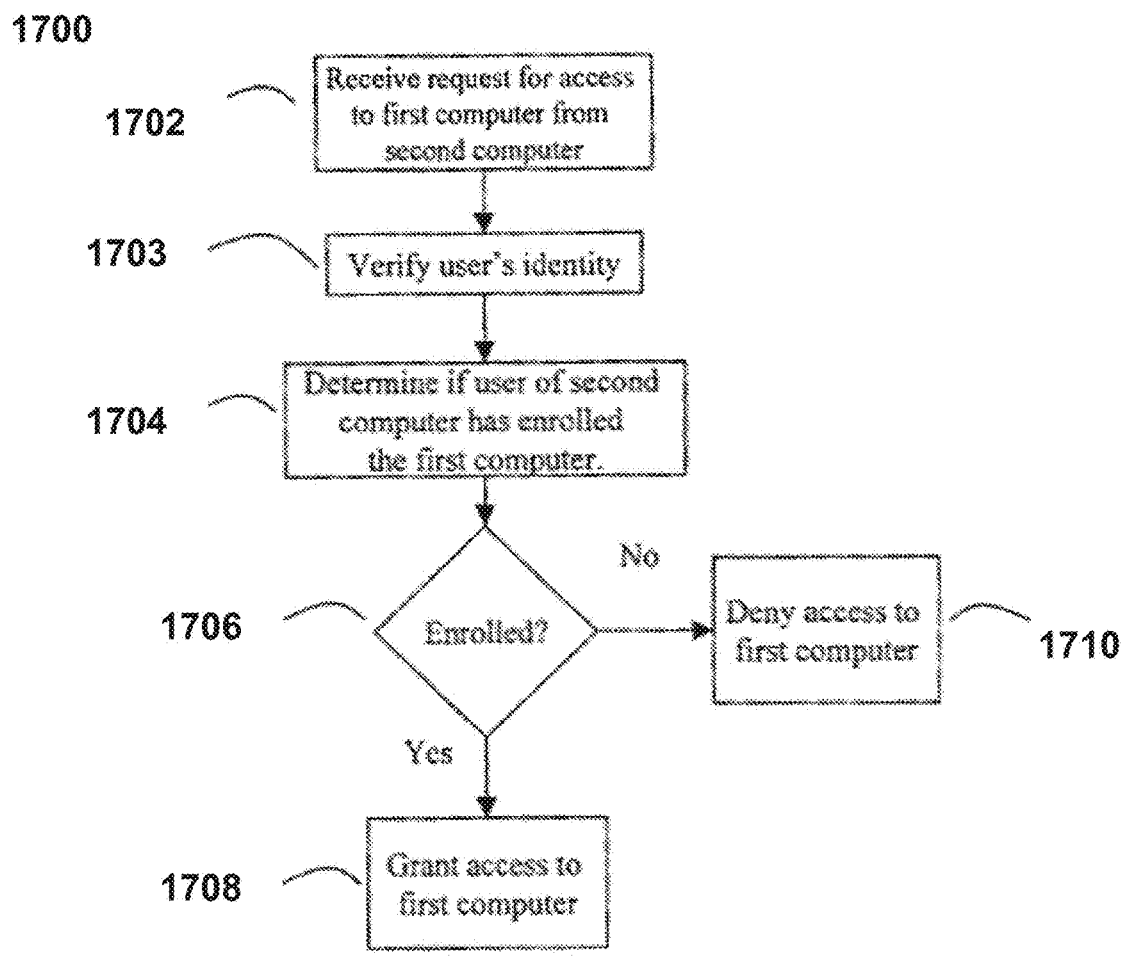
FIG. 17 is a flow chart of a method of granting remote access to a computer according to an illustrative embodiment of the invention.

Referring to FIG. 17, a method 1700 of granting remote access to a networked resource includes querying the enrollment database for example, the enrollment database 1600. When a user attempts to remotely access the first networked resource 1100, the request for access is received by the remote access system 1232 (step 1702). The remote access system 1232 verifies the identification of the user (step 1703), also referred to as authentication. As described above in relation to verifying an identity of a user in the enrollment context, the remote access system 1232 may authenticate a user using any suitable identity authentication means, including user name-password/PIN pairs, certificates, biometric data, one time keys, voice samples, etc. The remote access system 1232 then determines whether the user has previously enrolled the first networked resource (step 1706). If the user has previously enrolled the first networked resource, the remote access system 1232 grants access to the first networked resource (step 1708), otherwise the remote access system 232 denies remote access to the first networked resource.

In some embodiments, a system administrator could set additional remote access rules that limit which remote devices users may use to remotely access networked resources. For example, a system administrator may specify a rule that only allows users or groups of users to remotely access networked resources or a group of networked resources from a networked resource directly connected to the computing system 1200. Under such a rule, Tara 1314, for example, who according to the enrollment database 1600 has enrolled AdminC 1218, could remotely access AdminC 1218 from AdminA 1214, but Ted 1318, who also has enrolled AdminC 1218 could not remotely access AdminC from remote device 1102.

Figure 18A:
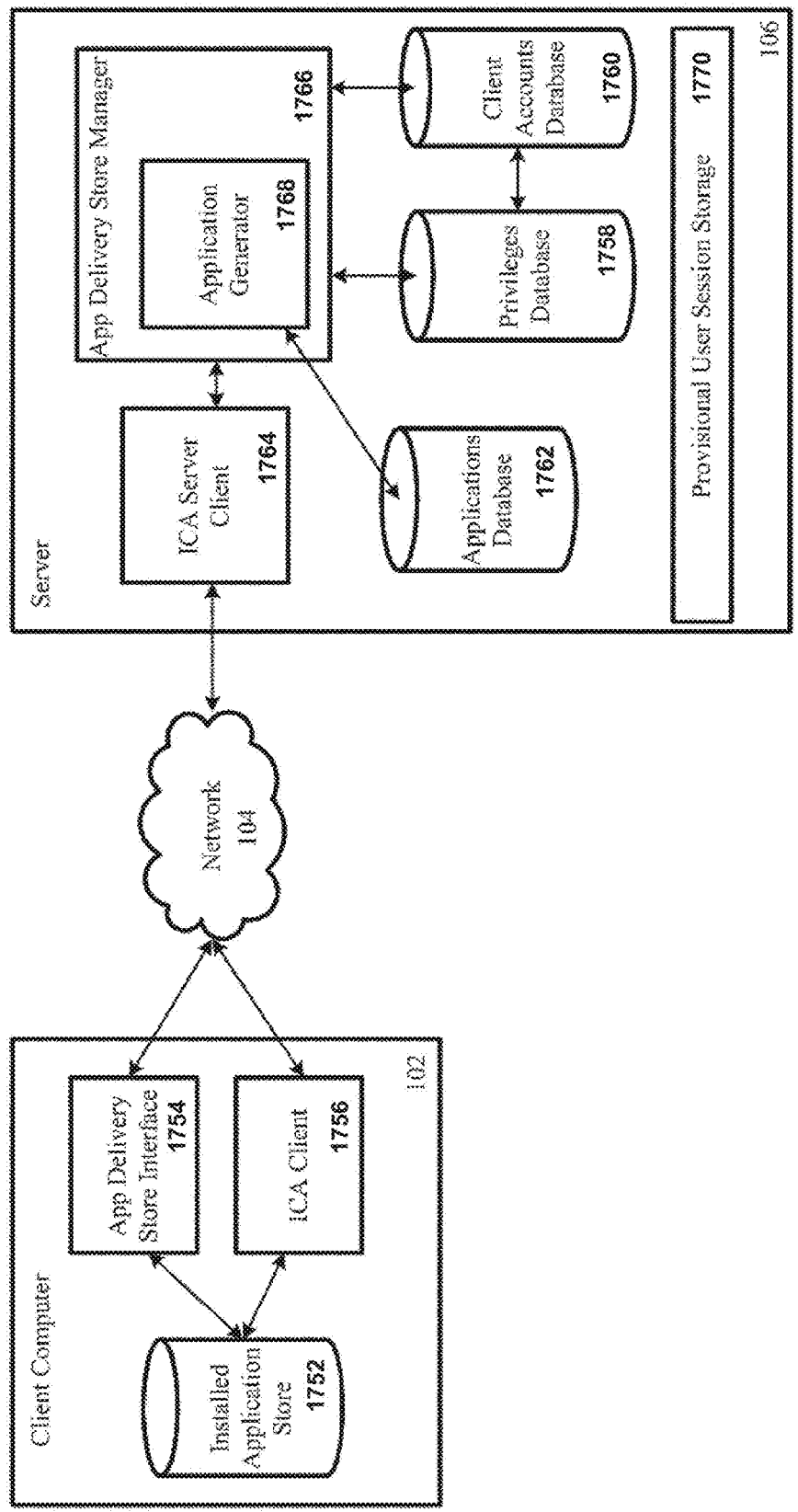
FIG. 18A is a block diagram of an embodiment of a system for delivering an interactive application store.

Illustrated in FIG. 18A is an embodiment of a system that can provide users with an application store. Included within the system is a client 102 that can communicate with a server 106 via a network 104. The client 102 can comprise an installed application store 1752, an Anthem interface 1754, and a communication client 1756. Each of the Anthem interface 1754 and the communication client 1756 execute on the client 102 and each of the Anthem interface 1754 and the communication client 1756 communicate with each other and with the installed application store 1752. Both the Anthem interface 1754 and the communication client 1756 can communicate with components on the server 106 via the network 104. The server 106 can comprise a server communication client 1764 communicating with an Anthem manager 1766 which further communicates with an application database 1762, a privileges database 1758 and a client accounts database 1760. In one embodiment, an application generator 1768 executes within the Anthem manager 1766 and communicates directly with the applications database 1762. Further included on the server 106 is a provisional user session storage 1770.

Further referring to FIG. 18A, and in more detail, in one embodiment the client 102 can be any of the clients described herein. Similarly, in some embodiments the server 106 can be any of the servers described herein. The client 102 can communicate with the server 106 via the network and over a communication channel. In some embodiments, the client 102 can communicate with the server 106 via the ICA protocol. The network 104 can, in some embodiments, comprise any of the networks described herein.

In one embodiment, included on the client 102 is an installed application store 1752 that can in some embodiments communicate with both the ICA client 1756 and the Anthem interface 1754. In one embodiment, the installed application store 1752 can include a listing or table of each of the applications stored or installed on the client 102. This listing can in some embodiments include a listing of only those applications that were installed using Citrix. In other embodiments, the listing can include a listing of all remotely provided or streamed applications. In still other embodiments, the listing can include all applications installed on the client 102. The ICA client 1756, in one embodiment, can retrieve an enumeration of all the applications installed or stored on the client 102 and can send this enumeration to the server 106 where it can be processed by the Anthem manager 1766. In some embodiments, the Anthem interface 1754 can use an enumeration from the installed application store 1752 to determine how to display to a user of the client 102 the listing of available applications. The installed application store 1752 can in some embodiments also store configuration information for each of the applications listed or stored in the store 1752. For example, the installed application store 1752 may store an entry indicating that an instance of MICROSOFT WORD is installed on the client 102. This entry may further comprise configuration information indicating whether a user should interact remotely with the instance of MICROSOFT WORD or whether MICROSOFT WORD application files will be streamed to the client 102 when the user requests, via the client 102, to execute MICROSOFT WORD. In one embodiment, the installed application store 1752 may store application stubs or skeletons associated with an application.

An Anthem interface 1754 can be included on the client 102. In one embodiment, the Anthem interface 7154 can interact with the ICA client 1756 such that the Anthem interface 1754 can receive information from the ICA client 1756 and can further transmit commands or information to the ICA client 1756. The ICA client 1756 can in some instances transmit graphical application data to the Anthem interface 1754, while in other embodiments the ICA client does not interact with the Anthem interface 1754. The Anthem interface 1754, in some embodiments, can comprise a web-based interface that displays a listing of applications installed on a client 102, a listing of applications that are available to a particular user, and a listing of applications that are not installed on a client 102. A user of the client 102 can download applications onto the client 102 by selecting an application within the Anthem interface 1754 and clicking an associated button labeled "Add."

In one embodiment, the ICA client 1756 can communicate with the ICA server client 1764 executing on the server 106. The ICA client 1756 can facilitate the transfer of application graphical data and server commands from the server 106 to the client 102, and can facilitate the transfer of commands and information from the client 102 to the server 106. In one embodiment, the ICA client 1756 is a communication client, while in other embodiments the ICA client 1756 is a communication module. The ICA client 1756 can use the ICA protocol or any other presentation level protocol to transmit graphical application output from one computing machine to another.

The Anthem interface 1754 and the ICA client 1756 can communicate with the server 106 via a network. In one embodiment, each of the interface 1754 and the client 1756 can communicate with an ICA server client 764 executing on the server 106. In one embodiment the ICA server client 1764 is a client, module or application executing on the server 106 and facilitating the transfer of information from one computing machine to another. The ICA server client 1764 can be referred to as a server-specific communication module, a communication module or client, or a server client. In some embodiments the ICA server client 1764 can facilitate the transfer and receipt of application commands and graphical application output using the ICA protocol, in other embodiments the ICA server client 1764 can use another presentation level protocol.

Also executing on the server 106 is an Anthem manager 1766 that can manage the generation of the Anthem interface 1754 and that in some embodiments, can generate the Anthem interface 1754 and transmit the interface 1754 to the client 102. The Anthem manager 766 can communicate with the privileges database 1758 and the client accounts database 1760. In one embodiment, the Anthem manager 1766 can query the privileges database 1758 with respect to a particular user and request from the privileges database 1758 a listing of the application, configuration and access privileges for a particular user. The Anthem manager 1766 can use this information to determine which applications should be listed within the Anthem interface 1754. In some embodiments, the Anthem manager 1766 may place restrictions on the applications listed in the Anthem interface 1754 based on the privileges received from the privileges database 1758 for a particular user. For example, user 1 may have full access to all MICROSOFT OFFICE applications but has limited access to MATLAB applications. The privileges database 1758 could, in this example, include an entry for user 1 indicating that the user may download and configure all MICROSOFT OFFICE applications at-will, but that there are certain restrictions on the user's access to MATLAB applications. In one embodiment, the entry in the privileges database 1758 may indicate that the user must fill out a workflow request and request access to MATLAB applications before the user is able to receive the MATLAB application. In another embodiment, the privileges database 1758 may indicate that a MATLAB application would cost the user a certain amount of money, points or employee credits (e.g., MATLAB would cost the user $300 or 500 employee credits.) In still another embodiment, the privileges database 1758 may indicate that the user may only download a pared down version of MATLAB.

In some embodiments, the Anthem manager 1766 may communication with a clients accounts database 1760 that stores information about the users of a system. In one embodiment, the client accounts database 1760 can include information about the amount of money, employee credits or points available to a particular user. This information can be used by the Anthem manager 1766 to make access control decisions. For example, in the above example the Anthem manager 1766 could receive information from the privileges database 1758, indicating that a user may purchase MATLAB for $300 U.S. dollars. In response, the Anthem manager 1766 may query the client accounts database 1760 to obtain a listing of the amount of money that particular user has available to purchase MATLAB and may either incorporate this determination into the Anthem interface 1754 or may use the information to determine whether the user can download MATLAB.

Executing within the Anthem manager 1766 can be an application generator 1768 that can create application stubs when the Anthem manager 1766 receives a request to download to a client 102 a particular application. In one embodiment, the Anthem manager 1766 receives a request to download to the client 102 a first application and passes that request to the application generator 1768. In response the application generator 1768 queries the applications database 1762 for application-specific information and generates an application stub using information received from the applications database 1762. The application-specific information can include any of the following information: an icon or graphical image associated with the requested application; a path indicating where the application is located on a remote computing machine or application server; a path indicating a streaming application able to stream to the client 102 the application files associated with the requested application; configuration information regarding whether the application should be streamed or interacted with remotely; configuration information regarding how the application should be displayed within the client's 102 desktop; configuration information regarding what should be installed in the client's 102 registry or file directory; or any other information pertinent to the installation of the application on the client 102. Generating the stub application can in some embodiments comprise the method described in FIG. 20.

In some embodiments the application generator 1768 can execute on a client computing machine. In these embodiments, the application generator 1768 can generate application stubs on the client rather than on a remote server. In other embodiments, the application generator 1768 can execute partially on the client and partially on the server. In still other embodiments, the application generator 1768 can execute on a computing machine remote from both the client and the server. The client 102 can talk to multiple servers, therefore one or more application generators 1768 can execute on any of the servers and provide applications or application stubs to the client. Similarly, a user can access one or more application stores. A user's Anthem account can include one or more additional Anthem accounts. Therefore if a user has access to a first Anthem account, a second Anthem account and a third Anthem account; the user's first Anthem account can include both the second and third Anthem account.

While the above-mentioned and below-included descriptions illustrate the Anthem interface and Anthem manager in terms of a virtual communication channel, in some embodiments the Anthem interface and Anthem manager can operate independent of a virtual communication channel such that the interface and manager communicate directly with each other over a network.

Also included on the server 106 can be a provisional user session storage 1770 that can be used to store temporary user session information. For example, the provisional user session storage 1770 can be used to temporarily store a listing of the applications stored locally on a client 102 and associated with a particular user. This listing can be used by the Anthem manager 1766 to determine which applications have already been installed on a particular client 102 and for a particular user. In some embodiments, the Anthem manager 1766 can use the information stored in the provisional user session storage 1770 to synchronize a user's stored applications from machine to machine.

Figure 18B:
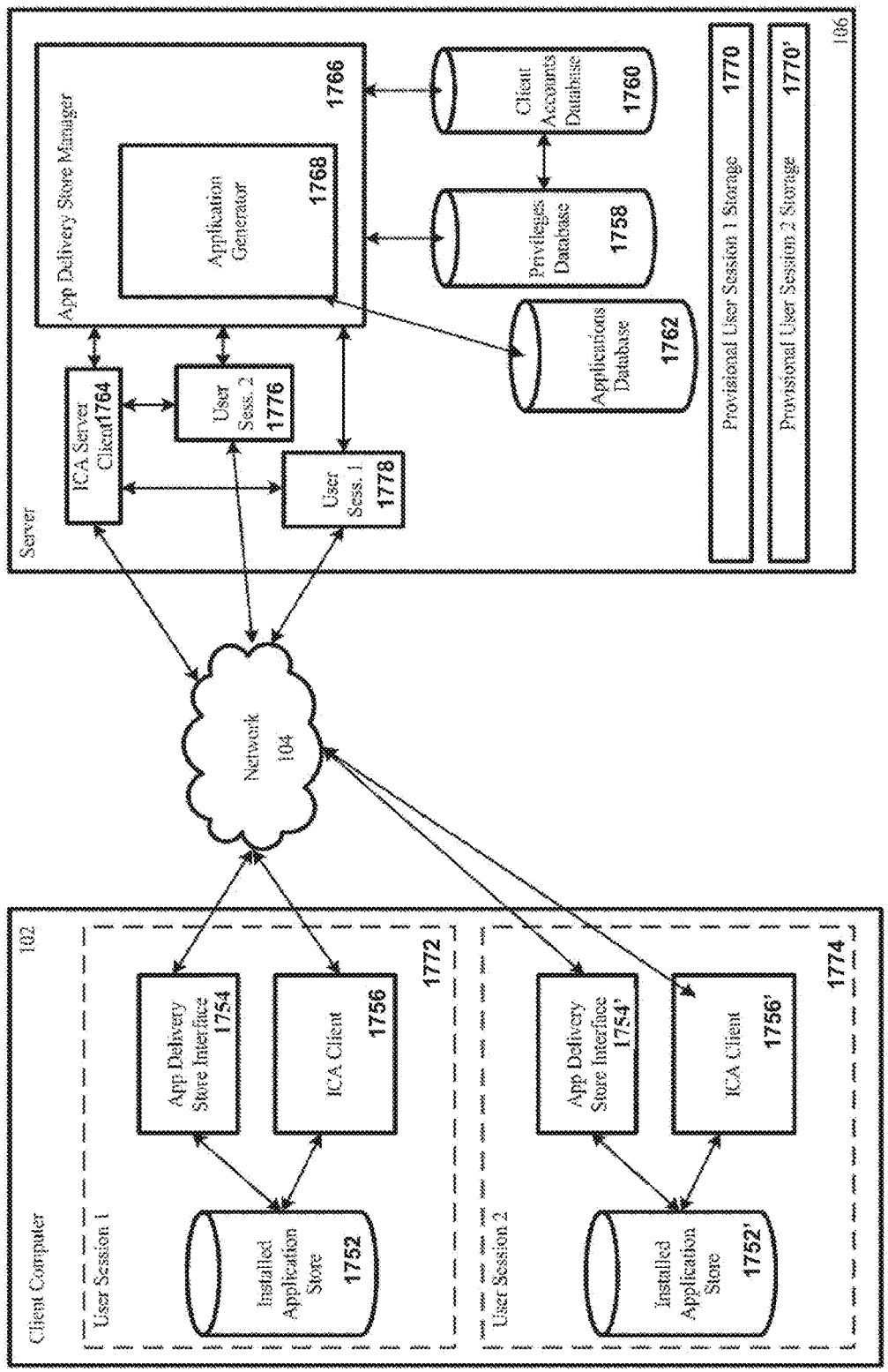
FIG. 18B is a block diagram of an embodiment of a system for delivering an interactive application store.

While applications can be installed through the Anthem manager 1766 and Anthem system, in some embodiments an application can be installed by executing or otherwise launching a file attached to an email. In one embodiment, a user accesses a file attached to an email. The file is associated with a program not currently installed in the user's system. The Anthem system (e.g., the Anthem interface and manager), detects the un-known file-type and launches an application associated with the attached file. In one embodiment, the application is added to the user's Anthem folder. The application can be added as a matter of course, or according to a policy system or set of user configurations. In some embodiments, a determination is first made as to whether the user may install the application, and when the user has permission to install the application. In other embodiments, the Anthem manager may temporarily install the application in the user's Anthem folder. Once the user finishes accessing the attached file, the application is uninstalled from the user's Anthem folder. In still other embodiments, Illustrated in FIG. 18B is an embodiment of a system for providing users with an interactive application store. In this embodiment, two users are logged into the server 106 and therefore the Anthem manager 1766 where each user is logged onto the same client 102. In one embodiment, a first user is logged into the client 102 via a first user session 1772, while a second user is logged into the client 102 via a second user session 1774. The first user session 1772 on the client 102 corresponds to a first user session 7178 on the server 106, while the second user session 1774 on the client 102 corresponds to a second user session 1776 on the server 106. Each user session 1772, 1774, 1776, 1778 can communicate with the ICA server client 1764, and each user session 1772, 1774, 1776, 1778 can communicate with the Anthem manager 1766. Further each user session 1776, 1778 on the server 106 is associated with provisional user session storage 1770, 1770'. Each user session on the client 102 has an instance of an installed applications store 1752, 1752', Anthem interface 1754, 1754' and an ICA client 1756, 7156'. In one embodiment, a user of a client 102 can initiate a communication session with the server 106. This communication session can result in the creation of a user session on the client 102 and a user session on the server 106. In some embodiments, within each user session on the server 106 are applications or application instances executing on the server 106, a user profile comprised of application configuration information particular to a specific user, a file directory particular to a specific user, or other user-specific information. In one embodiment, the user-session-specific information is stored within the user session 1778, 1776 on a server 106, while in other embodiments the user-session-specific information is stored within provisional user session storage 1770, 1770'. Each user session can communicate with the Anthem manger 1766 on the server 106 and in some embodiments each user session can include an instance of the Anthem manager. In some embodiments, the user sessions 1778, 1776 on the server can communicate with anyone of the applications database 1762, the privileges database 1758 and the client accounts database 1760. In one embodiment, each user session can communicate with the client accounts database 1760 such that a user, via the user session, can retrieve information about their account. For example, a use may be able to retrieve information about how much money or credit they have in their account and in some instances may be able to place more money or credit into their account.

In some embodiments, a user may be barred from downloading or otherwise installing a new application until a workflow request is granted. The user may select and application for download. This selection can cause the creation of a work order which, in some embodiments, is displayed to the user so that the user can fill in information relating to the application request. Information that can be requested from the user may include: credit card details; payment details; details regarding why the user has requested the application, e.g., details about a project or work assignment for which the application is needed; manager and group details, e.g., whether the manager has given approval, the manager's contact information, group name or department name; and any other details that may be used by an administrator to determine whether a particular user should have access to the requested application. In some embodiments, the application is not downloaded into the user's Anthem folder until the workflow request has been approved by the appropriate person. In other embodiments, the application is provisionally downloaded into the user's Anthem folder for a limited period of time. If the user's workflow request is approved, then the application remains in the user's Anthem folder. If the user's workflow request is rejected, then the application is removed from the user's Anthem folder. Determining whether to provide provisional application access can include reviewing how many times a user has requested a particular application.

Figure 19:
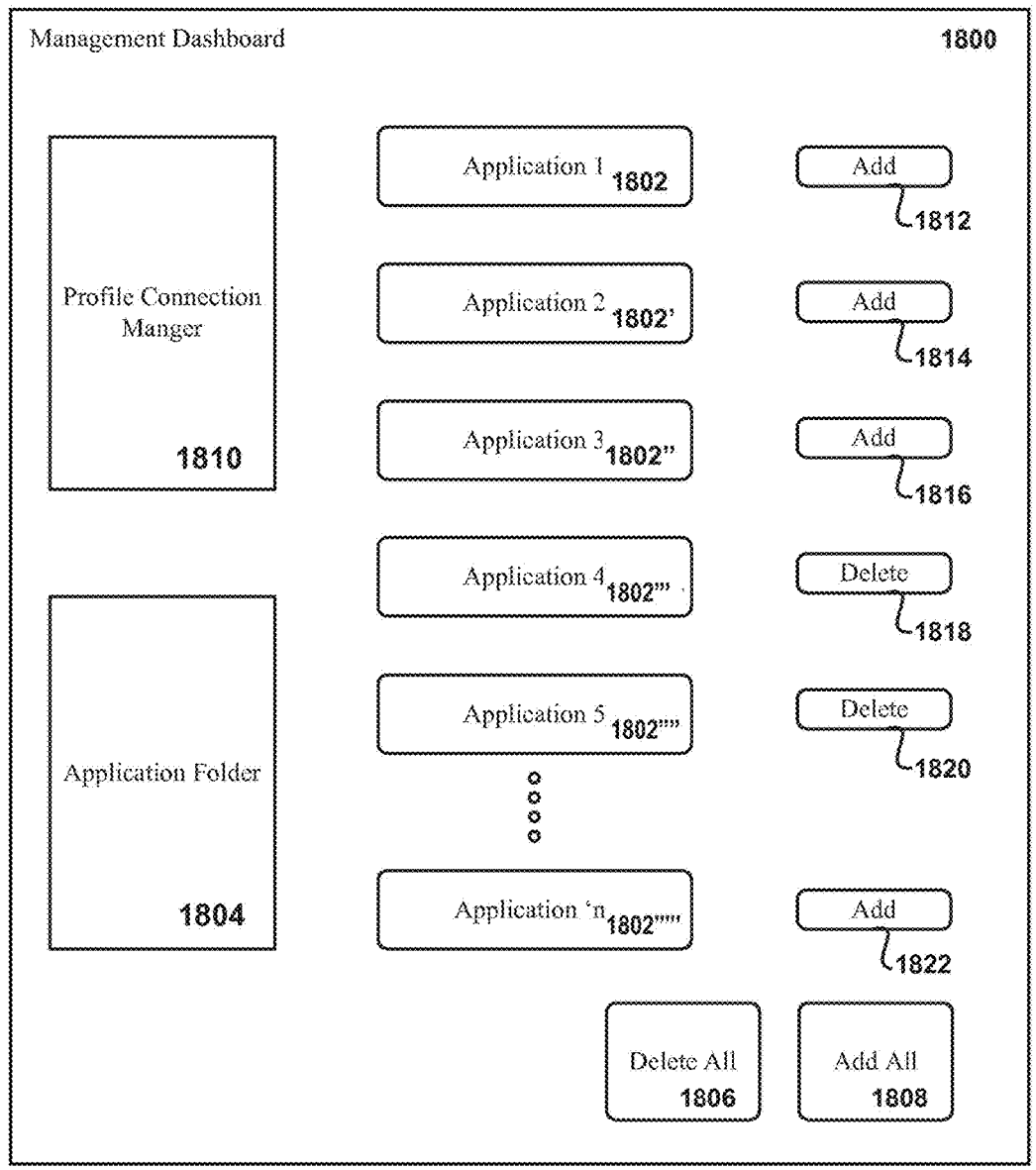
FIG. 19 is a block diagram of an embodiment of an interface for an application for delivering an interactive application store.

Illustrated in FIG. 19 is an embodiment of the Anthem interface 1754, 1800. In one embodiment the Anthem interface can include a listing of applications 1802, 1802', 1802'', 1802''', 1802'''', 1802''''' that are either installed on the client 102, not installed on the client 102, available for download by the user or available for the user to request via a workflow. The applications 1802, 1802', 1802'', 1802''', 1802'''', 1802''''' can be a first application, a second application, a third application, a fourth application, a fifth application and any 'n' number of applications. Collectively the applications can be referred to as applications 1802. The applications 1802 can be display graphically via an icon associated with the application and can be any one of: a web application such as GOOGLE DESKTOP; an executable application such as MICROSOFT WORD; an accelerator client for a LAN, WAN or any other network; a desktop such as Xen Desktop or any other desktop; a virtual machine; a cloud application such as those provided by AMAZON; a hypervisor; or any other application, virtual machine, desktop or hardware client provided as software able to be deployed via the Anthem manager and the Anthem interface. In some embodiments the application 1802 can be streamed to the client 102, in other embodiments the application 1802 can be downloaded to the client 102, while in still other embodiments the application 1802 can be remotely provided to the client via a communication channel over which graphical application output can be transmitted from the server 106 to the client 102.

In some embodiments, the applications 1802 listed within the Anthem interface 1800 can include those application 1802 that a user of a client 102 is authorized to download. This list can be configured by an administrator through the Anthem manager 7166 or via any other administrative module or client communicating with either the Anthem manager 1766 or the Anthem interface 1754. In one embodiment, an administrator may generate a list of recommended applications and these applications may be displayed within the Anthem interface 1800 and in some embodiments may be displayed within the Anthem interface 1800 having a notation next to them indicating that the application 1802 is a recommended application.

In some embodiments, the Anthem interface 1800 can include applications available on one or more virtual machines executing on a local machine. In some embodiments, when the Anthem interface 1800 is launched, a list of applications is downloaded into a user's profile. These applications are then displayed within the Anthem interface 1800 as though they were available through the Anthem program. These programs, in some embodiments, can include programs that are locally available on a computing machine and that are accessible via a virtual machine executing on the local computing machine.

In some embodiments, one or more virtual machines can execute on a local computing machine hosting or otherwise executing the Anthem interface 1800 and accompanying program. The virtual machines can further execute or host one or more applications available only when the virtual machine executes on the local computing machine. In one example, a user can access the Anthem interface 1800 via a first computing machine. Installed on the first computing machine can be a first virtual machine for accessing the user's local desktop, and a second virtual machine for accessing the user's work desktop. Either of these desktops can be remotely hosted, or can be locally hosted by the virtual machine. Management and selection of which virtual machine to execute can be done via a hypervisor executing on the first computing machine. Each virtual machine can comprise a unique computing environment such that the first virtual machine can execute and otherwise provide a first set of applications, while the second virtual machine can execute and otherwise provide a second set of applications. The Anthem interface 1800, when launched, lists out each of the first set of applications and the second set of applications. This information can be provided to the Anthem interface 800 by a program executing on the first computing machine and communicating with the Anthem manager to provide the program with information regarding computing environments on the first computing machine.

In one embodiment next to each application 1802 is a button to either add or delete the application. In embodiments where a particular application is not yet installed on the client 102, an add button 1812, 1814, 1816, 1822 is displayed next to the application. In embodiments where the application is already installed on the client 102, a delete button 1818, 1820 is displayed next to the application. Additional buttons can include a button 1806 to delete all the applications installed on the client 102, while a button 1808 to add all the applications installed on the client 102 can be included within the Anthem interface 800. In some embodiments the Anthem interface 1800 can include a profile connection manager 1810, while in other embodiments the interface 1800 can include a folder of all the applications installed on the client 102 and therefore installed within a user's profile.

Figure 20:
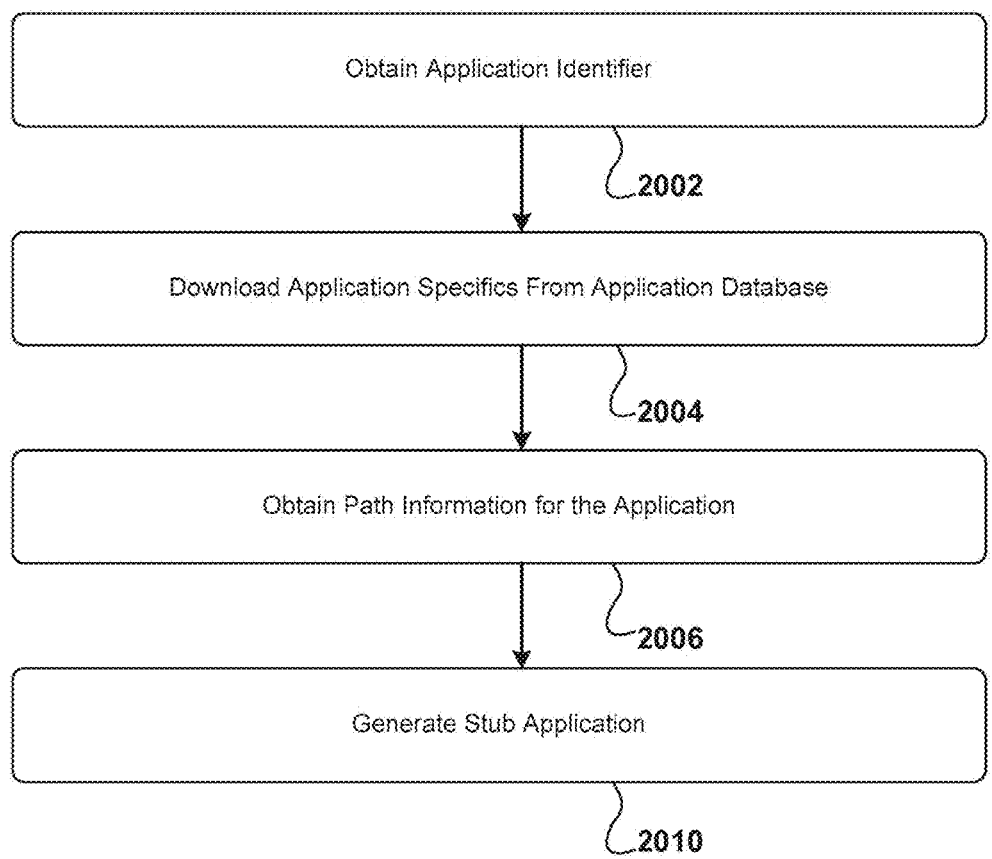
FIG. 20 is a flow diagram of an embodiment of a method for creating a stub application.

Illustrated in FIG. 20 is an embodiment of a method for generating a stub application. When a user clicks on the add button to install an application, the application generator 1768 can in some embodiments respond to this event by carrying out the steps needed to create an application skeleton or stub application associated with the selected application. In one embodiment, the application generator 7168 receives the application information which can include an application identifier, an application name or any other information that can be used by the application generator 1768 to identify the application (Step 2002). Once the application generator 1768 receives the application identifying information, the application generator 1768 can download from the applications database 1762 or from any other storage repository, table or other memory location, information regard the application (Step 2004). Using the retrieved application information, the application generator 1768 can then obtain path information for the application (Step 2006). Using each of the application information, the application path information and any other application or user-specific information, the application generator 1768 can then generate the stub application (Step 2010).

Once the stub application is generated, the server 106 can transmit the stub application to the client 102. In some embodiments, the Anthem interface 1800 comprises a management component that retrieves the stub application and performs the steps illustrated in FIG. 10 to install the stub application onto the client 102 and into the user's profile. When the stub application is installed on the client 102, in some embodiments an entry is inserted into the installed application store 1752 indicating that an application associated with the stub application was installed on the client 102 and into that user's profile. In other embodiments, the Anthem manager 1766, prior to transmitting the stub application to the client 102, installs the stub application into the user's profile which can include generating entries in any one of the provisional user session storage, the privileges database 1758 and the client accounts database 1760 indicating that the user profile now contains the application for which the stub application was generated.

Figure 21:
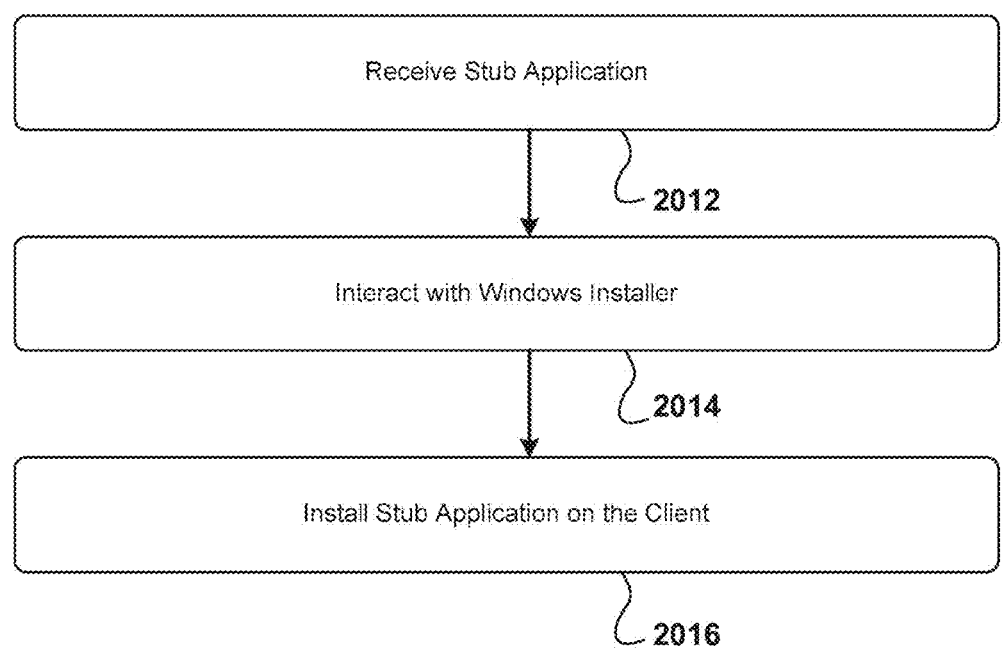
FIG. 21 is a flow diagram of an embodiment of a method for interacting with a stub application.
Figure 22:
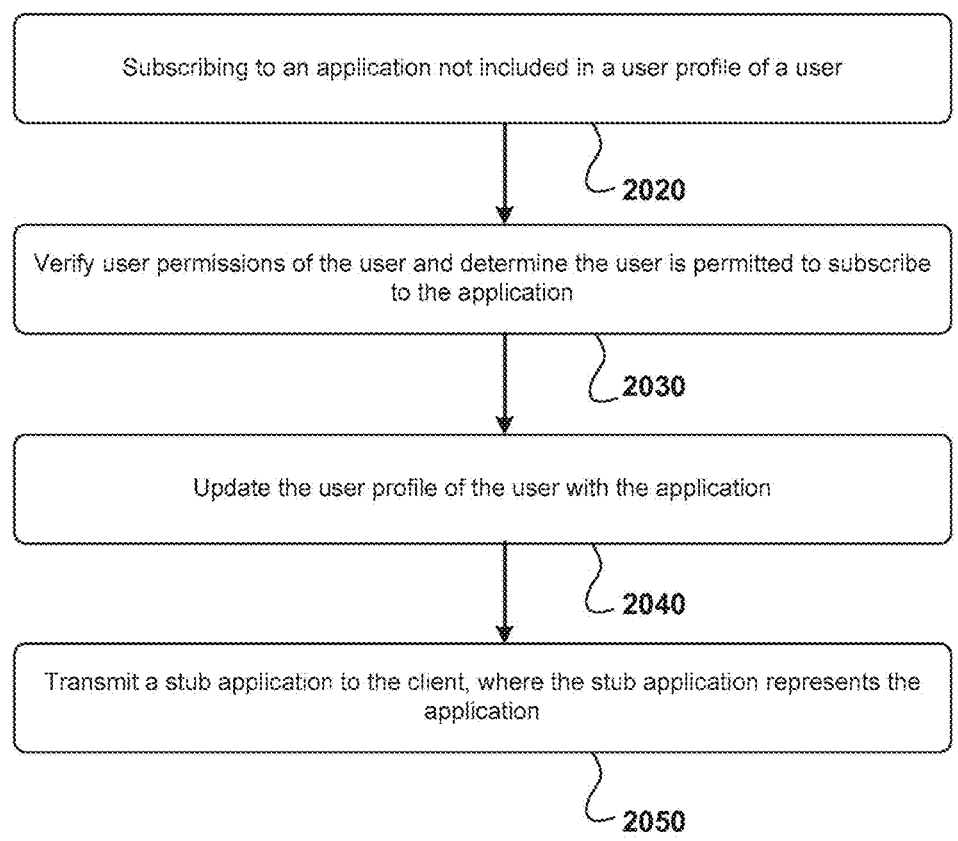
FIG. 22 is a flow diagram of an embodiment of subscribing to an application using a stub application.

Illustrated in FIG. 21 is one embodiment of a process for installing the stub application on the client 102. In one embodiment a management module or client within the Anthem interface 1800 receives the stub application from the server 106 (Step 2012) and interacts with an operating system installer or other installer program to issue a command to the installer program to install the stub application (Step 2014). Subsequent to the management module's issuance of an install command, an installer program on the client 102 can install the stub application on the client 102 (Step 2016).

In some embodiments, once the stub application is installed on the client 102, the operating system and operating system components can interact with the stub application as though it were a fully installed application. For example, an icon of the stub application can be displayed in the task bar, on the desktop, in the start menu or otherwise be displayed or treated as though it were a fully installed application. When a user clicks on an icon representative of the stub application, an application window can open and a communication connection can be established between the application window a remote computing machine. In some embodiments, this communication connection can be an ICA communication channel. In other embodiments, the communication connection can be a channel over which the client 102 and server 106 can communicate via a presentation level protocol. The stub application may include an application path such that when an icon associated with the stub application is clicked or otherwise selected, a window opens up and attempts to retrieve or connect to an application or application file designated by the application path identified within the stub application.

In some embodiments, multiple icons can exist on a client 102 for a particular application. For example, the client 102 may have a full version of MICROSOFT WORD installed locally on the client 102 and an icon may be displayed on the client 102 that is associated with this version of MICROSOFT WORD. However, another icon may be displayed on the client 102 that is associated with a version of MICROSOFT WORD installed by the Anthem interface and associated with a stub application. Thus, when the stub application icon is selected, a remote application is either streamed to the client 102 or an application window is displayed on the client 102 and within the window graphical application output from a remotely located application executing on a remote computing machine is displayed. Thus, in this type of embodiment, two MICROSOFT WORD icons may be displayed on the client 102. In one embodiment, a user may use the Anthem interface 1800 to design a virtual machine and issue a workflow request for the virtual machine. Once this workflow request is satisfied, the user may be able to access their virtual machine (e.g., the virtual machine they designed using the Anthem interface 1800) via the Anthem interface 1800. Similarly, a user may be able to use the Anthem interface 1800 to design desktops and retrieve a uniquely designed desktop. Allowing a user to install applications via the Anthem interface 1800 can be referred to as self-subscription in that a user is able to self-subscribe to applications that are available to them. Thus, users may construct a profile of applications that are designed to fit the user's particular needs. Accordingly, the user may choose not to include certain applications within the profile. When a user wishes to install into their profile an application not available to them through the Anthem interface, the user may submit a workflow request for that application. Responsive to this request, an administrator may alter the user's privileges within the privileges database 1758 such that the next time the user logs into the Anthem interface 1800, the application they requested is available for download.

Another aspect of the Anthem interface 1800 can be a synchronization module which can be used to synchronize the applications downloaded onto one or more machines. For example if a user logs into to a first computing machine and downloads Applications 1 and 2, but then logs into a second computing machine for the first time; it is likely that the second computing machine will not include the Application 1 and Application 2 stub applications. A synchronization mechanism or module within the Anthem interface 1800 or within the Anthem manager 1766 can be configured to automatically download stub applications for Application 1 and 2 each time a user logs into a new machine. Thus, when the user logs onto the second computing machine, either the Anthem interface 1800 or the Anthem manager 1766 can immediately construct stub applications corresponding to Applications 1 and 2, download the stub applications on the second computing machine and install the stub applications on the second computing machine.

J. Systems and Methods for Accessing Applications on Remote Servers Program Neighborhood The user of either client node 102A and 102N is able to learn of the availability of application programs hosted by the application servers 106A, 106B, and 106N, such as published applications, in the network 104 without requiring the user to know where to find such applications or to enter technical information necessary to link to such applications. These available application programs comprise the "program neighborhood" of the user. A system for determining a program neighborhood for a client node includes an application program (hereafter referred to as the "Program Neighborhood" application), memory for storing components of the application program, and a processor for executing the application program.

The Program Neighborhood application may be installed in memory of the client node 102A and/or on the application servers 106A, 106B and 106N as described below. The Program Neighborhood application is a collection of one or more services, applications program interfaces (APIs), and user interface (UI) programs that disclose to users of the client nodes 102A, 102N those application programs hosted by the application servers that each client node is authorized to use (e.g., execute).

An application server operating according to the Program Neighborhood application collects application-related information from each of the application servers in a server farm. The application-related information for each hosted application may be a variety of information including, for example, an address of the server hosting that application, the application name, the users or groups of users who are authorized to use that application, and the minimum capabilities required of the client node before establishing a connection to run the application. For example, the application may stream video data, and therefore a required minimum capability is that the client node supports video data. Other examples are that the client node can support audio data or can process encrypted data. The application-related information may be stored in a database as described later in the specification.

When a client node logs onto the network 104, the user of the client node provides user credentials. User credentials typically include the username of the client node, the password of the user, and the domain name for which the user is authorized. The user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client node can be obtained and submitted for authentication. The server responding to the client node can authenticate the user based on the user credentials. The user credentials can be stored wherever the Program Neighborhood application is executing. When the client node 102A executes Program Neighborhood application, the user credentials may be stored at the client node 102A. When an application server is executing the Program Neighborhood, the user credentials may be stored at that server. From the user credentials and the application-related information, the server may determine which application programs hosted by the application servers are available for use by the user of the client node.

The server transmits information representing the available application programs to the client node. This process eliminates the need for a user of the client node to set-up application connections. Also, an administrator of the server can control access to applications among the various client node users.

The user authentication performed by the server may suffice to authorize the use of each hosted application program presented to the client node, although such applications may reside at another server. Accordingly, when the client node launches (i.e., initiates execution of) one of the hosted applications, additional input of user credentials by the user may be unnecessary to authenticate use of that application. Thus, a single entry of the user credentials may serve to determine the available applications and to authorize the launching of such applications without an additional, manual log-on authentication process by the client user.

Either a client node 102A, 102N or an application server may launch the Program Neighborhood application. The results are displayed on the display screen of the client node 102A, 102N. In a graphical windows-based implementation, the results may be displayed in a Program Neighborhood graphical window and each authorized application program may be represented by a graphical icon in that window. One embodiment of the Program Neighborhood application filters out application programs that the client node 102A, 102N is unauthorized to use and displays only authorized (i.e., available) programs. In other embodiments, the Program Neighborhood application displays authorized and unauthorized applications. When unauthorized are not filtered from the display, a notice may be provided indicating that such applications are unavailable. In other embodiments, the Program Neighborhood application may report all applications hosted by the application servers 106A, 106B, and 106N to the user of a client node, without identifying which applications the client node 102A, 102N is authorized or unauthorized to execute. Authorization may be subsequently determined when the client node 102A, 102N attempts to run one of those applications.

The following is an exemplary process by which a server launches the Program Neighborhood (PN) application and presents results of the PN application to the client node 102A. The server may launch the PN application in response to a request by the client node 102A for a particular application program. The request passes to the master server node, in this example server 106A. The master server node 106A, taking load-balancing and application availability into account, indicates (to the client node 102A that the sought-after application is available on server 106B. The client node 102A and server 106B establish a connection. By this connection, the server 106B may transfer the executable code of the particular application to the client node 102A, when the client node 102A and server 106B are operating according to the client-based computing model. In other embodiments, the server 106B may execute the particular application and transfer the graphical user interface to the client node 102A, when the client node 102A and server 106N are operating according to the server-based computing model. In addition, either the master server node 106A or the server 106B can execute the Program Neighborhood application 41 and push the results back to the client node 102A so that when the client node 102A requests the Program Neighborhood application, the program neighborhood is already available at the client node 102A.

The following is another exemplary process by which the client node 102N initiates execution the Program Neighborhood application and a server presents the results of the PN application to the client node 102N. The client node 102N launches the Program Neighborhood application (e.g., by clicking on the Program Neighborhood icon representing the application). The request for the Program Neighborhood application is directed to the master server node, in this example server 106A. The master server node 106A may execute the Program Neighborhood application, if the application is on the master server node 106N, and return the results to the client node 102N. In other embodiments, the master server node 106A may indicate to the client node 102N that the Program Neighborhood application is available on another server, in this example server 106B. The client node 102N and server 106N establish a connection by which the client node 102A requests execution of the Program Neighborhood application. The server 106B may execute the application and transfer the results (i.e., the graphical user interface) to the client node 102A.

The following is another exemplary process by which a client node 102A initiates execution of the Program Neighborhood application, in this example via the World Wide Web. A client node 102N executes a web browser application, such as NETSCAPE NAVIGATOR, manufactured by Netscape Communications, Inc. of Mountain View, Calif. or MICROSOFT INTERNET EXPLORER, manufactured by Microsoft Corporation of Redmond, Wash.

The client node 102N, via the web browser, transmits a request to access a Uniform Resource Locator (URL) address corresponding to an HTML page residing on server 106N. In some embodiments the first HTML page returned to the client node 102N by the server 106N is an authentication page that seeks to identify the client node 102N.

The authentication page allows the client node 102N to transmit user credentials, via the web browser, to the server 106N for authentication. Transmitted user credentials are verified either by the server 106N or by another server in the farm. This allows a security domain to be projected onto the server 106N. For example, if the server 106N runs the WINDOWS NT operating system, manufactured by Microsoft Corporation of Redmond, Wash., and the authenticating server runs the UNIX operating system, the UNIX security domain may be said to have been projected onto the server 106N. User credentials may be transmitted "in the clear," or they may be encrypted. For example, user credentials may be transmitted via a Secure Socket Layer (SSL) connection, which encrypts data using the RC3 algorithm, manufactured by RSA Data Security, Inc. of San Mateo, Calif.

The server 106N may verify the user credentials received from the client node 102N. Alternatively, the server 106N may pass the user credentials to another server for authentication. In this embodiment, the authenticating server may be in a different domain from the server 106N. Authenticated user credentials of the client node 102N may be stored at the client node 102N in a per-session cookie, in fields that are not displayed by the web browser 480, or in any other manner common in maintenance of web pages. In some embodiments, a server farm with which the server 102N is associated may allow guest users, i.e., users that do not have assigned user credentials, to access applications hosted by servers in the farm. In these embodiments, the authentication page may provide a mechanism for allowing a client node 102N to identify that it is a guest user, such as a button or menu selection. In other of these embodiments, the server 106N may omit the authentication page entirely.

Once the client node 102N is authenticated by the server 106N, the server prepares and transmits to the client node 102N an HTML page that includes a Program Neighborhood window 458 in which appears graphical icons representing application programs to which the client node 102N has access. A user of client node 102N invokes execution of an application represented by icon by clicking that icon.

The following is an exemplary process of communication among the client node 102A, the master server node, in this example server 106A, and the server 106N. The client node 102A has an active connection with the server 106N. The client node 102A and server 106N may use the active connection 472 to exchange information regarding the execution of a first application program. The user credentials of the client node 102A are stored at the client node. Such storage of the user credentials may be in cache memory or persistent storage.

In this embodiment, the Program Neighborhood application runs on the client node 102A. The client node display has a Program Neighborhood window in which appears a graphical icon representing a second application program. A user of the client node 102A may launch the second application program by double-clicking the icon with the mouse. The request passes to the master server node 106A via a connection. The master server node 106A indicates to the client node 102A via the connection that the sought-after application is available on server 106N. The client node 102A signals the server 106N to establish a second connection 470. The server 106N requests the user credentials from the client node 102A to authenticate access to the second application program. Upon a successful authentication, the client node 102A and server 106N establish the second connection and exchange information regarding the execution of the second application program. Accordingly, the client node 102A and the server 106N communicate with each other over multiple connections.

The following is an exemplary process of communication among the client node 102N, the master server node, in this example server 106A, and servers 106B, and 106N. The client node 102N has an active connection with the server 106B. The client node 102N and server 106N may use the active connection to exchange information regarding the execution of a first application program. The user credentials of the client node 102N are stored at the server 106B in cache memory or in persistent storage. In this embodiment, the Program Neighborhood application runs on the server 106B. The server 106B includes software providing a server-based client engine, enabling the server 106B to operate in the capacity of the client node 102N. The client node 102N display has a Program Neighborhood window in which appears graphical icons representing a second application program and a third application program, respectively. A user of the client node 102N may launch the second application program by double-clicking the icon. The request to launch the second application program passes to the server 106B via active connection, and the server 106B forwards the request to the master server node 106).

The master server node 106A indicates to the server 106C that the sought-after application is available on server 106B. The server 106C contacts the server 106B to establish a connection 466. To authenticate access to the application, the server 106B obtains the user credentials of the client node 102N from the server 106C. The server 106C and server 106B establish the connection by which the server 106C requests execution of the second application and the server 106B returns the graphical user interface results to the server 106C. The server 106C forwards the graphical user interface results to the client node 102A, where the results are displayed. Accordingly, the information exchanged between the client node 102A and the server 106B "passes through" the server 106C. Similarly, the client node 102A may launch the third application program by double-clicking the icon'. The request to launch the third application program passes to the server 106C. The server 106C forwards the request to the master server node 106A, which considers load-balancing and application program availability to determine which server can handle the request. In this example, the master server node indicates that server 106N may run the third application program.

The server 106C and server 106N establish a connection by which the server 106C requests execution of the third application program, and the server 106N returns the graphical user interface results to the server 106C. To permit execution of the third application program, the server 106N may authenticate the user credentials of the client node 102N which are obtained from the server 106C. The server 106C forwards the graphical user interface results to the client node 102N where the results are displayed. Accordingly, the results of executing the third application program pass between the client node 102N and the server 106N through the server 106C.

From this illustration it should be understood that client node 102N may run multiple application programs through one connection with the server 106C, while the server 106C maintains multiple connections (in this example, one connection with server 106B and a second connection with server 106N). Also, the server 106C merges the information received from the server 106B with the information received from the server 106N into one data stream for transmission to the client node 102A.

The following an exemplary process of communication among the client node 102, the master server node, in this example server 106A, and servers 106B and 106N. The client node 102 has an active connection with the server 106B. The client node 102 and server 106B may use the active connection to exchange information regarding the execution of a first application program. The client node 102 may store the user credentials in cache memory or in persistent storage.

In this embodiment, the Program Neighborhood application runs on the server 106B. The client node 102 display has a Program Neighborhood window 458 in which appears a graphical icon 457 representing a second application program. A user of the client node 102 may launch the second application program by double-clicking the icon. The request to launch the second application program passes to the server 106B. The server 106B responds (i.e., "calls back") to the client node 102 by returning application-related information such as the name of the application and capabilities needed by the client node 102 for the second application to run.

With the information provided by the server 106B, the client node 102 then communicates with the master server node 106A via connection to determine the server for executing the second application program. In this example, that server is server 106N. The client node 102 then establishes a connection to the server 106N. Server 106N requests the user credentials from the client node 102 to authenticate the user of the client node 102. The second application program executes on the server 106N, and the server 106N returns the graphical user interface to the client node 102 via the established connection. Accordingly, the client node 102 may have multiple active connections between the multiple servers.

The following is an exemplary process of communicating between the client node 102, a server 106A that in this example acts as a web server, and server 106N. The client node 102 authenticates itself to the server 106A. In one embodiment, the server 106A accesses an output display template, such as an SGML, HTML or XML file, to use as a base for constructing the Program Neighborhood window to transmit to the client node 102. The template may be stored in volatile or persistent memory associated with the server 106A or it may be stored in mass memory, such as a disk drive or optical device. In this embodiment, the template is a standard SGML, HTML, or XML document containing Program Neighborhood-specific tags that are replaced with dynamic information. The tags indicate to the server 106A where in the output display to insert information corresponding to available applications, such as icon images. In one embodiment, the Program Neighborhood-specific tags are embedded within comments inside the file, allowing the file to remain compatible with standard interpreters. In another embodiment, the Program Neighborhood-specific tags are extensions of the markup language used as the base for the template.

Examples of HTML tags that may be used in a template are set forth below in Table 1:

TABLE 1

| Tag | Description |
| --- | --- |
| ControlField_/zeW value | This tag is used to set the value of data that either persists between Program Neighborhood web pages, are set by the user, or are used to help in cross page navigation, such as user name domain password template and application |
| DrawProgramNeighborhood | His tag is used to draw a Program Neighborhood display at this location in an output display |
| AppName | This tag is replaced by the name of the published application in the current context. |
| WindowType | This tag is replaced by the window type of the published application in the current context. |
| WindowHeight | This tag is replaced by the window height of the published application in the current context. |
| WindowWidth | This tag is replaced by the window width of the published application in the current context. |
| WindowScale | This tag is replaced by the window scale of the published application in the current context. |
| WindowColors | This tag is replaced by the color depth of the published application in the current context. |
| SoundType | This tag is replaced by the sound setting of the published application in the current context. |
| VideoType | This tag is replaced by the video setting of the published application in the current context. |
| EncryptionLevel | This tag is replaced by the encryption level of the published application in the current context. |
| Icon | This tag is replaced by the icon of the published application in the current context. |

Other tags may be provided to set control fields and to provide conditional processing relating to the Program Neighborhood application.

In one embodiment, the template is constructed dynamically using, for example, COLD FUSION, manufactured by Allaire Corp. of Cambridge, Mass. or ACTIVE SERVER PAGES manufactured by Microsoft Corporation of Redmond, Wash. In other embodiments, the template may be static. The Program neighborhood application parses the template, replacing Program Neighborhood-specific tags as noted above. Tags that are not Program Neighborhood-specific are left in the file to be parsed by the browser program 480 executing on the client 102.

In one embodiment, a template parser object is provided that accepts an HTML template as input, interprets Program Neighborhood-specific tags present in the template, and output the original template with all Program Neighborhood tags replaced with appropriate text. The template parser object may be passed a cookie, a URL query string, or a control field from a web server interface to provide the information with which Program Neighborhood-specific tags should be replaced.

In another embodiment, the Program Neighborhood application allows scripts to access to information via an application programming interface. Scripts may be written in, for example, VBScript or Jscript. In this embodiment, the scripting language is used to dynamically generate an output display using information returned by the application in response to queries posed by the script. Once the output display is generated, it is transmitted to client node 102 for display by the browser program.

A user of the client node 102 can launch an application by clicking or double-clicking with a mouse an icon displayed in the Program Neighborhood web page. In some embodiments, each icon is an encoded URL that specifies: the location of the application (i.e., on which servers it is hosted or, in some embodiments, the address of a master server); a launch command associated with the application; and a template identifying how the output of the application should be displayed (i.e., in a window "embedded" in the browser or in a separate window). In some embodiments, the URL includes a file, or a reference to a file, that contains the information necessary for the client to create a connection to the server hosting the application. This file may be created by the Program Neighborhood application dynamically. The client node 102 establishes a connection with the server identified as hosting the requested application (in this example, server 106N) and exchanges information regarding execution of the desired application. In some embodiments, the connection 494 is made using the Independent Computing Architecture (ICA) protocol, manufactured by Citrix Systems, Inc. of Fort Lauderdale, Fla. Thus, the client node 102 may display application output in a window separate from the web browser 460, or it may "embed" application output within the web browser.

Neighborhood application or the client-based computing model in which the client node 102A executes the Program Neighborhood application locally. The Program Neighborhood application includes a Program Neighborhood Service (PNSVC) component, an Application Database component, a Program Neighborhood Application Program Interface (PNAPI) component, a Program Neighborhood User Interface component, and a local cache. The application server 106A, for example, includes the service component (PNSVC) and the application database. The client node 102A, which is a representative example of a client node that may support a client-based implementation of the Program Neighborhood application, includes the application program interface PNAPI 452, the user interface component, and the local cache components. The PNAPI 452 communicates with the user interface component and the local cache. The PNSVC 444 communicates with the application database and with the PNAPI on the client node 102A via communications link.

The communications link may be established by, for example, using the ICA protocol. ICA is a general-purpose presentation services protocol designed to run over industry standard network protocols, such as TCP/IP, IPX/SPX, NetBEUI, using industry-standard transport protocols, such as ISDN, frame relay, and asynchronous transfer mode (ATM). The ICA protocol provides for virtual channels, which are session-oriented transmission connections that may be used by application-layer code to issue commands for exchanging data. The virtual channel commands are designed to be closely integrated with the functions of client nodes. One type of virtual channel connection supported by the ICA protocol is a Program Neighborhood virtual channel. The Program Neighborhood virtual channel protocol may include four groups of commands:

(1) initialization-related commands;
(2) single authentication related commands that can be supported by each client node wanting a copy of the user credentials;
(3) application data related commands for implementing the Program Neighborhood user interface; and
(4) application launch callback-related commands for running the user interface on an application server.

Application Database

The application database is a cache of the authorized user and group information for all the public (i.e., published) applications in a server farm or in a group of trusted domains. Each server in a server farm may maintain its own application-related information in persistent storage and build up the database in volatile storage. In another embodiment, all collected application-related information in the database are stored in persistent storage and made accessible to each other server in the server farm.

The database may be implemented in a proprietary format (e.g., as a linked list in memory) or using Novell's Directory Services (NDS) or any directory service adhering to the X.500 standard defined by the International Telecommunication Union (ITU) for distributed electronic directories. The application database 448 includes a list of application servers. Each server in the list has an associated set of applications. Associated with each application is application-related information that can include the application name, a list of servers, and client users that are authorized to use that application. An overly-simplified example of the application-related information maintained in the database is illustrated by the following

TABLE 2

| | Applications | | | |
|---|---|---|---|---|
| Server Name | Spreadsheet | Customer Database | Word Processor | Calculator |
| Server 106A | User A | UserB | n/a | — |
| Server 106B | UserB | n/a | User A | — |
| Server 106N | | | | User A UserB |

Users A and B are users of the client nodes 102A, 102N, "n/a" indicates that the application is hosted, but is not available to client node users, and "—" indicates that the application is not hosted.

Table 2 shows a list of servers 106A, 106B, 106N, the applications hosted by the servers, (Spreadsheet, Customer Database, Word Processor, and Calculator), and those users who are authorized to use the applications. For example, server 106A hosts the Spreadsheet program, the Customer Database and the Word Processor. User A is authorized to use the Spreadsheet, User B is authorized to use the Customer Database, and no users are authorized to use the Word Processor. It is to be understood that other techniques can be used to indicate who is authorized to use a particular application. For example, the user information stored in the database can be used to indicate those users who are unauthorized to use a particular application rather than those who are authorized.

To obtain the information that is stored in the database, the server 106A obtains the application-related information from each other server in the server farm regarding the applications on those servers, including control information that indicates which client users and servers are permitted to access each particular application. The application-related information maintained in the database may or may not persist across re-boots of the server 106A.

The application database can be a central database that is stored at the application servers 106A and is accessible to all of the servers in the server farm. Accordingly, the application-related information can be available for use by other servers such as those servers that perform published application authentication during session log-on and application launching. In another embodiment, the application database is maintained at each of the application servers based upon the information that each server obtains from communications with each other server in the server farm.

Program Neighborhood Service Program (PNSVC)

Each server 106A, 106B, and 106N having the Program Neighborhood application installed thereon executes the PNSVC software. The PNSVC software, operating on each server 106A, 106B, and 106N establishes a communication link (e.g., a named pipe) with each other server. The servers 106A, 106N, and 106N exchange the application-related information on the named pipes. In another embodiment, the PNSVC software 444 collects the application-related information from the other servers in the server farm through remote registry calls (e.g., the service component transmits a datagram to other servers in the plurality requesting the application-related corresponding to the application programs hosted by those servers). The PNSVC software also maintains the relationships of groups and users to published applications in the application database and accesses the information when authenticating a client user. An administrator of the server 106A may use a user interface to configure the PNSVC.

Other functions of the PNSVC software include implementing the services and functions requested by the PNAPI and communicating with the PNAPI 452 on the client node 102A using a Program Neighborhood virtual device driver (VDPN). The VDPN operates according to the Program Neighborhood virtual channel protocol described above for establishing and maintaining an ICA connection.

Program Neighborhood Application Program Interface (PNAPI)

The PNAPI is a set of software functions or services that are used by the Program Neighborhood application to perform various operations (e.g., open windows on a display screen, open files, and display message boxes). The PNAPI provides a generic mechanism for launching application objects (e.g., icons) produced by running the Program Neighborhood application and application objects in a legacy (i.e., predecessor or existing for some time) client user interface. When the client node 102A launches an available application, the launch mechanism may launch the application on the server 106A, if necessary (e.g., when the client node 102A does not have the resources to locally execute the application).

The PNAPI provides all published application information to the user interface component 456 for display on the screen of the client node 102A. The PNAPI also manages server farm log-ons in a local database of logon credentials (e.g., passwords) for users of the client node 102A to support the single authentication feature. Credentials may or may not be persistent across bootings (power-off and on cycles) of the client node 102A.

The PNAPI provides automatic and manual management for Program Neighborhood application objects stored in the local cache. The local cache may be refreshed manually by the user of the client node 102A, or at a user-definable refresh rate, or by the server at any time during a connection. In a Windows implementation, the PNAPI builds remote application file associations and manages the "Start" menu and desktop icons for application object shortcuts.

Program Neighborhood User Interface

The user interface module interfaces the PNAPI and may be a functional superset of an existing client-user interface (e.g., Remote Application Manager). The user interface module accesses the information stored in the local cache through the PNAPI and visually presents that information to the user on the display screen of the client node 102A. The displayed information is a mixture of information generated by a user of the client node 102A and information obtained by the Program Neighborhood application. The user interface module may also show the user all applications that the user is currently running and all active and disconnected sessions.

In a windows-based embodiment, the user interface module may present a variety of graphical components, such as windows and pull-down menus, to be displayed on the display screen. A display of a combination of such graphical user interface components is generally referred to as a "desktop." A desktop produced by the user interface module 456 may include a Program Neighborhood window displaying the neighborhood of application programs available to the user of the client node 102A for use. These application programs are a filtered combination of the published applications hosted by a server farm on the network. The user interface module 456 may generate a Program Neighborhood window for each server farm or merge the applications from different server farms under a single Program Neighborhood window.

At a top level, the Program Neighborhood window includes a folder for each server farm. Clicking on one of the folders with the mouse produces a window containing a representation (e.g., an icon) of each hosted application available to the user. The Program Neighborhood window becomes the focal point for launching published applications, and the user interface module may be used to launch applications through the PNAPI example, the user of the client node 102A may use the mouse to select one of the displayed icons and launch the associated application.

A feature of a client-based implementation is that the user may browse the objects displayed in the Program Neighborhood window although the client node is offline, that is, the ICA connection is inactive. Also, a user of the client node 102A may drag application objects and folders out of the Program Neighborhood window and into other graphical components (e.g., other windows, folders, etc.) of the desktop.

The following is an example arrangement of program components for a server-based implementation of the Program Neighborhood application. The components include a Service (PNSVC) component, an Application Database component, an Application Program Interface (PNAPI) component, a User Interface component and a local cache. Each software component is installed on the application server 106A. The software components for the server-based implementation may correspond to the software components for the client-based implementation described above. The functionality of each server-based software component may be similar to or the same the client-based counterpart, with differences or added capabilities described below. The PNSVC communicates with the application database and with the PNAPI using local procedure calls. The PNAPI also communicates with the user interface module 456' the local cache.

Similar to that described for the client node 102A, the client node 102N logs on to the network 104, the server 106A develops and maintains a database containing the application related information collected from the other servers 106B, 106N in the server farm, and a communication link is established between the server 106A and the client node 102N.

The application server 106A is in communication with the client node 102N via an ICA channel connection. The channel connection may be established by an ICA virtual channel protocol (e.g., Thinwire). The Thinwire protocol can be used to transmit presentation commands from Windows-based applications running on the application server 106A to the client node 102N. To a user of the client node 102N, the applications appear to be running on the client node 102N. The client node 102N may include a Remote Application Manager application program that communicates with the application server 106A via the ICA channel connection.

To run the Program Neighborhood application in a server-based implementation, the user of the client node 102N connects to an initial desktop (at the server 106A) and launches the Program Neighborhood application from within that desktop environment. The connection to the initial desktop can occur automatically, e.g., via a logon script of the client node 102N, via an entry in the StartUp group in Windows 95, or by another centrally managed server specific mechanism. All remote application management and launching is accomplished through this initial desktop.

Similar to that described above for the server 106A, the server 106 uses the user credentials to determine those application programs that are authorized for use by the user of the client node 102N. A Program Neighborhood graphical window is returned to the client node 102N and displayed on the client screen. This window may include icons representing the available and, possibly, the unavailable application programs that are in the program neighborhood of the client node 102N.

The user of the client node 102N may select and launch one of the application programs displayed in the Program Neighborhood window. When launching an application, the Program Neighborhood application can execute the application on the same server 106, where applicable, taking into account load balancing requirements among servers and the availability of the application on that server 106. The PNAPI can include a launch mechanism for launching a remote application locally on the server 106 when the server 106 is nominated to launch the application. When a different server is needed to run the application, the Program Neighborhood application may launch the application via the server 106 (i.e., server-based client) using the windows to present the application on the desktop of the client node 102N.

In one embodiment, the web-based Program Neighborhood application includes a group of objects that manage various aspects of the application. In one embodiment, the application includes three primary object classes that "plug in" to a web server: a gateway object class; a credentials object class; and an application object class. In some specific embodiments, the object classes are provided as Java beans. The three primary object classes facilitate: validation of user credentials into a server farm; generation of lists of published applications that a specified user may access; provision of detailed information about a specific published application; and conversion of published application information into an ICA-compatible format.

When provided as Java beans, the objects may be accessed in a number of different ways. For example, they may be compiled as COM objects and made available to the web server as ActiveX components. In another embodiment, the Java beans can be used in their native form, such as when the server uses Java Server Pages technology. In yet another embodiment, the Java beans may be instantiated and used directly in a Java servlet. In still another embodiment, the server 106 may instantiate the Java beans as COM objects directly.

A credentials object class manages information necessary to authenticate a user into a target server farm. A credentials object passes stored user credentials to other Program Neighborhood objects. In some embodiments, the credentials object is an abstract class that cannot be instantiated and represents a user's credentials. Various class extensions may be provided to allow different authentication mechanisms to be used, including biometrics, smart cards, token-based authentication mechanisms such as challenge-response and time-based password generation, or others. For example, a "clear text credentials" extension may be provided that stores a user's name, domain, and password in plain text.

A gateway object class handles communications with a target server farm. In one embodiment, the gateway object class is provided as an abstract Java class that cannot be instantiated. A particular gateway object may retrieve application information by communicating with a server farm using a particular protocol, reading cached application information, a combination of these two methods, or other various methods.

As noted above, the gateway object class caches information to minimize communication with a target server farm. Extensions to the gateway object may be provided to communicate with the server farm over specific protocols, such as HTTP. In one embodiment, an extension class is provided that allows the gateway object to communicate with the server farm via WINDOWS NT named pipes. The gateway object may provide an application programming interface hook that allows other Program Neighborhood objects to query the object for application information.

An applications object class contains information about published applications and returns information about applications hosted by the server farm in order to create the Program Neighborhood web page. The applications object class creates objects representing applications by retrieving information relating to the applications, either from an object created by the gateway object or directly from the servers in the server farm. An applications object acts as a container for certain properties of the application, some settable and some not settable, such as: the name of the application (not settable); the percentage of the client's desktop that the client window should occupy (settable); the width of the client window, in pixels, for this application (settable); the height off the client window, in pixels, for this application (settable); the number of colors to use when connecting to the application (settable); the severity of audio bandwidth restriction (settable); the level of encryption to use when connecting to the application (settable); the level of video to use when connecting to this application (settable); whether the application should be placed on a client's start menu (settable); whether the application should be placed on the client's desktop (settable); the identity of the Program Neighborhood folder to which the application belongs (settable); the description of the application (settable); the source of the graphics icon file for the application (settable); the type of window that should be used when connecting to the application (not settable); and whether to override default parameters for the object.

In some embodiments, Program Neighborhood window 520 that may be displayed on the screen of either client node 102A, 102N after the Program Neighborhood application has executed. The window 520 includes graphical icons. Each icon represents an application program that is hosted by one of the servers 106A, 106B, and 106N on the network 104. Each represented application is available to the user of the client node for execution. The user may select and launch one of the applications using the mouse, or keyboard.

In another embodiment, the Program Neighborhood window 524 may be displayed on the screen of either client node 102A, 102N after the Program Neighborhood application has executed. The window 524 includes graphical icons 526, 528. Each icon 526, 528 represents an application program that is hosted by one of the servers 106A, 106B, and 106N on the network 104. Each application program represented by one of the icons is available to the user of the client node 102A, 102N for execution. The user may select and launch one of the applications using the mouse or keyboard. For web-based program neighborhood environments, the icons are displayed within a browser window.

Each application program represented by one of the icons is unavailable to the user of the client node 102A, 102N, although such applications are present in the server farm. The unavailability of these application programs can be noted on the display screen (e.g., "X" s can be drawn through the icons). An attempt to launch such an application program can trigger a message indicating that the user is not authorized to use the application.

The following is an example process by which a user of either client node 102A, 102N may be informed about the availability of applications hosted by application servers 106A, 106B, and 106N on the network 104. In step 680, the client node 102A, 102N requests log-on service from one of the servers, e.g., server 106B. The server 106B requires valid user credentials to establish the connection. The server 106B receives the user credentials from the client node 102A and authenticates the user for log-on A desktop is displayed at the client node 102A, 102N. The desktop can include a graphical icon representing the Program Neighborhood application program.

The application server 106A establishes a connection with each other servers 106B and 106N to exchange application-related information, as described above, corresponding to application programs hosted on those servers The application server 106B develops and maintains a database of the collected application-related information. Each other server 106A and 106N in the server farm may develop a database equivalent to the database of the server 106B and in similar manner as the server 106C. In another embodiment, the database of the server 106B may be a centralized database that is accessible to each other application server 106A and 106N in the server farm. The collecting of application-related information may occur independently or be triggered by the request of the client node 102A, 102N to log-on to the server farm 38.

The client node 102A, 102N may request execution of an application program from the desktop display. The master server node may process the request and, using a load-balancing evaluation and application availability as described above, determine the application server to provide the service to the client node 102A, 102N (step 694). For example, the application server 106A may be selected to service the request with the client node 102A, 102N. In step 696, the client node 102A, 102N establishes a communications link with the server 106B. The server 106B and the client node 102A, 102N may communicate according to the ICA protocol appropriate for that client node as described above.

Also in response to this request to run the application program, the master server node 106A or the server 106B may run the Program Neighborhood application and push the results to the client node 102A, 102N, although the client node 102A, 102N may not have requested the Program Neighborhood application program. When executing the Program Neighborhood application program, the master server node 106A or server 106B filters the application-related information in the database using the user credentials. The result of filtering the database determines those application programs that are authorized for use by the user of the client node 102A, 102B. The authorized application programs are in the program neighborhood of the client node 102A, 102N. This program neighborhood of available application information is pushed to the client node 102A, 102N and displayed on the client screen in a Program Neighborhood graphical window In other embodiments, the Program Neighborhood window may include applications that are in the server farm but unavailable for use to the client node 102A, 102N. In a Windows-based implementation, the available (and unavailable) application programs can be represented by icons. The user of the client node 102A, 102N may select and launch one or more of the application programs displayed in the Program Neighborhood window.

K. Systems and Methods for Providing Single Sign on Access Via an Intermediary Device to Disparately Hosted Application Referring now to FIGS. 23A and 23B, embodiments of the present solution are directed to challenges in providing a single authentication domain across disparately hosted applications. Using a third party cloud access system such as embodiments of the cloud access system comprising a Single Sign On system provided by Apere Inc of San Jose, Calif., such a solution may require or use a DNS based work around or integration to integrate with the cloud access system with a third-party hosted application, such as a SaaS application. By way of example, in some embodiments, a user without embodiments of the ADC of the present solution may perform the following steps to access a SaaS application via a cloud access system directly.

Step 1 (Cloud Access System Authenticates the User):
    User logins to Cloud Access System
    Kerberos key tab is generated in Cloud Access System and the Kerberos ticket of user is validated by an identity managed access gateway (IMAG).
    Proxy servers may be setup to redirect specific URLS to IMAG
    Example: login.salesfore.com/mail.google.com/ . . . may be redirected to http://imag.apere.com/webssouser/websso.do?action=authenticateUser&applicatio=salesforce (imag.apere.com is IMAG DNS Name)
    IMAG using the browser checks to see if the user is already logged into Cloud Access System (Kerberos on http) using negotiated protocol.
    IMAG decrypts the user Kerberos ticket using keytab file and knows who the network user is.
    Step 2 (Cloud Access System does SSO to the Backend SaaS Application)
    Depending on the application, if the application session is maintained by cookies, then IMAG will redirect the browser with new URL "http://n6.salesforce.com/webssouser/websso.do?action=performSSO"
    Using IMAG-database, network user to application mapping is found and IMAG does the sign on to the SaaS application
    Step 3 (Final Redirect to the SaaS Application)
    IMAG redirects the browser to post login URL of SaaS application with application related cookies got on doing sign-on to application.
    Example: redirect URL: "http://n6.salesforce.com/" application cookies may be set with domain name as ".salesforce.com" so the these cookies can be submitted to Salesforce upon redirection.
    The user gets the Post login user-session to SaaS application (the cookies submitted in above step ensures the application session information is sent back to Salesforce)

In view of the above embodiments, the integration includes using a prefix that maps back to the cloud access system used in the redirect (e.g. (sso.imag.salesforce.com DNS points to IMAG IP Address).

In some embodiments, a system with the ADC of the present solution may perform the above steps to access a SaaS application without using the DNS integration or workaround while leveraging the acceleration, policy management and other features of the embodiments of the appliance 200 described herein. Instead the fully qualified domain name (FQDN) of the SaaS application may be sued. In an example embodiment of using the ADC as an intermediary between the client device of the user, the cloud access/SSO system and the SaaS application, the following steps may be performed.

Step 1: Cloud Access System Authenticates the User.
        The ADC may configure a responder to redirect the user's access request and/or authentication to the cloud access system In some embodiments, the responder and content redirector (CR) modules/configuration of the ADC co-exist. Requests for the initial login page may bypass CR and responder sends the appropriate redirect. Cloud Access System Redirect. The cloud access system does a redirect to the domain of the hosted application, such as the SaaS domain, so that the cloud access system can set cookies for that domain after SSO.

Step 2: Cloud Access System Redirects to the SaaS to Set Cookies for the SaaS Domain after SSO.

The cloud access system re-directs to the fully qualified domain name that it would in Step 3. This is properly resolved. The transparent CR on NS then intercepts this request. The CR is configured such that this request for SSO (the URL will have keywords—in this case webssouser/ websso.do?action=performSSO) is redirected to the cloud access system.

The ADC may have configure CR policies such that only SSO requests are sent to cloud access system. In this embodiment, the DNS hack of using a prefix that maps back to the cloud access system used in the redirect is not required (e.g. (sso.imag.salesforce-.com DNS points to IMAG IP Address)

Step 3 (Final Redirect to the SaaS Application)

The cloud access system again redirects to the SaaS domain. This request will bypass the ADC's CR since the request does not have the SSO URL and the ADC direct the request to the backend SaaS application.

Figure 23A:
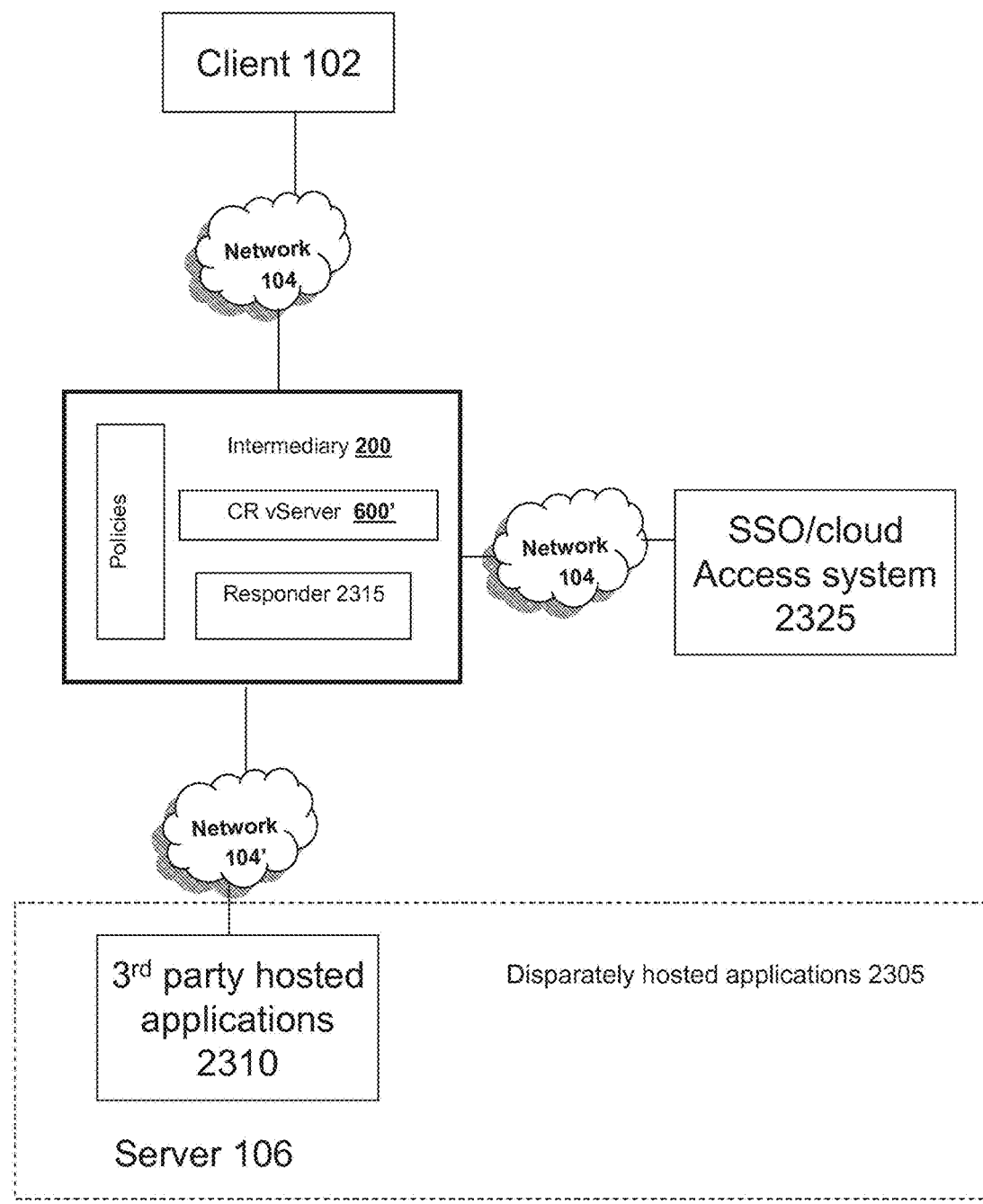
FIG. 23A is a block diagram of embodiments of an intermediary device providing single sign on access to disparately hosted applications.

Referring now to FIG. 23A an embodiment of the system for providing the solution described above is depicted. In brief overview, an intermediary device, such as embodiments of appliance 200 may be intermediary to a client and a plurality of servers. The system may include a cloud access/Single Sign On system 2325 for providing single sign on services for a plurality of disparately hosted applications 2305, including but not limited to SasS/PaaS/IaaS hosted applications 2310, enterprise hosted applications and enterprise applications hosted via cloud computing service provider. The cloud access/Single Sign On (SSO) system 2325 may provide single sign on services for any one or more $3^{rd}$ party hosted applications 2305, such as SaaS applications. The intermediary may include a responder 2315 for generating redirection responses to client requests, such as client requests to access a $3^{rd}$ party hosted application. The intermediary may also include a CR vServer 600' for performing content redirection for predetermined client requests directed to the $3^{rd}$ party hosted applications to redirect to cloud access system 2325.

In some embodiments, the intermediary device 200 is deployed in the path between the client 102 and server 106. In some embodiments, the intermediary device 200 is deployed in the path between the client 102 and disparately hosted applications 2305, such as a $3^{rd}$ party hosted application 2310. The intermediary device may receive and/or intercept any request of the client traversing network 104. In some embodiments, the SSO/cloud access system is deployed in parallel to the intermediary device. The intermediary device 200 may use any embodiments of the transparent cache redirection techniques described in conjunction with FIGS. 6A-6B and 7A-7B. Using these techniques, the intermediary device may forward requests and receive responses from the parallel deployed cloud access/SSO system 2325 transparently as if the intermediary device was the client 102.

Disparately hosted applications may include any type and form of applications executed at, served by, operated at or hosted on differently owned systems, devices and networks. Disparately hosted applications may include an application on the enterprise of the user (e.g., on premise applications), applications of the enterprise hosted on a cloud computing service provider and/or SaaS/PaaS/IaaS applications. For example, an enterprise deploying the intermediary 200 or client 102 may own or operate on-premise servers, such as a data center. The enterprise owned servers may execute or provide applications for the user of the enterprise. The same enterprise may host, operate or run some applications on a cloud computing or hosting service provider. These applications are operated on, served by or hosted by servers and/or networks different from the enterprise. The users of the enterprise may use applications provided by or hosted by $3^{rd}$ parties 2310, such as a SaaS application, for example, salesforce.com, Google mail, etc.

Disparately hosted applications may include applications delivered via application delivery system 190 described herein (e.g., in connection with FIG. 1D) including but not limited to applications communicated via a remote display protocol, such as ICA or RDP, applications streamed from server and applications delivered via a virtualized environments, such as via a virtual machine. The disparately hosted applications may include any applications delivered via the application delivery system 190 in combinations with any third party hosted applications and/or applications of the enterprise hosted or served via a cloud computing or hosting service.

The $3^{rd}$ party hosted application 2310 may include any type and form of SaaS, PaaS and/or IaaS application. These applications 2310 may be accessed via the Internet or network 104 by the client 102. The $3^{rd}$ party hosted application 2310 may include any type and form of web based application provided via servers and networks owned and/or operated by an entity different from the enterprise, such as the enterprise deploying the intermediary device 200 and client 102.

The cloud access system 2325 may include any server, system, application, service, appliance or devices that provide SSO authentication services to a plurality of disparately hosted applications. The cloud access system may include any system that provides a single authentication domain (e.g., one set of authentication credentials of a user) to authenticate a user and then login and provide access to the user to various third-party hosted applications, such as a SaaS applications, web hosted applications, cloud hosted applications. The cloud access system may include any system that provides a single sign on process to disparately hosted applications, such as application on the enterprise of the user (e.g., on premise applications), applications of the enterprise hosted on a cloud computing service provider and/or SaaS/PaaS/IaaS applications.

In some embodiments, the cloud access system includes any embodiments of the appliance, software and/or services manufactured by Apere Inc. of San Jose, Calif. In some embodiments, the cloud access system includes any embodiments of the appliance, software and/or services manufactured by Symplified Inc. of Boulder, Colo. In some embodiments, the cloud access system includes any embodiments of the appliance, software and/or services manufactured by Nordic Edge of Sweden. The cloud access systems may perform various types of redirects to redirect client requests to $3^{rd}$ party hosted applications.

The intermediary 200 may include a responder 2315. The responder may comprise any type and form of executable instructions executable on the appliance 200. The responder may be included in or be part of a packet processing engine. The responder may be included in or be part of a virtual server. The responder may be a module, application, program, service, process, task or thread the communicated with the packet processing engine and/or virtual server.

The responder comprises logic, functions or operations to provide a content filter that can generate responses from the system to the client. The responder may be used to generate responses to requests or communications from the client, such as to generate redirect responses, user-defined responses, and resets. In some embodiments, the responder deals with the request side of the system. The responder may be one of the first modules on the system to process requests from the client. The responder may configured to use custom responses for various types of requests.

The responder may operate responsive to one or more responder policies. The responder policies may instruct, identify, configure or specify to the responder to look for certain types of data in a client request and perform actions according to rules specified by a user. If a request matches a configured responder policy, the action corresponding to the policy generates the response and sends the response to the client. The response may contain some pieces of the request. For example, when generating a redirect response, the responder may include the incoming URL in the generated response.

In some embodiments, a responder policy may be configured to identify any URL corresponding to a disparately hosted application, such as a $3^{rd}$ party hosted application provided by a SaaS. In some embodiments, the responder policy may be configured to identify a login page of a $3^{rd}$ party hosted application. In some embodiments, the responder policy may be configured to identify a domain name, such as a FQDN of a $3^{rd}$ party hosted application. The responder policy may be configured to perform an action of generating a response that redirects the client to the cloud access/SSO system 2325. The responder policy may identify one cloud access/SSO system of a plurality of cloud access/SSO systems. The action may be performed according to a rule that indicates if content of the client request matches the content specified by the policy then generate a predetermined response. The action may be performed according to a rule that indicates if content of the client request does not match the content specified by the policy then generate a predetermined response.

The responder may support a plurality of actions. One type of action is a Respondwith Action, which sends a designated response without forwarding the request to a server. Instead, the appliance substitutes for and acts as the server itself. Another type of action is a Redirect Action, which Redirects the request to a different Web page or Web server. For example, a Redirect action can redirect requests originally sent to a Web site that exists in DNS, but for which there is no actual Web server, to an actual Web site. The responder can also redirect search requests to an appropriate URL. The generated or designated response may be identified or specified by a target. In some embodiments, the target is a configured string for the response such as an HTTP string to be sent as a response, or URL to which the request is redirected. The redirection target for a Redirect action may consist of a complete URL. The responder may be configured to perform a redirect action to redirect the client to another server, system or URL. The redirect action of the responder may be used to redirect the client if a request meets certain conditions, before the request is sent to the back-end server The intermediary device may include any embodiments of the cache redirection vServer 600', which may be generally referred to as a content redirection or CR vServer, described in connection with FIGS. 6A-6B and 7A-7B. For example, although the techniques of FIGS. 6A, 6B, 7A and 7B may be generally described in connection with transparent redirection to cache servers or farms, the same techniques may be used for transparent redirection to a cloud access/SSO system 2325.

When configured for transparent mode, a cache redirection of the appliance, such as an appliance deployed in an edge deployment topology, the CR vServer sends traffic matching a policy or expression to a transparent device or server. Clients access the Internet through the appliance, which may be configured as a Layer 4 switch that receives traffic on a certain port, such as port 80. The application can direct certain requests to one server or device in the transparent sever or device farm, such as a parallel deployed cloud access/SSO system and other requests to the origin server of the server. Content switching policies may be used to send certain requests of the client to the cloud access system and forward other request on to the origin server, such as a third party hosted application.

The CR vServer may be configured to redirect certain requests from the client to the cloud access/SSO system. For example, requests for a login page of a SaaS application maybe redirected to a transparent cloud access system. Requests not matching a content switching policy may be forwarded on to the origin server. When the appliance receives a request that is directed to a web server, the appliance may compares the HTTP headers or HTTP content in the request with a set of policy expressions. If the request does match the policy, the appliance forwards the request to the cloud access system. If the response does not match a policy, the appliance forwards the request, unchanged, to the web server.

The CR vServer may operate responsive to a set of policy expressions or content switching policies. These policies and expressions of such policies may be based on, identify or used to direct the CD vServer to identify, inspect or evaluate any portion of the request or response, including any header and/or payload of any protocol or network layer of the request and/or response. Responsive to the policy, the CR vServer may redirect the request or response to a designated server, service or URL, such as the cloud access system, the client or a disparately hosted application.

In some embodiments, the appliance may include a vServer 275S for managing or accessing the service of the cloud access system 225. In some embodiments, the appliance may include a vServer 275S for load balancing a plurality of services for the cloud access system 225. In some of these embodiments, the CR vServer may according to policy direct certain client request to the cloud access system via the vServer 275A. In some embodiments, the appliance may include a vServer 275N for load balancing or accessing servers 106, such as servers for hosted applications. In some of these embodiments, the CR vServer may according to policy direct certain client request to the cloud access system via the vServer 275N.

Figure 23B:
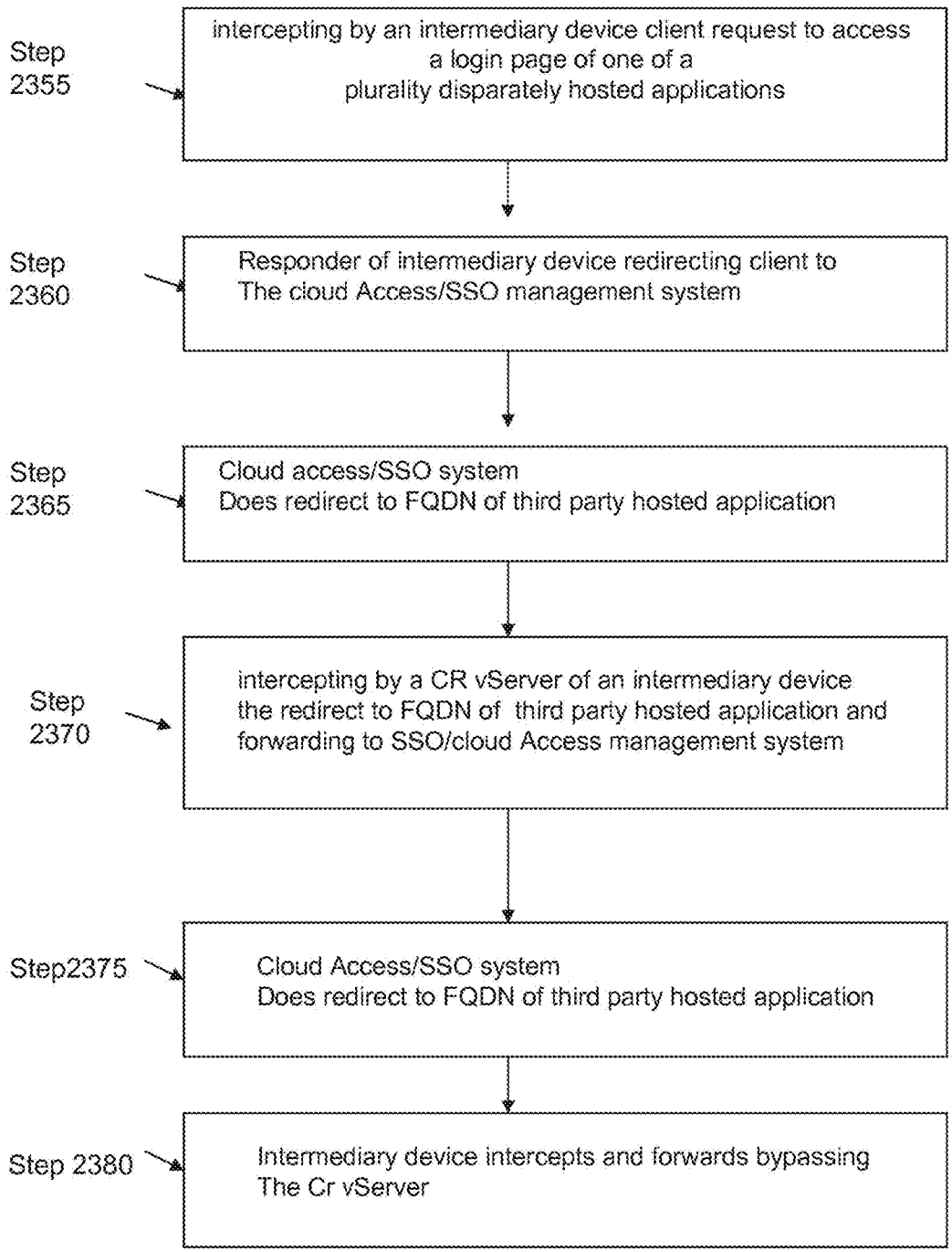
FIG. 23B is a flow diagram of embodiments of a method for providing single sign on access to disparately hosted applications.

Referring now to FIG. 23B, embodiments of steps of a method for providing single sign on access to disparately hosted applications. At step 2355, the appliance intercepts a client request to access a login page of one or more a plurality of disparately hosted applications. At step 2360, the responder of the appliance generates a response to redirect the client to the cloud access/SSO system At step 2365. the cloud access/SSO system redirects the client to the third party hosted application. At step 2370, the appliances intercepts the redirect to the third part hosted application and the CR vServer directs the request to the cloud access/SSO system. At step 2375, cloud access/SSO system does a redirect again to the third party hosted application. At step 2380, the appliance intercepts the redirect and allows the redirect to go to the third party hosted application bypassing further redirection from the CR vServer.

At step 2355, a user of the enterprise may request, via a client, access to any one of a plurality disparately hosted application. The user may authenticate or sign on to the appliance. The user may request access to any third party hosted application, such as any SaaS, PaaS or IaaS application. The request may include a request to a login page of a third party hosted application. The request may include a request to a landing page of a third party hosted application. The request may include a request to a URL of a third party hosted application. The request may include a request to a sign-in URL of a third party hosted application. The request may include a request that identifies a domain name of the third party hosted application. The request may include a request that identifies a FQDN of the third party hosted application. The request may include a request that identifies a destination IP address and/or destination port of the third party hosted application.

The appliance 200 may intercept or otherwise receive the request as the request traverses the appliance intermediary to the client and the destination of the request. The user as part of sending the request or prior to sending the request may have authenticated to the appliance using a set of authentication credentials. These set of authentication credentials may be recognized or authenticated by the appliance itself and/or via an enterprise authentication service or server accessible via the network of the appliance and enterprise.

At step 2360, the responder of the appliance detects or identifies the request as a request to access a predetermined third party hosted application. The responder may determine that a portion of the request matches or corresponds to a responder policy. The responder may determine that a portion of the request matches or corresponds to a redirect action of a responder. The responder may determine that the request matches or correspond to a responder policy for identifying a predetermined third party hosted application. The responder may determine that the request matches or correspond to a responder policy of a plurality of responder policies. Each of the responder policies may identify a corresponding third party hosted application The responder generates a response to redirect the client to a predetermined target, such as the cloud access system 2325, identified or specified by the matching responder policy. The responder generates a response to redirect the client to a URL of the cloud access system. The responder generates a response to redirect the client to a domain name of the cloud access system. The responder generates a response to redirect the client to an IP address of the cloud access system. The responder generates a response to redirect the client to authenticate to the cloud access system. The appliance transmits the response to the client. The appliance serves the response to a browser of the client. The browser of the client may interpret, process or execute the response to perform the redirection.

At step 2365, the cloud access/SSO system processes the redirected request from the client or browser. The cloud access/SSO system may perform any of the functionality, operations or services provided by the cloud access/SSO system for a user. In some embodiments, the user authenticates to the cloud access system. In some embodiments, as the user is authenticated to the appliance with one set of authentication credentials, the user does not need to re-authenticate to the cloud access/SSO system. The appliance and cloud access/SSO system may communicate about the status of authentication of the user. In some embodiments, the appliance authenticates the user to the cloud access system seamlessly and/or transparently to the user. For example, the appliance may comprise a form filling module that identifies, parses and fills in the login form to the cloud access system with the requested user identification and/or authentication credentials.

Upon authentication, confirming authentication or other processing of or for the user by the cloud access system, the cloud access system may redirect the client to a domain name of the third party hosted application. In some embodiments, the cloud access system may redirect the client to the fully qualified domain name of the third party hosted application. As such, in some embodiments, the cloud access system does not need to use any DNS hacking or other DNS mapping for integrating with the third party hosted application. If the third party hosted application uses cookies to maintain the application session of the user, the cloud access system may direct the browser of the client to the third party hosted application to set the cookies for the session. The cloud access system may redirect the client to a URL of the third party hosted application. The URL may start with the FQDN of the third party hosted application. The cloud access system may redirect the client to a SSO URL of the third party hosted application. The cloud access system may redirect the client to a login URL of the third party hosted application. Responsive to the redirection request, response or communication from the cloud access system, the browser of the client posts, requests or redirects to the specified URL or FQDN.

At step 2370, the appliance intercepts or otherwise receives the client's redirection request to the third party hosted application. The CR vServer may identify or match the client's redirection request to a policy, such as a content switching policy. The CR vServer may match the client's redirection request to a content switching policy comprising one or more keywords matching portions of the redirect URL. The CR vServer may have a plurality of content switching policies. Each of the content switching policies may have expressions identified or specifying a portion of the redirection URL from the cloud access system corresponding to a predetermined third party hosted application. The CR vServer may match the client's redirection request to a content switching policy comprising an expression matching the SSO URL from the cloud access system for redirection to the third party hosted application. The CR vServer may match the client's redirection request to a content switching policy comprising an expression matching the FQDN of the third party hosted application. Responsive to matching a content switching policy, the CR vServer forwards, transmits or redirects the redirection request to the cloud access system. In some embodiments, the CR vServer forwards or communicates the redirection request to a second vServer managing or providing access to the service of the cloud access system.

At step 2375, the cloud assess system may perform SSO login for the user. The cloud access/SSO system may use an application connector designed and constructed to interface, communicate and/or otherwise login and/or authenticate the user to the third party hosted application, such as via a secure login. The cloud access/SSO system may perform authentication/SSO services, or portions thereof, for the third party hosted application. The cloud access/SSO system may perform authentication and automatic login/sign on to the third party hosted application on behalf of the user. The cloud access/SSO system may perform authentication and/or automatic login/sign on to the third party hosted application on transparently and seamlessly for the requesting user. The cloud access/SSO system may perform authentication/SSO services, or portions thereof, for the user without requiring the user to re-authenticate.

The cloud access/SSO system may use a second or different set of authentication credentials recognized or to be authenticated by the third party hosted application. The cloud access/SSO system may be configured by the user or administrator with a set of authentication credentials for each third party hosted application. Each set of authentication credentials may be recognized or useable only with a corresponding application. In some embodiments, some of the authentication credentials across two or more applications are different while in some embodiments, some of the authentication credentials across two or more applications are the same.

The cloud access system may again redirect the client to the third party hosted application, such as the FQDN of the third party hosted application. The cloud access system may redirect the browser to a post login URL of third party hosted application with application related cookies received in doing sign-on by the cloud access system to the third party hosted application. For example, the cloud access system may redirect to the FQDN of the third party hosted application with that the application cookies are set with the domain names as the FQDN. This will allow these cookies to be submitted to the third party hosted application upon redirection.

At step 2380, the appliance intercepts or otherwise receives the redirection of step 2375. In this case, the CR vServer may not have any content switching policies that match the URL of the redirection or the URL of the request from the redirection. At this step, the responder and CR vServer policies are designed to have this redirection bypass the responder and CR vServer so that the appliance forwards to the third-party hosted application without redirecting. In some embodiments, as no policies are configured for the responder and/or CR vServer to process the redirection, the request of the redirection is forwarded to the intended or original destination of the request (e.g., the third party hosted application server). In some embodiments, the CR vServer is configured to respond to a policy to match this redirection and bypass redirection or allow to continue to the destination of the third party hosted application.

In view of the systems and methods of the embodiments of the above solution, the ADC or appliance described herein provides a transparent and seamless deployment of a cloud access system. The cloud access system may be transparently deployed in a parallel configuration to the appliance and the appliance manage redirections at appropriate times to seamlessly and transparently use the services of the cloud access system. Furthermore, the enterprise and the cloud access system do not need to have a DNS integration solution with special lookups to facilitate the use of the cloud access system. Instead, the easily configured ADC may be used to have a policy driven and user configured approach to providing an integrated SSO solution to a plurality of disparately hosted application. Furthermore, the solution provides the acceleration, control and traffic management benefits of the appliance described herein for application network traffic after SSO process is completed.

L. Systems and Methods for Single Click Access to SaaS, Cloud Hosted and Enterprise Applications Embodiments of the systems and methods of the present solution are directed to providing a single access interface to a plurality of disparately hosted applications, such as Software As A Service, Platform As A Service (PaaS) hosted applications, Infrastructure As A Service (IaaS) applications, cloud hosted applications and enterprise hosted applications. Any embodiments of the application delivery controller (ADC), e.g., appliance 200 or packet engine, may provide a user interface for a remote user to gain access to any one or more of the plurality of differently hosted applications by clicking on a visual representation of the application in a list of published applications for which the user is allowed to access. Via the same remote access user interface, a user may access an application hosted outside the enterprise the same way the user may gain access to a data center or enterprise hosted application. Transparent and seamless to the user, ADC provides access to the disparately hosted systems via a single click user interface upon which the user can launch any one of a SaaS, Cloud or enterprise application.

Any of the embodiments and components of the systems, or portions thereof, described in conjunction with FIGS. 12A-FIG. 21 may execute, be configured on or incorporated in any of the embodiments of an ADC 200. In some embodiments, a core of a multi-core ADC provides any of the web interface and published applications functionality described herein. In some embodiments, a virtualized ADC provides any of the web interface and published applications functionality described herein. In some embodiments, any of the embodiments of the program neighborhood subsystem 1270, ICA browser subsystem 1260, network-side interface 102 and farm-management interface 1204 may execute on any processor, core or virtualized environment of any embodiment of the ADC. In some embodiments, any of the embodiments of the web services directory 1160, web publishing tool 1173, publishing plug-in 1165 may execute on any processor, core or virtualized environment of any embodiment of the ADC. In some embodiments, any of the embodiments of the management dashboard 1800, profile connection manager 1810 and application folder 1804 may execute on any processor, core or virtualized environment of any embodiment of the ADC.

Any of the embodiments and components of the systems, or portions thereof, described in Section H above may execute, be configured on or incorporated in any of the embodiments of an ADC 200. In some embodiments, the ADC may be designed and constructed to perform any of the operations of the server side functionality for providing a program neighborhood, published application and/or web interface to applications described herein. Any vServer or packet engine of the ADC may be designed, configured and constructed to communicate, interface to or work with a SaaS/PaaS/IaaS service or any of the servers providing such service. Any vServer or packet engine of the ADC may be designed, configured and constructed to communicate, interface to or work with a cloud hosting service or any of the servers providing such service. Any of the servers providing applications or access to applications described in Section H above and/or Section G above may be servers of any cloud hosting service or SaaS/PaaS/IaaS service providers.

Embodiments of the present solution provide a list of applications accessible by the user via a program neighborhood and/or web interface that includes in the list of the applications, not only enterprise applications in the data center, but also any combination of SaaS/IaaS/PaaS applications and/or cloud hosted applications external to the data center. Any of the of SaaS/IaaS/PaaS applications and/or cloud hosted applications may be identified, configured, published, controlled and managed like the applications described in connection with Section G and H above.

In connection with the embodiments of prior sections, a user may be subscribed to any combination of SaaS/IaaS/PaaS applications and/or cloud hosted applications as well as the enterprise applications hosted by the enterprise in its data center. The embodiments of the application delivery store manager, application delivery store interface and management dashboard may be used for applications 1802 that are SaaS/IaaS/PaaS applications and/or cloud hosted applications or any application hosted externally to the data center of the enterprise.

The enumerated list of applications on the screen of the web interface and/or program neighborhood may include any combination of enterprise applications of the data center, SaaS, IaaS or PaaS application and cloud hosted applications. Any icons of the screen of the web interface and/or program neighborhood may identify or represent a SaaS, IaaS or PaaS application. Any icons of the screen of the web interface and/or program neighborhood may identify or represent a cloud hosted application.

With the embodiments of the present solution described herein, the present solution provides a centralized, consolidated user interface and remote access system to a plurality of disparately hosted applications. The user can sign on and gain access to any of the user's SaaS/PaaS/IaaS or cloud hosted applications as the user may for any enterprise hosted application.

The systems and methods described herein provide a seamless and transparent application delivery system to deliver to the user any application from a plurality of disparately hosted applications. The web interface and/or program neighborhood provided by or via the ADC and/or application delivery system may enumerate for the user any combination of SaaS/IaaS/PaaS, cloud and enterprise applications. The web interface and/or program neighborhood provided by or via the ADC and/or application delivery system may enumerate those applications to which the user is authorized for access. The user may gain access via clicking on an icon or link of a list of applications that user is subscribed to or to which are published for the user by the application delivery system. The ADC and application delivery system provide access control, management and launch services to the user via the consolidated and centralized user interface for any combination of SaaS/IaaS/PaaS, cloud and enterprise applications.

With the embodiments of single sign on described herein, the ADC and/or application delivery system provide a combination of SSO services and application publication, subscription and launch services for any combination of SaaS/IaaS/PaaS, cloud and enterprise applications.

Figure 24A:
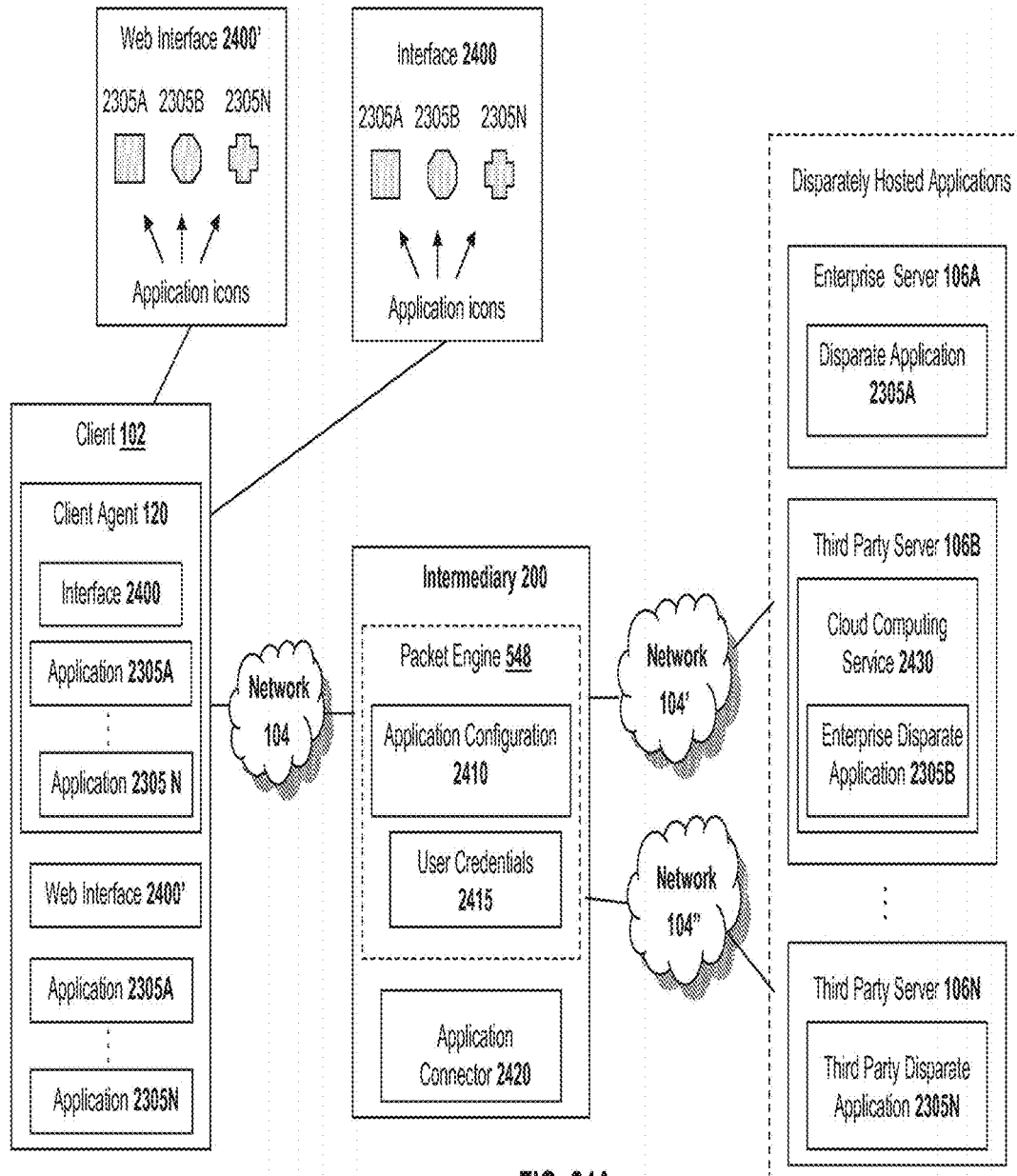
FIG. 24A is a block diagram of a system for providing a user a selectable list of disparately hosted applications.

Referring now to FIG. 24A, an embodiment of a system for serving disparately hosted applications to a client via an intermediary 200 is illustrated. In brief overview, a client 102 may comprise a client agent 120 that provides to a user an interface 2400, such as a browser based interface, an application delivery store, a program neighborhood or a web interface of published application. The user may, via the interface 2400, access any number of disparately hosted applications 2305A through 2305N from servers 106. Client 102 may provide the user with a separate or a different instance or kind of an interface 2400, such as web interface 2400'. Web interface 2400' may comprise any one of a web portal or a dazzle interface, a program neighborhood interface, or an interface for the application delivery store. Interfaces 2400 and 2400' may include a consolidated list of applications available to the user along with application icons, each of which may correspond to a specific disparately hosted application 2305. In such instances, web interface 2400' or 2400 may include specific icons corresponding to specific applications for each of applications 2305A, 2305B through 2305N executing on servers 106A, 106B through 106N.

Further in view of FIG. 24A, client 102 may be connected to intermediary 200 via network 104. Packet engine 548 of the intermediary 200 may comprise application configuration 2410 and user credentials 2415. Intermediary 200 may also include application connector 2420 which may execute within the packet engine or any where on the intermediary device 200. Intermediary device 200 may connect to any of the servers 106A, 106B through 106N via any number of networks, such as networks 104' and 104". The networks 104' and 104" may be a world wide web, private networks of a third party enterprise, networks of the host enterprise of the intermediary 200, a cloud computing network environment, a virtual network or any other network discussed herein. Servers 106 through 106N may host any number of disparate applications 2305A through 2305N in any order and in accordance with any embodiments discussed herein. Enterprise server 106A may be a server of the host enterprise that hosts, owns or manages the intermediary 200. Disparate application 2305A may be an application of the host enterprise made available to the client 102 accessing the intermediary 200 of the enterprise from the host enterprise server 106A. Server 106B may be a third party server of a third party enterprise that is different then the host enterprise. The third party server 106B may execute a cloud computing service 2430 serving or hosting a disparate application 2305B of the host enterprise. Another third party server 106N of a third party enterprise may host or serve a third party disparate application, such as 2305N also referred to as application 2310. The third party application 2305N or 2310 may be an application that the host enterprise does not serve or control. The intermediary 200 may allow the client 102 to use any of the disparate applications 2305 described herein. Intermediary 200 may deliver these applications 2305 to the user via any techniques described herein, including the application delivery via ICA protocol, streaming techniques or via a virtual environment delivered to the client machine 102.

Interface 2400 may be any interface enabling a user to access to disparately hosted applications 2305. Interface 2340 may be any interface described herein, such as a web interface or a web portal/dazzle interface, a program neighborhood interface or an application delivery store interface. Interface 2400 may include any features or functionalities of any of the aforementioned interfaces or components. Interface 2400 may also comprise an interface executed through the client agent 102. Interface 2400, whether a client agent interface 2400 or a web interface 2400, may herein be referred to as interface 2400 and may comprise any functionality of an interface providing access to any number of disparately hosted applications 2305/2310. Interface 2400 may be a web interface implemented via a client's web browser, and may be termed interface 2400' or web interface 2400'. Interface 2400 may also include an interface implemented via a client agent 120 executing on the client 102. Client agent 102 executed interface 2400 and web interface 2400' may each provide the same functionality to the user and enable the user to access any and all applications to which the user has access.

Interface 2400 may comprise a list of applications available to the user and icons corresponding to any such applications. The icons may include graphical icons or links. Icons may comprise a hyperlink, a word, a phrase, a picture, a figure, a symbol or any other feature that may be associated with a specific disparately hosted application. Interface 2400 may comprise a list of applications formed in a list format, or a table format or simply displayed as icons of applications in a standard computer window, file or a folder.

Disparately hosted applications 2305, or third party applications 2310, in addition to the aforementioned embodiments and features, may also include any type and form of applications hosted by servers from any number of enterprises and networks. Disparately hosted applications 2305 or 2310, also referred to as disparate applications 2305/2310 or applications 2305/2310, may executing on the host enterprise within which the user is operating and which provides the intermediary 200. Applications of the host enterprise may be termed as premise applications. Application 2305 may also include applications of the host enterprise hosted on a cloud computing service provider and/or SaaS/PaaS/IaaS applications. For example, an enterprise deploying the intermediary 200 or client 102 may own or operate on-premise servers, such as a data center. The enterprise owned servers may execute or provide applications for the user of the enterprise. The same enterprise may host, operate or run some applications on a cloud computing or hosting service provider. These applications 2305 may be operated on, served by or hosted by servers and/or networks different from the enterprise, such as a third party enterprise. The users of the enterprise may use applications provided by or hosted by $3^{rd}$ parties 1210, such as a SaaS application, for example, salesforce.com, Google mail, etc. Third party applications 2305 may include any applications, such as a video game, an email such as a Yahoo mail, Facebook application, a streaming application for movies, such as Netflix application or any other application which may be accessed by a user and may be hosted by a remote server.

Applications 2305 may comprise any type and form of application or service that may be served via a network. Application 2305 may comprise an application, such as a web based, HTML based application, java based or javascript based application. Application 2305 may be a video game, an application video game or an online video game. Application 2305 may be a streaming application, a word processing application, a data processing application. Application 2305 may comprise a database, file services, email or any other service or application served over a network.

Application configuration 2410 may comprise any type and form of configuration for an application 2305. Application configuration 2410 may include configurations for enabling the user on client 102 to access the applications 2305 to which the user has access. Application configurations 2410 may comprise settings and commands to initiate, operate and manage any applications 2305. Configurations 2410 may comprise settings for environments for running applications 2305, information regarding user connections for the applications or any features for enabling operation of applications 2305 the user selects and initiates.

User credentials 2415 may comprise any user credential or user specific information for gaining access to applications 2305. User credentials 2415 may comprise usernames, passwords, cookies, authentication files, encryption or decryption keys or any user specific information that may be used by any application 2305 for gaining access to the application 2305. Credentials 2415 may comprise username and password of a user to access intermediary 200 or to access the network via intermediary 200. User credentials 2415 may comprise a username and a password of a user for accessing network 104, such as a LAN network of the host enterprise. User credentials 2415 may comprise credentials for accessing any host enterprise applications 2305 on any host enterprise server, such as disparate application 2415A of the host enterprise executing on host enterprise server 106A. User credentials 2415 may comprise credentials, such as username and password of a third party application 2305N which may be different from the username and credentials for accessing host enterprise network or intermediary device 200. Username credentials 2415 may comprise any username, password, user specific information or feature that is needed for access to any application 2305, any enterprise, such as the host enterprise or a third party enterprise, a local network 104 or a remote LAN 104' or a third party enterprise network 104".

Application connector 2420 may comprise any hardware, software or a combination of hardware and software for signing in or authenticating a user to an application 2305. Application connector 2420 may comprise logic, functions or operations to establish a connection, session or use the services, for or on behalf of an user, of any application 2305. Application connector 2420 may comprise functionality for maintaining an environment via which the user may interact with the application 2305, maintaining a connection or session between the user on the client 102 and a server 106 hosting the application 2305 or any setting for ensuring that the connection or the session between the user and the application 2305 is established and/or maintained.

Enterprise server 106 may be a server of a host enterprise which also provides the intermediary 200 and the local area network 104 via which the client 102 connects to the intermediary 200. The host enterprise 106A may be a server inside of a LAN 104 or at a remote host enterprise location or inside of a host enterprise network. In some embodiments, server 106A is deployed outside of the host enterprise network. Server 106A may host any number of applications 2305, such as the host enterprise application 2305A. However, in some embodiments, host enterprise server 106A may host third party applications 2305, such as application 2305N.

Third party server 106B may be a server outside of the host enterprise network. Third party server 106B may comprise cloud computing service 2430 for serving applications 2305 via the cloud computing technology. Third party server 106B may comprise a host enterprise application, such as application 2305A or 2305B. Despite the fact that the third party server 106B may be a third party enterprise server, the application 2305 hosted by this server may be a host enterprise application 2305. Server 106B may provide access to the locally hosted enterprise application 2305 to the user via intermediary 200.

In some instances, a third party server, such as server 106N may comprise a third party application 2305N, also referred to as application 2310 and comprising any functionality of aforementioned application 2310. The third party server 106 may be a server 106 of a third party enterprise and may operate on a third party network 104", different from the host enterprise network 104. Third party application 2305N may be an application not owned, served or operated by any of the servers 106 of the host enterprise.

Cloud computing service 2430 may be any service for serving or hosting an application using cloud technology providing computational resources on demand via a computer network. Cloud computing service 2430 may comprise a platform or a functionality for servicing, serving or providing any application 2305, any database, any file service or email that may be served to a user. Cloud computing service 2430 may be distributed to serve a single application from a plurality of servers 106. In such instances, intermediary device 200 may be in communication with each of the servers 106 to provide the application 106 to the user.

Figure 24B:
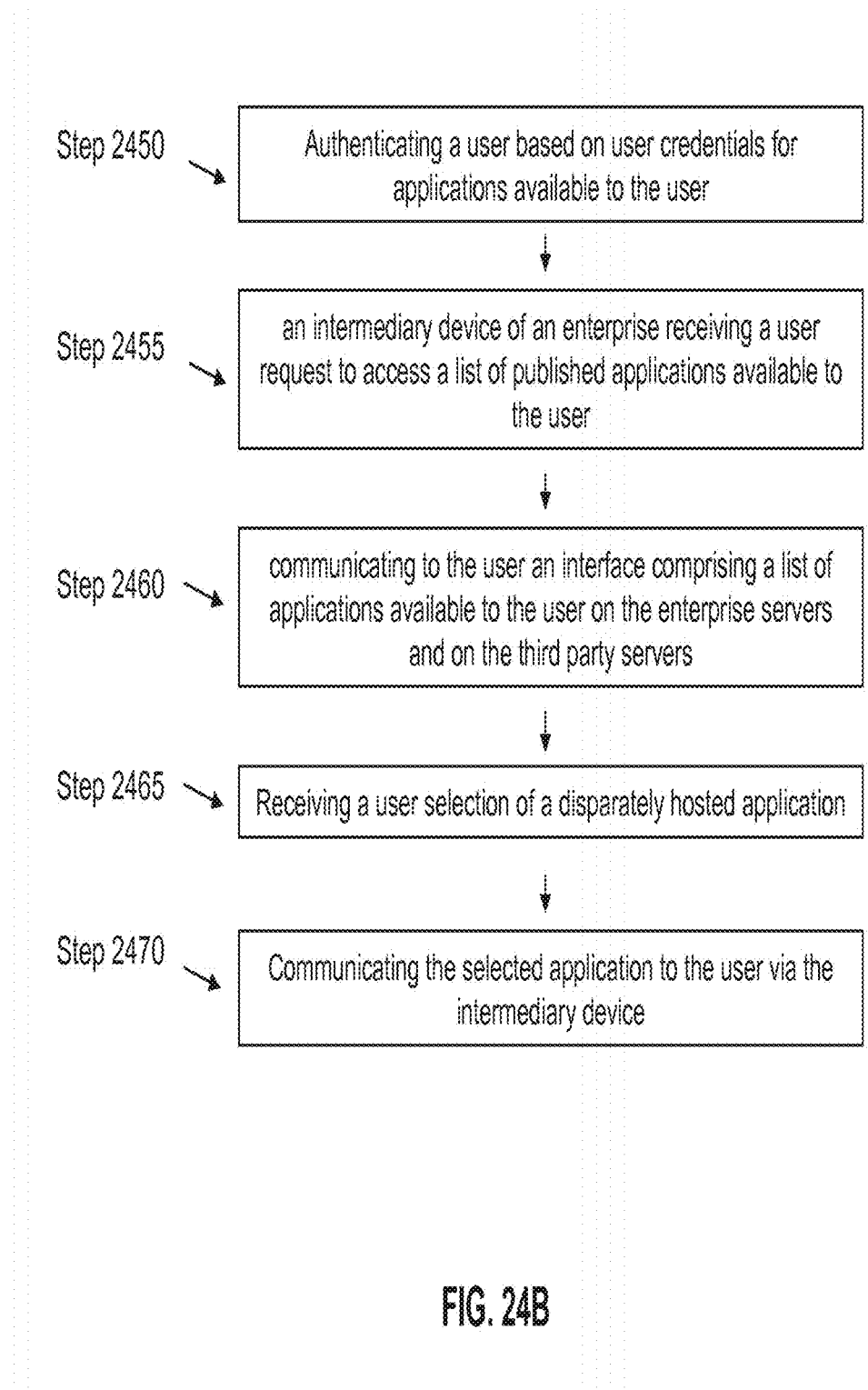
FIG. 24B is a flow diagram of embodiments of a method of providing a user a selectable list of disparately hosted applications.

Referring now to FIG. 24B, an embodiment of a method for providing a user a selectable list of disparately hosted applications is depicted. In brief overview, at step 2450 an intermediary device or any other authenticating device of the host enterprise authenticates a user based on user credentials for applications available to the user. At step 2455, the intermediary device of the host enterprise receives a user request to access a list of published applications available for access to the user. At step 2460, the intermediary device communicates to the user an interface that includes a list of applications available to the user, the list comprising applications hosted by the host enterprise servers as well as applications hosted on third party servers and servers of the third party enterprises. At step 2465, the intermediary receives a user selection of a disparately hosted application via a single click on the interface comprising the list of applications. At step 2470, the intermediary communicates or causes the communication or delivery of the user selected application to the user on the client device.

At step 2450, the user is authenticated based on any credentials identifying the user. The user may be authenticated by the intermediary device 200, an authentication server or any other device on the network for authenticating users. The user may be authenticated based on any single set of user credentials corresponding to the user. The intermediary device 200 may automatically authenticate the user on all other applications available to the user, including the third party disparately hosted applications, based on the authentication on the initial authentication. In some embodiments, the user is authenticated in accordance with the techniques described in connection with the method illustrated in FIG. 23. The user may be authenticated using a username and password, an encryption or decryption key, a cookie or any other user identifying method. In some embodiments, the user submits to the authenticating device, such as the intermediary 200, a username and password that is host enterprise specific, intermediary device 200 specific, local area network specific or specific to any application or service described herein, including the third party disparately hosted applications. In some embodiments, the user submits a username and password to the intermediary device 200 and the intermediary device 200 authenticates the user for access to the network of the host enterprise. In further embodiments, the user may submit only a username and password for the intermediary device and the intermediary device may authenticate the user on each of the networks, services, applications or enterprises that are external from the host enterprise applications, services or networks. Intermediary device may authenticate the user based on the username and password received and may use the user's stored username and password to authenticate the user on various third party hosted applications, such as the Google mail, Yahoo email, Facebook, or any other service or application that may be hosted externally by a third party server or a third party enterprise.

At step 2455, the intermediary device 200 receives a user request to access a list of published applications available for access by the user. The request may be initiated by a click on a desktop icon, a click on an interface icon, an HTML request, or a request for a hyperlink. The request may be initiated by the browser being directed to a predetermined URL, such as a URL for accessing the intermediary device or obtaining the list of published application. The request may also be automatically generated by the intermediary device in response to a received user's username and password from the client. The user may simply log in to the host enterprise network by logging in to the intermediary device 200 and the intermediary device may initiate the request for automatically presenting the user with the list of applications available to the user. The request may be initiated directly by the user's click or the user's request, responsive to an event, such as a detected user's activity on the client 102 or based on a rule or policy upon the user's log in.

At step 2460, the intermediary device 200 communicates to the user an interface comprising the list of all applications available to the access by the user. The interface communicated to the user may be any interface 2400 described herein. In some embodiments, the interface communicated to the user is web interface In other embodiments, the interface comprises a program neighborhood interface. In further embodiments, the interface includes an interface for an application delivery store. The interface may comprise graphical icons, links or hyperlinks identifying features for accessing applications 2305/2310. The interface may include graphical representations of applications, descriptions of the applications, and may be organized in any way to enable the user to identify the applications 2305/2310. The graphical icons of the interface may correspond or be linked to the applications listed.

The applications available to the user may be organized in a list, form or a table, any of which may be termed a list of published applications. The list of published applications may include any applications that are hosted on the servers of the host enterprise, on third party servers as well as the servers of any third party enterprises. The list of published applications may correspond to any disparately hosted applications 2305 or 2310 described herein. The list of applications available for access to the user may include one or more graphical icons corresponding to one or more applications hosted by third party servers on third party networks and one or more graphical icons corresponding to one or more applications hosted on one or more local servers on a local network of the device.

Depending on the user and the user's access to various applications, the interface may comprise any number of icons corresponding to any number of disparately hosted applications. In some embodiments, the interface includes icons corresponding to applications of the host enterprise served by the servers 106 of the host enterprise. The interface may also include icons corresponding to applications of the host enterprise that are served by third party servers 106 which are external to the network of the host enterprise. The third party servers may serve the host enterprise applications via cloud computing services 2430. In some embodiments, the interface includes icons corresponding to applications served by the third party servers, such as, for example, applications 2305N or 2310. The icons for the third party disparate applications 2305N/2310 may identify applications external to the host enterprise and served by any other enterprise.

The interface provided to the user may include a list of published applications comprising a graphical icon corresponding to the third party hosted Software as a Service (SAAS) application. In some embodiments, the interface includes a list of published applications comprising a graphical icon corresponding to the third party hosted a Platform as a Service (PAAS) application. In further embodiments, the interface includes a list of published applications comprising a graphical icon corresponding to the third party hosted Infrastructure as a Service (IAAS) application. In some embodiments, the interface includes icons for Citrix Systems applications, such as XenDesktop or XenServer applications. In further embodiments, the interface includes icons for third party applications, such as Facebook application, Google mail application, Yahoo mail application, ITunes application or any other application or service provided via a network.

The intermediary may obtain the list of published applications for the user from the application delivery system 190 described herein. The intermediary may obtain the list of published application for the user from the application delivery system as described in any embodiments of Section I and Section J. For example, the publishing tool 1173 of the content server and/or the publishing server plug-in 1165 may be used to configure, identify or establish the user's list of applications published or available to the user. In another example, the list of applications may be obtained via the application delivery store embodiments described in Section J. The intermediary may obtain the list of published application via configuration and policy specified on the intermediary for the user.

At step 2465, the intermediary 200 may receive from the client a user selection of a disparately hosted application. The user selection may be in form of a request initiated by a single click, a double click or a right/left click of the user on a graphical icon of the interface. In some embodiments, the user selection is provided by a request initiated by the user's single click, a double click or a right/left click on a hyperlink or a link corresponding to a particular application. In some embodiments, the user selects with a mouse a number of applications and sends a request to select a plurality of applications from the interface with the single request. In some embodiments, the user selects a third party disparate application 2305N or 2310, such as a Google mail, Facebook, Yahoo mail, etc. In further embodiments, the user selects a host enterprise application served by a third party server. In further embodiments, the user selects a host enterprise application served by a host enterprise server.

At step 2470, the intermediary device may initiate, cause or the request the execution of the disparately hosted application selected by the user. The intermediary device may communicate or interface with a cloud assess/SSO system 2325 to authenticate or single sign on the user to the selected application. The intermediary device may communicate or interface with an enterprise or datacenter server to authenticate the user. The intermediary device may communicate an instruction, command or request to a server hosted the application to execute the application. The intermediary device may comprise, use or communicate with an application connector for the selected application to login the user, establish an application session for the user and/or otherwise execute a third party hosted application, such as a SaaS/PaaS/IaaS application. The intermediary device may communicate an instruction, command or request to the application delivery system 190 to execute the application.

In some embodiments, the user's selection of the application from the interface may comprise the instruction, command or request to the execute the selected application to a target host or server providing the application. In some of these embodiments, the request may traverse the intermediary and the intermediary forwards the request to the intended target or destination. In some of these embodiments, the request may bypass the intermediary and communicate directly to the intended target or destination.

The intermediary may communicate to the client 102 the application selected by the user. In some embodiments, the selected application is streamed to the client from a third party server or from a host enterprise server via the intermediary. In other embodiments, the selected third party, or host enterprise application, such as virtualized application (e.g., a virtual machine) is delivered to the client via the intermediary to a virtual environment established on the client 102. In further embodiments, an application delivery system delivers via the intermediary to the client 102 the selected application via an ICA protocol. In some embodiments, an application delivery system delivers via the intermediary to the client 102 using a remote display protocol (RDP). In yet other embodiments, intermediary device 200 initiates or sets up the delivery of the selected application to the client 102 and the selected application is delivered to the client 102 directly from the hosting server, such as the third party server or the host enterprise server. In the instances in which the user selects multiple applications from the interface, the intermediary device may deliver to the client 102 from any of the corresponding servers the selected multiple applications via any variation of streaming, ICA protocol delivery, RDP delivery, virtual environment delivery or using any other application delivery technique described herein. In some embodiments, the intermediary setups a direct server return (DSR) path for the application to be delivered from a server directly to the client and bypassing the intermediary.

With the delivery of any disparately hosted application via the ADC or intermediary of embodiments of the present solution, the ADC may provide traffic management, access control, and acceleration to the delivery of such applications.

In view of the systems and methods described herein, a user may seamlessly gain access to any combination of application delivery system or enterprise hosted applications, enterprise applications hosted on a cloud and third party hosted applications, such as SaaS, PaaS and IaaS applications (e.g., disparately hosted applications). A single access user interface may be presented to the user in the form of a program neighborhood, web interface or application delivery stores, such as any of those provided by the application delivery system. The single access user interface may enumerate the published list of applications including any combination of the application delivery system or enterprise hosted applications, enterprise applications hosted on a cloud and third party hosted applications, such as SaaS, PaaS and IaaS applications. With a click of a graphical representation or icon in the access user interface, the user can launch and have delivered any one of these disparately hosted applications to the client of the user as if the application was hosted and server by the enterprise datacenter and not disparately hosted. As such, any of the third party hosted applications are delivered to the user under the same authentication domain and control of the ADC like it was an enterprise application delivered via the LAN of the enterprise from the application delivery system in the datacenter.

What is claimed:
1. A method, comprising:
 (a-1) receiving, by a device intermediary to a client and a plurality of servers, a request from the client to access a list of applications published to a user via a single user interface displayed by an agent executing on the client, the list of applications comprising a plurality of disparately hosted applications on a plurality of different networks, the single user interface configured to provide access to the plurality of disparately hosted applications authorized for the user;
 (a-2) receiving, by the device via the agent executing on the client, a single set of authentication credentials for performing a single authentication of the user for the plurality of disparately hosted applications on the plurality of different networks;

(b-1) using, by the device, the single set of authentication credentials of the user received via the agent to: (i) perform the single authentication of the user for the plurality of disparately hosted applications, and (ii) identify different authentication credentials managed by the device for the disparately hosted applications, to authenticate the user to each of the disparately hosted applications;

(b-2) providing, by the device via the single authentication performed using the single set of authentication credentials received via the agent, the user with access to the plurality of disparately hosted applications authorized for the user using the single user interface;

(c) communicating, by the device, to the client, the list of applications published to the user for display by the agent executing on the client via the single user interface;

(d) receiving, by the device, a selection of an application from the list of applications via a single click of a graphical icon on the single user interface corresponding to a disparately hosted application of the plurality of disparately hosted applications, the graphical icon selected from a plurality of graphical icons on the single user interface corresponding to each of the plurality of disparately hosted applications; and (e) communicating, via the device to the client responsive to the selection and the access provided from the single authentication of the user using the single set of authentication credentials, display output from execution of the application.

2. The method of claim 1, wherein the plurality of disparately hosted applications comprises one or more applications hosted by one or more servers on networks external to the client and one or more applications hosted on one or more servers on a network of the client.

3. The method of claim 2, wherein the one or more applications hosted by servers on networks external to the client comprises at least one application hosted via a cloud computing service.

4. The method of claim 1, wherein (c) further comprises identifying, by the device, graphical icons corresponding to each of the disparately hosted applications of the list of published applications available for access to the user.

5. The method of claim 1, wherein (c) further comprises communicating, by the device, the list of published applications via a web page to be displayed as the single user interface by the client.

6. The method of claim 1, wherein (d) further comprises automatically performing a login, by the device, to the selected application on behalf of the user.

7. The method of claim 1, wherein (d) further comprises authenticating, by the device, the user to the selected application using authentication credentials managed by the device for the user.

8. The method of claim 1, wherein (e) further comprises communicating, by the device, display output from execution, of the application via one of streaming, a virtualized environment or a remote display protocol.

9. A system, comprising:
a device comprising a processor coupled to memory and intermediary to a client and a plurality of servers, the processor configured to:
receive a request from the client to access a list of applications published to a user via a single user interface displayed by an agent executing on the client, the list of applications comprising a plurality of disparately hosted applications on a plurality of different networks, the single user interface configured to provide access to the plurality of disparately hosted applications authorized for the user;

receive, via the agent executing on the client, a single set of authentication credentials for performing a single authentication of the user for the plurality of disparately hosted applications on the plurality of different networks;

use the single set of authentication credentials of the user received via the agent to: (i) perform the single authentication of the user for the plurality of disparately hosted applications, and (ii) identify different authentication credentials managed by the device for the disparately hosted applications, to authenticate the user to each of the disparately hosted applications;

provide, via the single authentication performed using the single set of authentication credentials received via the agent, the user with access to the plurality of disparately hosted applications authorized for the user using the single user interface;

communicate, to the client, the list of applications published to the user for display by the agent executing on the client via the single user interface;

receive a selection of an application from the list of applications via a single click of a graphical icon on the single user interface corresponding to a disparately hosted application from the plurality of disparately hosted applications, the graphical icon selected from a plurality of graphical icons on the single user interface corresponding to each of the plurality of disparately hosted applications; and communicate, responsive to the selection and the access provided from the single authentication of the user using the single set of authentication credentials, display output from execution of the application to the client.

10. The system of claim 9, wherein the plurality of disparately hosted applications comprises one or more applications hosted by one or more servers on networks external to the client and one or more applications hosted on one or more servers on a network of the client.

11. The system of claim 10, wherein the one or more applications hosted by servers on networks external to the client comprises at least one application hosted via a cloud computing service.

12. The system of claim 9, wherein the device is further configured to identify graphical icons corresponding to each of the disparately hosted applications of the list of published applications available for access to the user.

13. The system of claim 9, wherein the device is further configured to communicate the list of published applications via a web page to be displayed as the single user interface by the client.

14. The system of claim 9, wherein the device is further configured to automatically perform a login to the selected application on behalf of the user.

15. The system of claim 9, wherein the device is further configured to authenticate the user to the selected application using authentication credentials managed by the device for the user.

16. The system of claim 9, wherein the device is further configured to communicate display output from execution of the application via one of streaming, a virtualized environment or a remote display protocol.

\* \* \* \* \*